United States Patent
Nakamura et al.

(10) Patent No.: US 8,149,673 B2
(45) Date of Patent: Apr. 3, 2012

(54) OPTICAL RECORDING METHOD, OPTICAL RECORDING DEVICE, MASTER MEDIUM EXPOSURE DEVICE, OPTICAL INFORMATION RECORDING MEDIUM, AND REPRODUCING METHOD

(75) Inventors: Atsushi Nakamura, Osaka (JP); Isao Kobayashi, Osaka (JP); Shigeru Furumiya, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/918,108

(22) PCT Filed: Oct. 5, 2009

(86) PCT No.: PCT/JP2009/005141
§ 371 (c)(1),
(2), (4) Date: Aug. 18, 2010

(87) PCT Pub. No.: WO2010/041404
PCT Pub. Date: Apr. 15, 2010

(65) Prior Publication Data
US 2010/0322057 A1  Dec. 23, 2010

(30) Foreign Application Priority Data

Oct. 9, 2008 (JP) ................................. 2008-262518
Mar. 3, 2009 (JP) ................................. 2009-049841

(51) Int. Cl.
*G11B 7/0045* (2006.01)
(52) U.S. Cl. .................. 369/59.11; 369/59.22
(58) Field of Classification Search .......................... None
See application file for complete search history.

(56) References Cited

U.S. PATENT DOCUMENTS

| 5,796,693 | A  | * | 8/1998  | Taguchi et al. | 369/59.22 |
| 6,483,793 | B1 | * | 11/2002 | Kim           | 369/59.22 |
| 6,654,325 | B1 | * | 11/2003 | Minemura et al. | 369/47.28 |
| 7,082,566 | B2 |   | 7/2006  | Kashihara et al. | |
| 7,835,245 | B2 | * | 11/2010 | Shimizu et al. | 369/59.22 |
| 7,920,453 | B2 | * | 4/2011  | Nakamura      | 369/59.22 |
| 2003/0090980 | A1 |  | 5/2003 | Kashihara et al. | |
| 2004/0222479 | A1 |  | 11/2004 | Uno et al. | |
| 2005/0078579 | A1 |  | 4/2005 | Miyashita et al. | |
| 2005/0142320 | A1 |  | 6/2005 | Oyake et al. | |
| 2007/0109939 | A1 | * | 5/2007 | Shimizu et al. | 369/59.22 |
| 2007/0165506 | A1 |  | 7/2007 | Nakamura et al. | |

(Continued)

FOREIGN PATENT DOCUMENTS

EP  1 059 630   12/2000
(Continued)

OTHER PUBLICATIONS

International Search Report for corresponding International Application No. PCT/JP2009/005141 mailed Dec. 1, 2009.

(Continued)

*Primary Examiner* — Peter Vincent Agustin
(74) *Attorney, Agent, or Firm* — Renner, Otto, Boisselle & Sklar, LLP

(57) ABSTRACT

An optical recording method for recording information by irradiating an optical disc medium with a modulated write pulse train of laser light variable over a plurality of power levels such that a plurality of marks are formed on the optical disc medium, edge positions of each of the marks and a space between adjacent two of the marks being utilized for recording of the information.

18 Claims, 18 Drawing Sheets

U.S. PATENT DOCUMENTS

| | | | |
|---|---|---|---|
| 2007/0291621 A1 | 12/2007 | Aoyama et al. | |
| 2008/0025180 A1 | 1/2008 | Aoyama et al. | |
| 2008/0151726 A1 | 6/2008 | Yamakaza et al. | |
| 2008/0159104 A1* | 7/2008 | Miyashita et al. | 369/53.41 |
| 2009/0106627 A1* | 4/2009 | Minemura et al. | 714/758 |
| 2009/0116344 A1 | 5/2009 | Hibino et al. | |
| 2010/0039912 A1* | 2/2010 | Nakano et al. | 369/53.11 |
| 2010/0188953 A1* | 7/2010 | Imai | 369/53.44 |
| 2010/0260025 A1* | 10/2010 | Minemura et al. | 369/59.22 |
| 2010/0322057 A1* | 12/2010 | Nakamura et al. | 369/100 |
| 2011/0044143 A1* | 2/2011 | Nakamura et al. | 369/47.19 |

FOREIGN PATENT DOCUMENTS

| | | |
|---|---|---|
| JP | 2000-200418 | 7/2000 |
| JP | 2004-063024 | 2/2004 |
| JP | 2004-335079 | 11/2004 |
| JP | 2004-362748 | 12/2004 |
| JP | 2007-317334 | 12/2007 |
| JP | 2008-033981 | 2/2008 |
| JP | 2008-097799 | 4/2008 |
| JP | 2008-112509 | 5/2008 |
| JP | 2008-159231 | 7/2008 |
| WO | 03/077239 A1 | 9/2003 |
| WO | 2005/066940 A1 | 7/2005 |

OTHER PUBLICATIONS

International Preliminary Report on Patentability for corresponding International Application No. PCT/JP2009/005141 dated Jun. 22, 2010.

Co-pending U.S. Appl. No. 12/577,769, filed Oct. 13, 2009.

International Search Report for corresponding Application No. PCT/JP2009/005157 mailed Dec. 1, 2009.

Form PCT/ISA/237 and a partial English translation for corresponding Application No. PCT/JP2009/005157 mailed Dec. 1, 2009.

"Illustrated Blu-ray Disc Reader" published by Ohmsha, Ltd., Dec. 2006, pp. 13-28 with a concise explanation.

"Illustrated Blu-ray Disc Reader" published by Ohmsha, Ltd., Dec. 2006, pp. 247-248 with a partial English translation.

* cited by examiner

| MOVE AMOUNTS OF dTF1/dTF2/dTF3 | | 2Tmark | | | | 3Tmark | 4Tmark | ≥5Tmark |
|---|---|---|---|---|---|---|---|---|
| | | SUCCEEDING SPACE | | | | | | |
| | | 2Tspace | 3Tspace | 4Tspace | ≥5Tspace | X | X | X |
| PRECEDING SPACE MARK | 2Tmark | M2222 | M2223 | M2224 | M2225 | M223X | M224X | M225X |
| | ≥3Tmark, 2Tspace | M3222 | M3223 | M3224 | M3225 | M323X | M324X | M325X |
| | X, 3Tspace | MX322 | MX323 | MX324 | MX325 | MX33X | MX34X | MX35X |
| | X, 4Tspace | MX422 | MX423 | MX424 | MX425 | MX43X | MX44X | MX45X |
| | X, ≥5Tspace | MX522 | MX523 | MX524 | MX525 | MX53X | MX54X | MX55X |

X: Don't CARE (b)

| MOVE AMOUNTS OF dTE1/dTE2/dTE3 | | 2Tmark | | | | 3Tmark | 4Tmark | ≥5Tmark |
|---|---|---|---|---|---|---|---|---|
| | | PRECEDING SPACE | | | | | | |
| | | 2Tspace | 3Tspace | 4Tspace | ≥5Tspace | X | X | X |
| SUCCEEDING SPACE MARK | 2Tmark, 2Tspace | S2222 | S3222 | S4222 | S5222 | SX322 | SX422 | SX522 |
| | ≥3Tmark | S2223 | S3223 | S4223 | S5223 | SX323 | SX423 | SX523 |
| | X, 3Tspace | S223X | S323X | S423X | S523X | SX33X | SX43X | SX53X |
| | X, 4Tspace | S224X | S324X | S424X | S524X | SX34X | SX44X | SX54X |
| | X, ≥5Tspace | S225X | S325X | S425X | S525X | SX35X | SX55X | SX55X |

X: Don't CARE (c)

| MOVE AMOUNTS OF dTF1/dTF2/dTF3 | | 2Tmark | | | | | 3Tmark | 4Tmark | ≥5Tmark | |
|---|---|---|---|---|---|---|---|---|---|---|
| | | 2Tmark | ≥3Tmark | X | X | X | X | X | X | S-MARK |
| | | 2Tspace | | 3Tspace | 4Tspace | ≥5Tspace | X | X | X | S-SPACE |
| 2Tmark, 2Tspace | | M22222 | M22223 | M2223X | M2224X | M2225X | MX23XX | MX24XX | MX25XX | |
| ≥3Tmark | | M32222 | M32223 | M3223X | M3224X | M3225X | | | | |
| X, 3Tspace | | MX3222 | MX3223 | MX323X | MX324X | MX325X | MX33XX | MX34XX | MX35XX | |
| X, 4Tspace | | MX4222 | MX4223 | MX423X | MX424X | MX425X | MX43XX | MX44XX | MX45XX | |
| X, ≥5Tspace | | MX5222 | MX5223 | MX523X | MX524X | MX525X | MX53XX | MX54XX | MX55XX | |
| P-MARK | P-SPACE | | | | | | | | | |

X: Don't CARE (d)

| MOVE AMOUNTS OF dTE1/dTE2/dTE3 | | 2Tmark | | | | | 3Tmark | 4Tmark | ≥5Tmark | |
|---|---|---|---|---|---|---|---|---|---|---|
| | | 2Tmark | ≥3Tmark | X | X | X | X | X | X | P-MARK |
| | | 2Tspace | | 3Tspace | 4Tspace | ≥5Tspace | X | X | X | P-SPACE |
| 2Tmark, 2Tspace | | S22222 | S32222 | SX3222 | SX4222 | SX5222 | SXX32X | SXX42X | SXX52X | |
| ≥3Tmark | | S22223 | S32223 | SX3223 | SX4223 | SX5223 | | | | |
| X, 3Tspace | | S2223X | S3223X | SX323X | SX423X | SX523X | SXX33X | SXX43X | SXX53X | |
| X, 4Tspace | | S2224X | S3224X | SX324X | SX424X | SX524X | SXX34X | SXX44X | SXX54X | |
| X, ≥5Tspace | | S2225X | S3225X | SX325X | SX425X | SX525X | SXX35X | SXX45X | SXX55X | |
| S-MARK | S-SPACE | | | | | | | | | |

X: Don't CARE

FIG.12 dTF1

| | | 2Tmark | | | | 3Tmark | 4Tmark | ≥5Tmark | |
|---|---|---|---|---|---|---|---|---|---|
| | | 2Tmark | ≥3Tmark | | | X | X | X | S-mark |
| | | 2Tspace | 3Tspace | 4Tspace | ≥5Tspace | | | | S-space |
| 2Tmark<br>≥3Tmark | 2Tspace | 1 | 2 | | | X | X | X | |
| | 3Tspace | 6 | 7 | 3 | 4 | 5 | | | |
| X | 4Tspace | 11 | 12 | 8 | 9 | 10 | 26 | 30 | 34 |
| | ≥5Tspace | 16 | 17 | 13 | 14 | 15 | 27 | 31 | 35 |
| P-mark | P-space | 21 | 22 | 18 | 19 | 20 | 28 | 32 | 36 |
| | | | | 23 | 24 | 25 | 29 | 33 | 37 |

X:Don't CARE dTF2

| | | 2Tmark | | | | 3Tmark | 4Tmark | ≥5Tmark | |
|---|---|---|---|---|---|---|---|---|---|
| | | 2Tmark | ≥3Tmark | | | X | X | X | S-mark |
| | | 2Tspace | 3Tspace | 4Tspace | ≥5Tspace | | | | S-space |
| 2Tmark<br>≥3Tmark | 2Tspace | 1 | 2 | | | X | X | X | |
| | 3Tspace | 6 | 7 | 3 | 4 | 5 | | | |
| X | 4Tspace | 11 | 12 | 8 | 9 | 10 | 26 | 30 | 34 |
| | ≥5Tspace | 16 | 17 | 13 | 14 | 15 | 27 | 31 | 35 |
| P-mark | P-space | 21 | 22 | 18 | 19 | 20 | 28 | 32 | 36 |
| | | | | 23 | 24 | 25 | 29 | 33 | 37 |

X:Don't CARE dTE2

| | 3Tmark | | | | 4Tmark | | | | ≥5Tmark | |
|---|---|---|---|---|---|---|---|---|---|---|
| | X | | | | X | | | | X | S-mark |
| 2Tspace | 3Tspace | 4Tspace | ≥5Tspace | 2Tspace | 3Tspace | 4Tspace | ≥5Tspace | 2Tspace | 4Tspace | ≥5Tspace | S-space |
| 1 | 2 | 3 | 4 | 5 | 6 | 7 | 8 | 9 | 10 | 11 | 12 |

P-mark | P-space

X:Don't CARE dTE1

| | | 2Tmark | | | | 3Tmark | | | | 4Tmark | | | | ≥5Tmark | |
|---|---|---|---|---|---|---|---|---|---|---|---|---|---|---|---|
| | | 2Tmark | ≥3Tmark | | | X | | | | X | | | | X | S-mark |
| | | 2Tspace | 3Tspace | 4Tspace | ≥5Tspace | 2Tspace | 3Tspace | 4Tspace | ≥5Tspace | 2Tspace | 3Tspace | 4Tspace | ≥5Tspace | 4Tspace | ≥5Tspace | S-space |
| X | 2Tspace | 1 | 2 | 3 | 4 | 5 | | | | | | | | | |
| | ≥3Tspace | 6 | 7 | 8 | 9 | 10 | 11 | 12 | 13 | 14 | 15 | 16 | 17 | 18 | 19 | 20 | 21 | 22 |
| P-mark | P-space | | | | | | | | | | | | | | |

X:Don't CARE

FIG. 13 dTF1

| | | 2Tmark | | | | 3Tmark | | | | 4Tmark | | | | ≧5Tmark | | | |
|---|---|---|---|---|---|---|---|---|---|---|---|---|---|---|---|---|---|
| | | X | | | | X | | | | X | | | | X | | S-mark | |
| | | 2Tspace | 3Tspace | 4Tspace | ≧5Tspace | | | | | | | | | | | S-space | |
| | 2Tspace | 1 | 2 | 3 | 4 | | | 17 | | | | 21 | | | | 25 | |
| X | 3Tspace | 5 | 6 | 7 | 8 | | | 18 | | | | 22 | | | | 26 | |
| X | 4Tspace | 9 | 10 | 11 | 12 | | | 19 | | | | 23 | | | | 27 | |
| | ≧5Tspace | 13 | 14 | 15 | 16 | | | 20 | | | | 24 | | | | 28 | |

P-mark  P-space
X: Don't CARE dTF2

| | | 2Tmark | | | | 3Tmark | | | | 4Tmark | | | | ≧5Tmark | | | |
|---|---|---|---|---|---|---|---|---|---|---|---|---|---|---|---|---|---|
| | | X | | | | X | | | | X | | | | X | | S-mark | |
| | | 2Tspace | 3Tspace | 4Tspace | ≧5Tspace | | | | | | | | | | | S-space | |
| | 2Tspace | 1 | 2 | 3 | 4 | | | 17 | | | | 21 | | | | 25 | |
| X | 3Tspace | 5 | 6 | 7 | 8 | | | 18 | | | | 22 | | | | 26 | |
| X | 4Tspace | 9 | 10 | 11 | 12 | | | 19 | | | | 23 | | | | 27 | |
| | ≧5Tspace | 13 | 14 | 15 | 16 | | | 20 | | | | 24 | | | | 28 | |

P-mark  P-space
X: Don't CARE dTE2

| | | 2Tmark | | | | 3Tmark | | | | 4Tmark | | | | ≧5Tmark | | | |
|---|---|---|---|---|---|---|---|---|---|---|---|---|---|---|---|---|---|
| | | X | | | | X | | | | X | | | | X | | S-mark | |
| | | 2Tspace | 3Tspace | 4Tspace | ≧5Tspace | 2Tspace | 3Tspace | 4Tspace | ≧5Tspace | 2Tspace | 3Tspace | 4Tspace | ≧5Tspace | 2Tspace | 3Tspace | 4Tspace | ≧5Tspace |
| X | P-space | | | | | 1 | 2 | 3 | 4 | 5 | 6 | 7 | 8 | 9 | 10 | 11 | 12 |

P-mark
X: Don't CARE dTE1

| | | 2Tmark | | | | 3Tmark | | | | 4Tmark | | | | ≧5Tmark | | | |
|---|---|---|---|---|---|---|---|---|---|---|---|---|---|---|---|---|---|
| | | X | | | | X | | | | X | | | | X | | S-mark | |
| | | 2Tspace | 3Tspace | 4Tspace | ≧5Tspace | 2Tspace | 3Tspace | 4Tspace | ≧5Tspace | 2Tspace | 3Tspace | 4Tspace | ≧5Tspace | 2Tspace | 3Tspace | 4Tspace | ≧5Tspace |
| X | 2Tspace | 1 | 2 | 3 | 4 | 9 | 10 | 11 | 12 | 13 | 14 | 15 | 16 | 17 | 18 | 19 | 20 |
| | ≧3Tspace | 5 | 6 | 7 | 8 | | | | | | | | | | | | |

P-mark  P-space
X: Don't CARE

FIG.19
(a)
| PRE-CED-ING SPACE | MOVE AMOUNTS OF dTF1/dTF2/dTF3 | 2Tmark | 3Tmark | 4Tmark | ≥5Tmark |
|---|---|---|---|---|---|
| | 2Tspace | MX22X | MX23X | MX24X | MX25X |
| | 3Tspace | MX32X | MX33X | MX34X | MX35X |
| | 4Tspace | MX42X | MX43X | MX44X | MX45X |
| | ≥5Tspace | MX52X | MX53X | MX54X | MX55X |
X:Don't CARE
(b)
| SUC-CEED-ING SPACE | MOVE AMOUNTS OF dTE1/dTE2/dTE3 | 2Tmark | 3Tmark | 4Tmark | ≥5Tmark |
|---|---|---|---|---|---|
| | 2Tspace | SX22X | SX32X | SX42X | SX52X |
| | 3Tspace | SX23X | SX33X | SX43X | SX53X |
| | 4Tspace | SX24X | SX34X | SX44X | SX54X |
| | ≥5Tspace | SX25X | SX35X | SX55X | SX55X |
X:Don't CARE
FIG.20
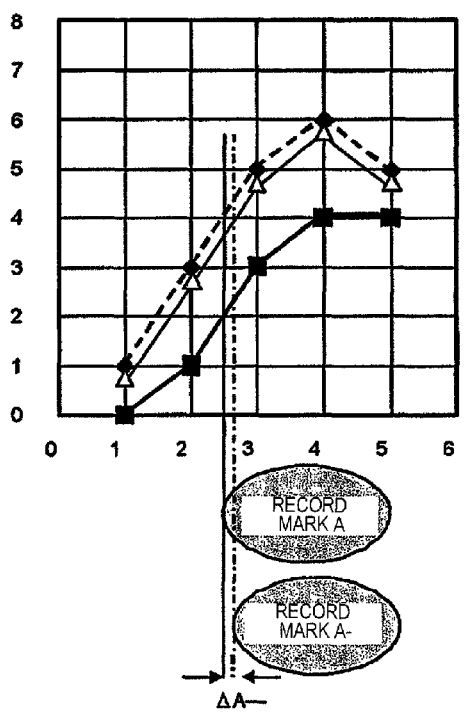
(a)
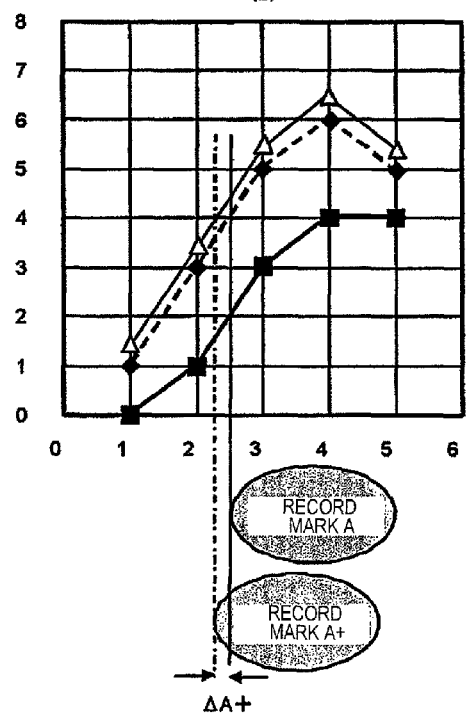
(b)

FIG.21 (a) 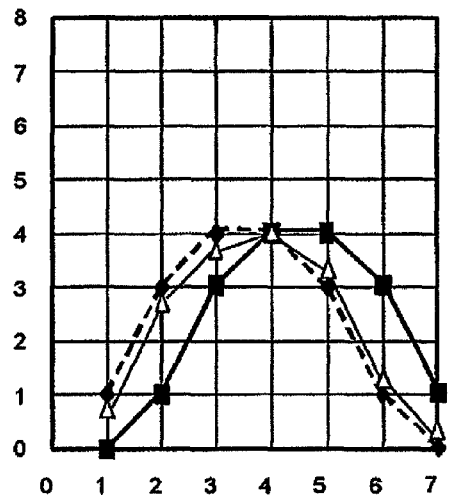 (b) 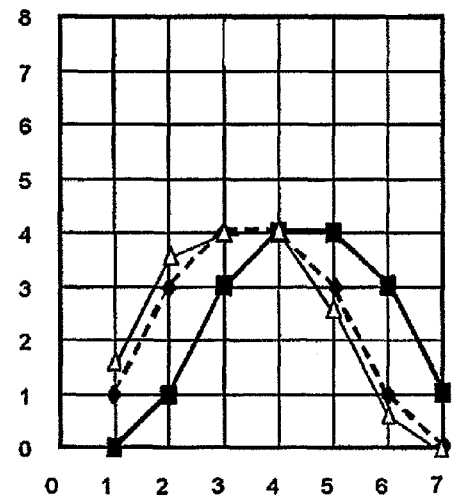
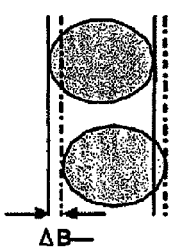 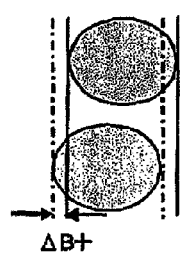
FIG.22 (a) 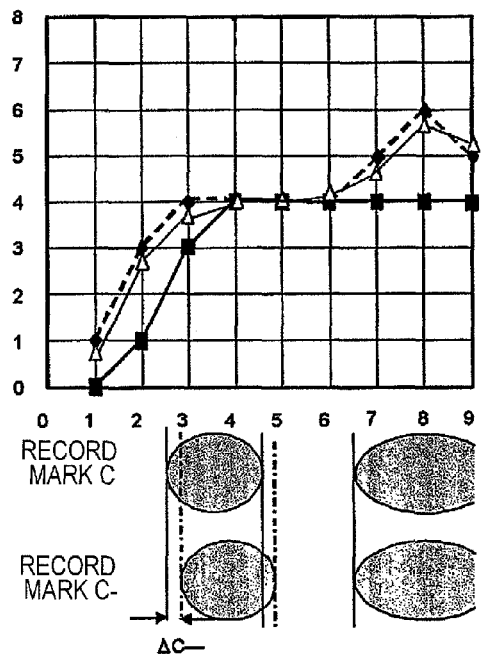 (b) 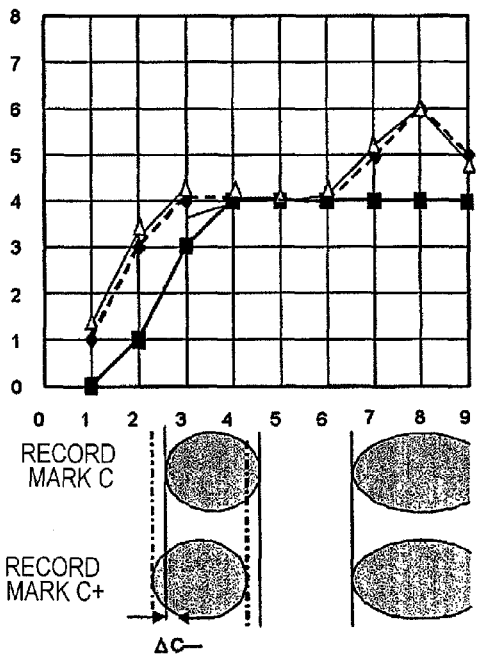
 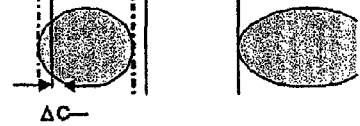

LEFT: CORRECT PATTERN, RIGHT: REPRODUCED (ERROR) PATTERN 1:SPACE, 0:MARK (a) ERROR PATTERN WITH ANTERIOR SHIFT (b) ERROR PATTERN WITH POSTERIOR SHIFT

OPTICAL RECORDING METHOD, OPTICAL RECORDING DEVICE, MASTER MEDIUM EXPOSURE DEVICE, OPTICAL INFORMATION RECORDING MEDIUM, AND REPRODUCING METHOD

TECHNICAL FIELD

The present invention relates to an optical recording method, an apparatus for manufacturing a master through an exposure process (master-manufacturing exposure apparatus), an optical information recording medium, and a reproduction method, which utilize maximum likelihood decoding, such as PRML, an optical recording apparatus. More particularly, the present invention relates to a technique of writing under the optimum recording conditions by making adaptive recording compensation at least according to the space lengths of spaces preceding and succeeding an interested mark, for the purpose of decreasing optical intersymbol interference or thermal interference which is caused in recording of or reproduction from a mark or pit sufficiently smaller than a light beam spot diameter. The present invention also relates to a technique of writing under the optimum recording conditions by making adaptive recording compensation according to the space lengths of spaces preceding and succeeding an interested mark and, additionally, to the mark lengths of marks preceding and succeeding the spaces.

In this specification, a direction in which the light beam spot at a certain position advances over an optical information recording medium (optical disc medium) due to rotation of the optical disc medium is referred to as "posterior/succeeding", and the opposite direction relative to the certain position is referred to as "anterior/preceding".

BACKGROUND ART

The conventional standards of optical disc media include BD-R, BD-RE, DVD-RAM, DVD-R, DVD-RW, CD-RW, etc. There are techniques of rewriting or incrementally writing data by emitting laser light onto optical disc media that comply with these standards.

An example of the optical disc media is a phase change type optical disc medium. Recording of information on the phase change type optical disc medium is realized by irradiating an optical disc medium with laser light to locally change the state of atomic bond of the material of a thin film formed over a recording film surface by the injected energy of the laser light. The irradiation with the laser light changes the physical state of the irradiated portion and its surrounding portion. Specifically, the crystalline state and the amorphous state have different reflectances. Since a difference in the physical state leads to a difference in reflectance, information can be read out by irradiating the disc with laser light of a sufficiently smaller power than that used in recording and detecting the amount of change in reflectance.

Examples of the phase change type optical disc media include writable media in which a GeSbTe material is used as a recording material for a recording layer as well as write-once optical disc media. Patent Document No. 1 discloses the technique of using a material containing Te—O-M (where M is at least one of metal elements, metalloid elements, and semiconductor elements) as an example of a recording material of a write-once optical disc medium. Te—O-M means a composite material which contains Te, O, and M. Immediately after the formation of a film, particles of Te, Te-M, and M are uniformly and randomly dispersed throughout a matrix of $TeO_2$. Irradiation of a thin film formed of this recording material with converged laser light causes the film to melt, so that crystals of Te or Te-M of large grain size are deposited. The difference of the optical state which is caused in this process can be detected as a signal. This enables the mode of recording in which writing is allowed only once in the same area, so-called write-once recording.

In an alloy-based write-once type disc made of an inorganic material, two thin films made of different materials are combined into a laminate. These materials are heated by laser to melt, so that the materials are mixed together into an alloy, whereby record marks are formed. Another known write-once optical disc medium of a different type is, for example, such that the temperature is increased by laser irradiation to thermally decompose organic pigments of an organic pigment material, and the change in refractive index of the decomposed part is decreased, whereby information is recorded. In the write-once optical disc medium of this type, the principle of recording of information is such that the optical path length of a light transmission layer appears shorter in a recorded portion than in a unrecorded portion, and as a result, this acts like concavity/convexity pits of, for example, a read-only CD on incoming light.

In the case of mark edge recording on such a write-once optical disc medium, the optical disc medium is irradiated with laser light consisting of a plurality of pulse trains called "multi-pulses" such that the physical state of marks is changed, whereby information is recorded. The information is read out by detecting the change in reflectance.

A conceivable measure for increasing the recording density is, typically, to decrease the length of marks and spaces which are to be recorded. However, especially when the length of a space with a preceding record mark becomes shorter, thermal interference occurs such that the heat at the trailing end of the recorded mark is conducted via a space portion to affect the increase in temperature at the leading end of a succeeding mark and, on the other side, the heat at the leading end of the recorded mark affects the cooling cycle at the trailing end of a preceding mark. Even when marks and spaces formed on a track have correct lengths, edge positions of short marks and spaces which are detected in reproduction are disadvantageously different from their ideal values due to the frequency characteristics of a reproduction optical system which depend on the size of the light spot. The deviation of the detected edges from the ideal values is generally referred to as "intersymbol interference". When the sizes of marks and spaces are smaller than the light spot, large intersymbol interference occurs, and accordingly, the jitter in reproduction is increased, so that the bit error rate is increased.

At the recording densities of DVDs and BDs, the sizes of marks which are to be recorded and the distance between the marks and spaces are small. As a result, the heat of laser light applied for formation of a mark not only reaches an intended area for the mark but also is conducted via spaces to reach the areas for preceding and succeeding marks, so that deformation can sometimes occur in the shapes of the interested mark and the preceding and succeeding marks. There are known techniques capable of avoiding this problem, for example, the technique of changing the leading pulse position of a multi-pulse for forming a mark is changed according to the relationship of the length of the interested mark and the length of the space with the succeeding mark, and the technique of changing the trailing pulse position of a multi-pulse for forming a mark is changed according to the relationship of the length of the interested mark and the length of the space with the preceding mark. These techniques are techniques of recording marks with preliminary corrections made to thermal interference of record marks. This mode of control of the write pulse position is generally referred to as adaptive recording compensation. Patent Document No. 2 discloses such an adaptive recording compensation method.

According to the recording method disclosed in Patent Document No. 2, a writable optical disc medium contains pre-recorded write pulse reference conditions, by which the positional information of write pulses are specified for respective one of the plurality of possible combinations of the length of a mark, the length of the space with the succeeding mark, or the length of the space with the preceding mark. The recording apparatus retrieves the write pulse reference conditions from the optical disc medium to modify currently-effective write pulse reference conditions such that optimum write pulse conditions are obtained.

Specifically, the positional information established for all the combinations of the mark lengths and the space lengths of the space with the succeeding mark included in the write pulse reference conditions, or for all the combinations of the mark lengths and the space lengths of the space with the preceding mark included in the write pulse reference conditions, are used to perform the first test writing in a predetermined track on an optical disc medium. The information recorded in the first test writing is reproduced, and the first jitter is detected in the reproduced signal. And, a change of the first predetermined amount is uniformly added to the positional information for respective ones of all the combinations of the mark lengths and the space lengths included in the write pulse reference conditions. The uniformly-changed positional information is used to perform the second test writing in a predetermined track on the optical disc medium. The information recorded in the second test writing is reproduced, and the second jitter is detected in the reproduced signal. In the last step, the first jitter and the second jitter are compared, and the positional information which is used in the test writing that generated the smaller jitter is selected to obtain the write pulse conditions.

The recording control methods disclosed in Patent Document No. 3, Patent Document No. 4, and Patent Document No. 5 use maximum likelihood decoding methods, rather than utilizing the jitters in the reproduced signal, in order to pre-estimate a signal pattern from a reproduced signal waveform. While comparing the reproduced signal waveform and the estimated signal waveform, the reproduced signal is converted by decoding into decoded data which has a signal path of the maximum likelihood. This method is used to optimize the recording parameters in recording of information such that the probability of occurrence of errors in the process of maximum likelihood decoding is minimized.

In recent years, the higher densities of optical disc media cause the lengths of record marks to come closer to the optical resolution limit, so that increase in intersymbol interference and deterioration in SNR (Signal to Noise Ratio) become larger.

The system margin can be maintained by using a higher-order PRML method. For example, Non-Patent Document No. 1 discloses that, under the circumstances where the optical system is such that the laser wavelength is 405 nm and the NA (Numerical Aperture) of the objective lens is 0.85 and the recording density is such that a Blu-ray Disc (BD) with the diameter of 12 cm has the capacity of 25 GB (Giga Byte) per data recording layer, the system margin can be secured by employing the PR (1, 2, 2, 1) ML method. This document also discloses that, in the case where the linear density is increased by decreasing the mark length in order to secure a storage capacity of 25 GB or larger (e.g., 30 GB or 33.4 GB) per data recording layer while the same optical system is used, it is necessary to employ the PR(1,2,2,2,1)ML method.

Patent Document No. 6, Patent Document No. 7 and Patent Document No. 8 disclose optimizing various recording parameters by adjusting the write pulse waveform based on the quality of composite data in accordance with the PR(1,2, 2,2,1)ML method in the case of a high recording density optical disc medium of 30 GB to 33.4 GB per data recording layer.

CITATION LIST

Patent Literature

Patent Document No. 1: Japanese Laid-Open Patent Publication No. 2004-362748
Patent Document No. 2: Japanese Laid-Open Patent Publication No. 2000-200418
Patent Document No. 3: Japanese Laid-Open Patent Publication No. 2004-335079
Patent Document No. 4: Japanese Laid-Open Patent Publication No. 2004-63024
Patent Document No. 5: Japanese Laid-Open Patent Publication No. 2008-159231
Patent Document No. 6: Japanese Laid-Open Patent Publication No. 2007-317334
Patent Document No. 7: Japanese Laid-Open Patent Publication No. 2008-33981
Patent Document No. 8: the specification of United States Patent Application Publication No. 2008/0159104

Non-Patent Literature

Non-Patent Document No. 1: Illustrated Blu-ray Disc Reader, Ohmsha, Ltd.

SUMMARY OF INVENTION

Technical Problem

However, the techniques described in the above documents entail various problems as described below.

First, in a level determination method as described in Patent Document No. 2 in which "0" and "1" in a reproduced signal are determined relative to the slice level, the amplitude of the reproduced signal is very small in the reproduction from a mark or pit sufficiently smaller than the light spot diameter. Therefore, signals reproduced from short marks and short spaces occur near the slice level and are therefore susceptible to noise or intersymbol interference, resulting in frequent determination errors in the level determination.

Second, in the case of edge position adjustment of record marks which is performed using a high-order PRML method of high reproducibility as described in Patent Document No. 3, Patent Document No. 4, and Patent Document No. 5, high density recording at the recording density of 30 GB to 33.4 GB per data recording layer is not successful under the recording conditions where the SN ratio (SNR) is maximum, resulting in reduction of the recording and reproduction margins in the whole optical disc system.

Third, in the recording compensation methods described in Patent Document No. 6, Patent Document No. 7 and Patent Document No. 8, write pulse adjustment is only performed on positional information corresponding to the combination of the mark length of an interested mark and the space length of a space with the succeeding interested mark, or the combination of the mark length of an interested mark and the space length of a space with the preceding interested mark. These methods are not applicable to mark lengths which are beyond the optical resolution that depends on the mark size and the light spot size.

As described above, none of the above conventional techniques is capable of forming or reading marks with sufficient accuracy in the case of high density recording which is beyond the optical resolution. As a result, sufficient data recording layer density and reliability cannot be realized.

One of the objects of the present invention is to provide an optical recording method and optical recording/reproduction apparatus capable of precise compensation for thermal interference and optical intersymbol interference during recording in or reproduction from an optical disc medium.

Another one of the objects of the present invention is to improve the system margin of an optical disc medium. Specifically, in the case of high linear density recording where the shortest mark length is approximately 0.124 μm to 0.111 μm, as is the case with a Blu-ray Disc (BD) with the diameter of 12 cm and the capacity of 30 GB or 33.4 GB per data recording layer, and such an optical system is used that the wavelength is 405 nm and the NA (Numerical Aperture) of the objective lens is 0.85, adaptive compensation is made on the write pulse conditions of an interested mark according to the length of the preceding or/and succeeding space and the length of the preceding or/and succeeding mark, based on reproduced information which is maximum likelihood decoded using the PR(1,2,2,2,1)ML method, with the view of reducing optical intersymbol interference or thermal interference which can cause adverse effects in high density recording, such that high quality record marks are formed, and the system margin of the optical disc medium is improved.

Solution to Problem

According to an optical recording method of the present invention, an optical disc medium is irradiated with a modulated write pulse train of laser light variable over a plurality of power levels such that a plurality of marks are formed on the optical disc medium, edge positions of each of the marks and a space between adjacent two of the marks being utilized for recording of the information. The method includes the steps of: encoding record data to generate encoded data which is a combination of marks and spaces; classifying the encoded data according to a combination of a mark length of a mark, a space length of a first space with the succeeding mark, and a space length of a second space with the preceding mark; generating a write pulse train for forming the mark, in which at least one of a leading end edge position, a trailing end edge position, and a pulse width of the write pulse train is changed according to a result of the classification; and irradiating the optical disc medium with the generated write pulse train to form the plurality of marks on the optical disc medium.

The step of classifying may include classifying the encoded data according to a combination of a mark length of a shortest mark, the space length of the first space, and the space length of the second space.

The step of classifying may include classifying the encoded data according to a combination of the following conditions: the mark length of the mark; whether the space length of the first space is "n" or "n+1 or longer"; and whether the space length of the second space is "n" or "n+1 or longer", where n is a shortest space length.

When the combination for the classification is a combination of the mark length of the mark, the space length of the first space and the space length of the second space, the step of classifying may include classifying the first space into any of predetermined M space length classes (M is an integer equal to or greater than 1), and classifying the second space into any of predetermined N space length classes (N is an integer equal to or greater than 1, and MN). The step of classifying may include classifying the encoded data by space length into four space length classes for the first space, "n", "n+1", "n+2", and "n+3 or longer", and two space length classes for the second space, "n" and "n+1 or longer", where n is a shortest space length, and the step of generating may include changing the leading end edge position of the write pulse train according to the result of the classification.

The step of classifying may include classifying the encoded data by space length into two space length classes for the first space, "n" and "n+1 or longer", and four space length classes for the second space, "n+1", "n+2", and "n+3 or longer", where n is a shortest space length, and the step of generating may include changing the trailing end edge position of the write pulse train according to the result of the classification.

The step of classifying may include classifying the encoded data by space length into four space length classes for the first space, "n", "n+1", "n+2", and "n+3 or longer", and two space length classes for the second space, "n" and "n+1 or longer", where n is a shortest space length, and the step of generating may include changing the pulse width of the write pulse train according to the result of the classification.

The step of classifying may include, if the mark length of the mark is longer than a shortest mark length, classifying the encoded data according to at least any one of a combination of the mark length and the first space length and a combination of the mark length and the second space length.

The optical recording method further includes the steps of: generating an analog signal from the optical disc medium and generating a digital signal from the analog signal; reshaping a waveform of the digital signal; maximum likelihood decoding the reshaped digital signal based on a PRML (Partial Response Maximum Likelihood) method; generating a binary signal which represents a result of the maximum likelihood decoding; and detecting a shift amount in the waveform of the reshaped digital signal based on the reshaped digital signal and the binary signal. The step of generating the write pulse train may include changing, based on a result of the detection of the shift amount, at least one of the leading end edge position, the trailing end edge position, and the pulse width of the write pulse train for the formation of the plurality of marks.

The step of detecting may include detecting the shift amount in the waveform of the digital signal by a comparison of the encoded data and the binary signal, and the step of generating the write pulse train may include changing at least one of the leading end edge position, the trailing end edge position, and the pulse width of the write pulse train.

The step of generating the write pulse train may include changing a position of at least one of first to third pulse edges counted from the leading end and first to third pulse edges counted from the trailing end according to the result of the classification.

The following formula preferably holds:

$$ML < \lambda/NA \times 0.26$$

where $\lambda$ is a wavelength of the laser light, NA is a numerical aperture of an objective lens, and ML is a shortest mark length.

The shortest mark length ML is preferably 0.128 μm or less.

The laser light wavelength λ is preferably in the range of 400 nm to 410 nm, and the NA is preferably in the range of 0.84 to 0.86.

An optical recording apparatus of the present invention is configured to record information by irradiating an optical disc medium with a modulated write pulse train of laser light variable over a plurality of power levels such that a plurality of marks are formed on the optical disc medium, edge positions of each of the marks and a space between adjacent two of the marks being utilized for recording of the information. The apparatus includes: an encoding section configured to encode record data to generate encoded data which is a combination of marks and spaces; a classification section configured to classify the encoded data according to a combination of a mark length of a mark, a space length of a first space with the succeeding mark, and a space length of a second space with the preceding mark; a recording waveform generating section configured to generate the write pulse train for forming the mark in which at least one of a leading end edge position, a trailing end edge position, and a pulse width of the write pulse train is changed according to the result of the classification; and a laser driving section configured to irradiate the optical disc medium with the generated write pulse train to form the plurality of marks on the optical disc medium.

The optical recording apparatus may further include: a PRML processing section configured to receive a digital signal generated from an analog signal reproduce from an optical disc medium, to reshape a waveform of the digital signal, and to maximum likelihood decode the reshaped digital signal based on a PRML (Partial Response Maximum Likelihood) method; a shift detecting section configured to detect a shift amount in the waveform of the digital signal based on a binary signal which represents a result of the maximum likelihood decoding and the reshaped digital signal; and a recording compensation section configured to change, based on a result of the detection of the shift amount, at least one of the leading end edge position, the trailing end edge position, and the pulse width of the write pulse train for the formation of the plurality of marks.

A master-manufacturing exposure apparatus of the present invention is configured to record information by irradiating an optical disc medium which is a resist-coated material disc with a modulated write pulse train of laser light variable over a plurality of power levels such that a plurality of marks are formed on the optical disc medium, edge positions of each of the marks and a space between adjacent two of the marks being utilized for recording of the information. The apparatus includes: an encoding section configured to encode record data to generate encoded data which is a combination of marks and spaces; a classification section configured to classify the encoded data according to a combination of a mark length of a mark, a space length of a first space with the succeeding mark, and a space length of a second space with the preceding mark; a recording waveform generating section configured to generate the write pulse train for forming the mark in which at least one of a leading end edge position, a trailing end edge position, and a pulse width of the write pulse train is changed according to a result of the classification; and a laser driving section configured to irradiate the optical disc medium with the generated write pulse train to form the plurality of marks on the optical disc medium.

There is provided an optical disc medium in which information is to be recorded based on the above-described optical recording method, wherein the optical disc medium contains information about the classification in a predetermined area.

There is provided a method for manufacturing an optical disc medium in which information is to be recorded based on the above-described optical recording method, the method including the step of forming a predetermined area in which information about the classification is to be recorded.

There is provided a method for reproducing information from an optical disc medium in which the marks are to be recorded based on the above-described optical recording method, the method including the step of reproducing the information by irradiating the optical disc medium with laser light.

Advantageous Effects of Invention

As described above, according to the optical recording method of the present invention, each mark which is to be recorded is classified according to the mark length of the mark and the lengths of its preceding and succeeding spaces or/and the lengths of marks preceding and succeeding the spaces. The positions of pulse edges of a write pulse train for recording of each mark are changes according to a result of the classification, whereby a write pulse signal is controlled. This enables precise control of the leading end position or trailing end position of a mark which is to be formed on a track of the optical disc medium. Specifically, the leading end position and the trailing end position of the mark can be strictly controlled with a consideration for optical intersymbol interference or thermal interference which can cause adverse effects in high density recording at a linear density that is beyond the OTF (Optical Transfer Function) limit that depends on the shortest mark length and the light spot diameter. This increases the reliability of the recording and reproduction operations, so that high-density, high-capacity recording media can be realized while the sizes of the information recording apparatus and the recording media can be decreased.

More specifically, in the case of high linear density recording where the shortest mark length is approximately 0.124 μm to 0.111 μm, as is the case with a Blu-ray Disc (BD) with the diameter of 12 cm and the capacity of 30 GB or 33.4 GB per data recording layer, and such an optical system is used that the laser wavelength is 405 nm and the NA (Numerical Aperture) of the objective lens is 0.85, the write pulse conditions of the recording/reproduction apparatus are determined based on information reproduced using the PR(1,2,2,2,1)ML method such that intersymbol interference or thermal interference which can cause adverse effects in high density recording is compensated for. As a result, high quality record marks can be formed, and the system margin of the optical disc medium can be improved.

Considering the effects of heat on the preceding and succeeding spaces, the anterior-side pulse edges of laser irradiation pulses, such as dTF1 and dTF2, are susceptible to heat from the preceding space that is one of the spaces closer to these pulse edges. In other words, the record mark is susceptible to thermal interference according to the length of the preceding space. In an extended recording compensation method of the present invention, a shortest mark (2T) is recorded with recording compensation being made according to the lengths of the preceding and succeeding spaces. In the case of changing the anterior-side pulse edges, such as dTF1 and dTF2, pulse width TF2 between dTF1 and dTF2, or pulse width TE2 between dTE2 and dTE3, thermal interference can be decreased more effectively by making the recording compensation in such a manner that the number of classes for the recording compensation as to the length of the preceding space is larger than the number of classes for the recording compensation as to the length of the succeeding space. Also, by decreasing the number of classes of the length of the succeeding space, the total number of classes in the recording compensation table can be decreased. Thus, increases in LSI complexity can be avoided, and the efforts in learning in the recording learning process can be reduced.

Considering the effects of heat on the preceding and succeeding spaces, the posterior-side pulse edges of laser irradiation pulses, such as dTE1 and dTE2, are susceptible to heat from the succeeding space that is one of the spaces closer to these pulse edges. In other words, the record mark is susceptible to thermal interference according to the length of the succeeding space. In an extended recording compensation method of the present invention, a shortest mark (2T) is recorded with recording compensation being made according to the lengths of the preceding and succeeding spaces. In the case of changing the posterior-side pulse edges, such as dTE1 and dTE2, thermal interference can be decreased more effectively by making the recording compensation in such a manner that the number of classes for the recording compensation as to the length of the succeeding space is larger than the number of classes for the recording compensation as to the length of the preceding space. Also, by decreasing the number of classes of the length of the preceding space, the total number of classes in the recording compensation table can be decreased. Thus, increases in LSI complexity can be avoided, and the efforts in learning in the recording learning process can be reduced.

By arranging the classification for the space length of a space with a succeeding interested mark and the space length of a space with the preceding interested mark by the combination of two classes, "shortest space length (n)" and "space length longer than the shortest space length (n+1 or longer)", the thermal interference can be decreased more effectively. If the space with the preceding interested mark or with the succeeding interested mark is a space of the shortest space length (n), a mark preceding or succeeding the interested mark is closer, so that the interested mark is particularly susceptible to heat from the preceding or succeeding mark. In view of such, the classification is arranged by the combination of two classes, "shortest space length (n)" and "space length longer than the shortest space length (n+1 or longer)", and different adjustment amounts are allocated to the case of "shortest space length (n)" and the case of "space length longer than the shortest space length (n+1 or longer)", so that more precise adjustment is possible in the case of the shortest space length (n). As a result, the thermal interference can be reduced more effectively.

BRIEF DESCRIPTION OF DRAWINGS

FIG. 10 illustrates examples of values set for the write pulse conditions according to an embodiment of the present invention.

FIG. 12 illustrates examples of values set for the write pulse conditions according to an embodiment of the present invention.

FIG. 13 illustrates examples of values set for the write pulse conditions according to an embodiment of the present invention.

FIG. 19 illustrates other examples of values set for the write pulse conditions according to an embodiment of the present invention.

FIG. 20 is a diagram which illustrates an example of a PR equalization ideal waveform shown in Table 1 and the relationship between the waveform and a recorded mark according to an embodiment of the present invention.

FIG. 21 is a diagram which illustrates an example of a PR equalization ideal waveform shown in Table 2 and the relationship between the waveform and a recorded mark according to an embodiment of the present invention.

FIG. 22 is a diagram which illustrates an example of a PR equalization ideal waveform shown in Table 3 and the relationship between the waveform and a recorded mark according to an embodiment of the present invention.

DESCRIPTION OF EMBODIMENTS

Figure 1:
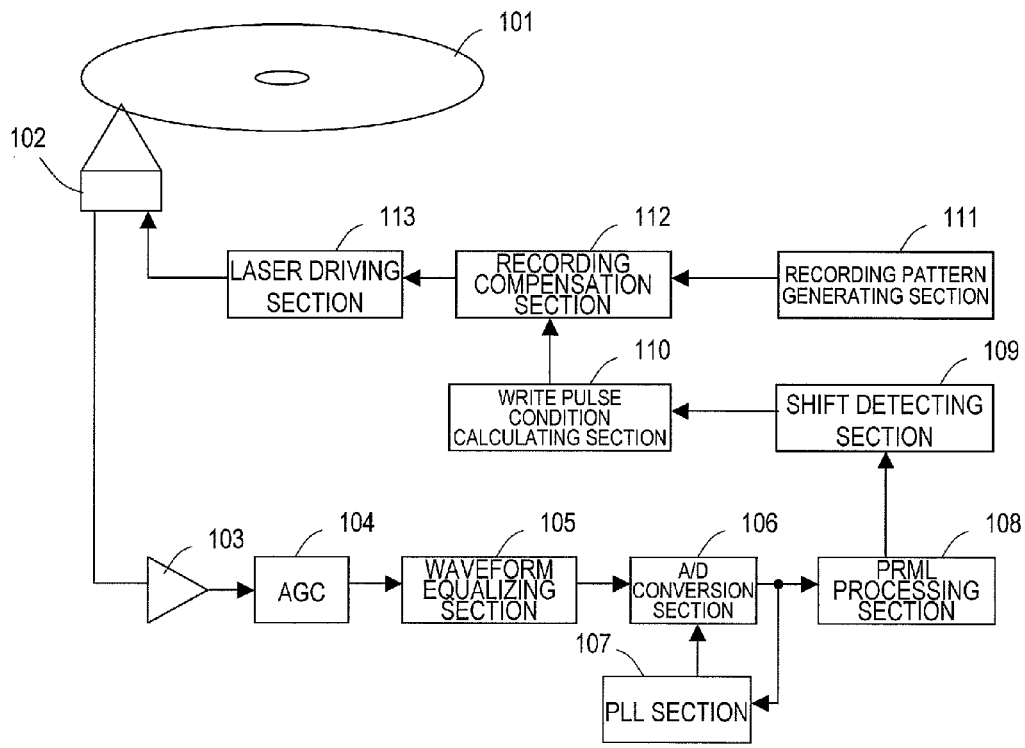
FIG. 1 is a diagram which illustrates an entire configuration of an optical information recording/reproduction device of an embodiment of the present invention.

Hereinafter, embodiments of the present invention are described with reference to the accompanying drawings. The embodiments are described with examples of a write-once, phase-change type optical disc medium (especially, BD-R (write-once Blu-ray Disc)) used as a recording medium. Note that this does not mean that the recording medium is limited to any particular type. The type of the recording medium is nonlimiting so long as it is of such a type that information is recorded by injecting energy into the recording medium to form marks or pits which have different physical properties from unrecorded part. For example, the techniques described herein are commonly applicable to rewritable optical disc media (e.g., BD-REs (rewritable Blu-ray Discs)). The techniques described herein are also commonly applicable to heat-mode recording on an inorganic resist coating, as is the case with a master-manufacturing exposure apparatus called a PTM (Phase Transition Mastering) apparatus that is employed for manufacture of a read-only disc consisting of a substrate with concavity/convexity pits and a reflection film formed thereover.

Examples of the major optical conditions and disc configuration employed in a recording method of the present invention are as follows:
  laser light: in the wavelength range of 400 nm to 410 nm, e.g., at 405 nm;
  objective lens: in the NA range of 0.84 to 0.86, e.g., NA=0.85;
  track pitch: 0.32 µm; thickness of cover layer on which laser is incident: 50 µm to 110 µm; shortest mark length of optical disc medium (2T): 0.111 µm to 0.124 µm, e.g., 0.111 µm (this also applies to the shortest space); and
  modulation method for modulation data which is to be recorded: 17PP modulation.

In the case of recording with such a line density that the aforementioned shortest mark length is 0.111 µm, the storage capacity per data recording layer of an optical disc medium with the diameter of 12 cm is approximately 33.4 GB. When this is applied to a 3-layer disc, the total storage capacity of the disc is approximately 100 GB. When this is applied to a 4-layer disc, the total storage capacity of the disc is approximately 134 GB. The description below is provided on the assumption that the shortest mark length is 0.111 µm. Strictly, this value is 0.11175 µm, which is ¾ of the shortest mark length of BDs, 0.1490 µm. Note that the concept of the present invention is not limited to this value.

In the case of recording with such a line density that the shortest mark length is 0.116 µm, the storage capacity per data recording layer of an optical disc medium with the diameter of 12 cm is approximately 32 GB. When this is applied to a 3-layer disc, the total storage capacity of the disc is approximately 96 GB. When this is applied to a 4-layer disc, the total storage capacity of the disc is approximately 128 GB.

Under the same conditions, when the shortest mark length is 0.124 µm, the storage capacity per data recording layer is 30 GB. When this is applied to a 3-layer disc, the total storage capacity of the disc is approximately 90 GB. When this is applied to a 4-layer disc, the total storage capacity of the disc is approximately 120 GB.

The speed of recording is assumed to be, for example, twice that of a BD with the channel rate of 132 MHz (Tw=7.58 ns).

FIG. 1 shows an example of the entire configuration of an optical recording/reproduction device of the present invention. The optical recording/reproduction device includes a light emitting section 102, a preamplifying section 103, a waveform equalizing section 105, a PRML processing section 108, an edge shift detecting section 109, a write pulse condition calculating section 110, a recording pattern generating section 111, a recording compensation section 112, and a laser driving section 113. The functions of respective ones of these components are described in conjunction with a reproduction process and a recording process of the optical recording/reproduction device which will be described later.

Note that FIG. 1 shows an optical disc medium 101 which is an optical information recording medium, although the optical disc medium 101 may not be a constituent of the optical recording/reproduction device.

Figure 2:
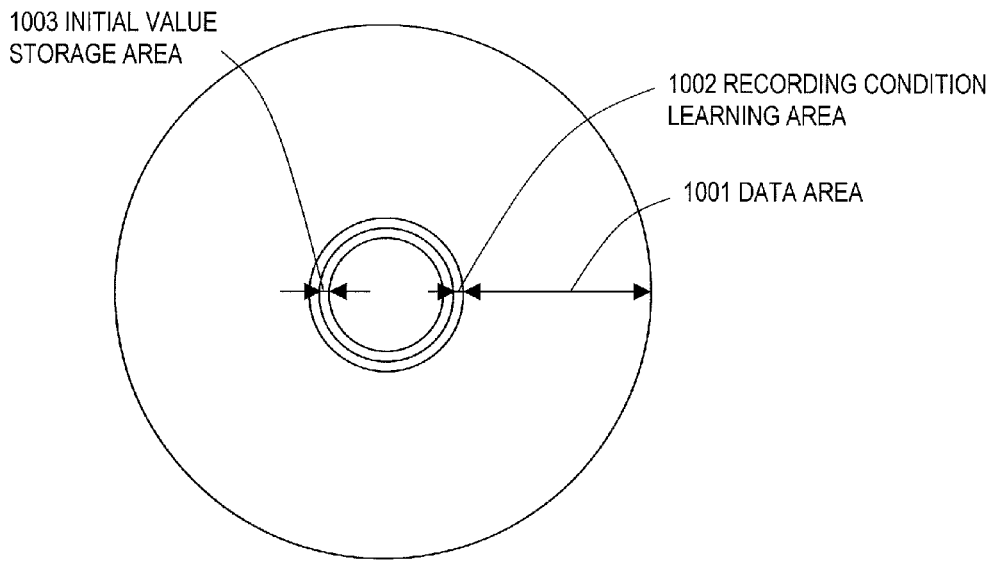
FIG. 2 is a diagram which illustrates a configuration of an optical information recording medium of an embodiment of the present invention.

FIG. 2 shows the data structure of the optical disc medium 101. The optical disc medium 101 includes, from the outer perimeter to the inner perimeter, a data area 1001, a recording condition learning area 1002 for learning of the recording conditions, and an initial value storage area 1003 on the inner side of the recording condition learning area.

The data area 1001 is an area used for a user to actually store data in the optical disc medium. The recording condition learning area 1002 is an area used for test recording which is carried out before actual recording of data in the user area for correction of errors in recording power and write pulse conditions which would be caused due to startup or temperature variation. The initial value storage area 1003 is a read-only area which contains information preset to each disc, such as recommended values for the recording power, recommended values for the write pulse conditions, the linear velocity of recording, the disc ID, etc. These pieces of information are recorded in the form of a molded structure on the disc substrate using, for example, directions of track wobbling as a recording unit.

Hereinafter, the process of reproducing data from the optical disc medium 101 is described.

The light emitting section 102 is, for example, an optical pickup including a laser diode (LD) that is configured to emit a light beam onto the optical disc medium 101.

The optical pickup emits a light beam output from the laser diode onto a surface of an optical disc medium and receives reflected light. The received light is converted by a photodetector to an electric signal which is an analog reproduction signal. The analog reproduction signal is converted to a digital signal by the preamplifying section 103, an AGC section 104, the waveform equalizing section 105, and an A/D conversion section 106. The digital signal is sampled by a PLL (Phase Locked Loop) section 107 in clock cycles. The digital signal is input to the PRML (Partial Response Maximum Likelihood) processing section 108. The PRML processing section 108 includes a maximum likelihood decoding section, for example, a Viterbi decoding section, which is configured to maximum likelihood decode the digital signal to generate a binary signal that represents a result of the maximum likelihood decoding. The binary signal is input to a shift detecting section 109.

Next, the process of recording data in an optical disc medium is described. In a recording (writing) operation, the pattern generating section 111 outputs an arbitrary code sequence in the form of an NRZI (Non Return to Zero Inversion) signal. The write pulse condition calculating section 110 establishes the write pulse conditions in the recording compensation section 112 according to a calculation result. The laser driving section 113 drives the laser diode provided inside the light emitting section 102 according to a signal of write pulse train that is converted based on the NRZI signal to record data at desired positions on the optical disc medium with varying recording power of the laser light.

Figure 3:
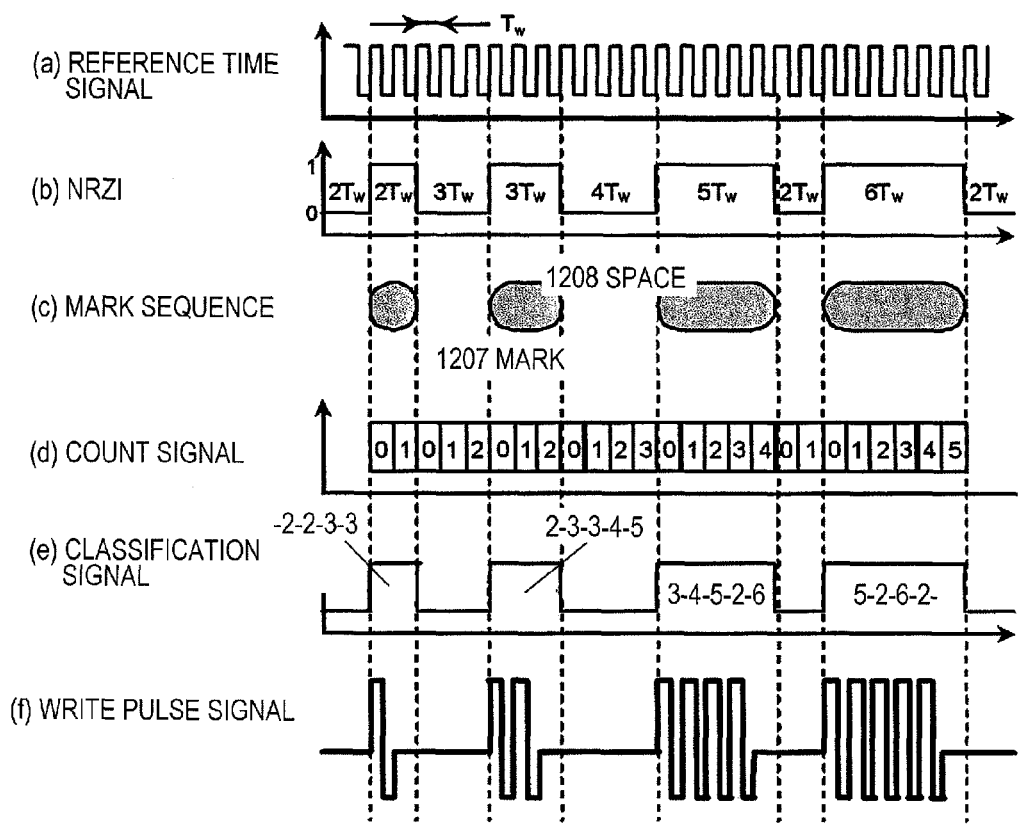
FIG. 3 is a timing chart regarding a recording method of an embodiment of the present invention.

FIGS. 3(a)-(f) are charts that illustrate marks and spaces of a record code sequence, and an example of a write pulse train generating operation for recording the marks and spaces in this optical recording/reproduction device. FIG. 3(a) shows a waveform of a reference time signal 1201 which serves as a time reference for the recording operation. The reference time signal 1201 is a pulse clock with a period of Tw. FIG. 3(*b*) shows an NRZI (Non Return to Zero Inverted) signal which is a record code sequence generated by the recording pattern generating section 111. Here, Tw is a detection window width which is the minimum unit of changes in mark length and space length in the NRZI 1202.

FIG. 3(*c*) shows an image of marks and spaces actually recorded on the optical disc medium. The spot of the laser light scans the marks and spaces of FIG. 3(*c*) from left to right. For example, a mark 1207 corresponds to "1"-level in the NRZI signal 1202 on a one-on-one basis and is formed so as to have a length proportional to that period.

FIG. 3(*d*) shows a count signal 1204. The count signal 1204 counts the time from the leading ends of the mark 1207 and the space 1208 by the units of Tw.

FIG. 3(*e*) is a schematic diagram of a classification signal 1205 in the pulse condition calculating section 110. In this example, encoded data is classified according to a combination of five values, including the mark length of each mark, the space lengths of spaces with the preceding and succeeding mark, and the mark lengths of marks with the preceding space and succeeding space. Here, the encoded data refers to record data which is encoded by a combination of marks and spaces. As for the classification, for example, "3-4-5-2-6" in FIG. 3(*e*) means that: a mark of runlength 5Tw has a preceding 4Tw space; there is a mark of runlength 3Tw with the preceding 4Tw space; the mark of runlength 5Tw has a succeeding 2Tw space; and there is a mark of runlength 6Tw with the preceding 2Tw space. Note that Tw is sometimes abbreviated as "T", e.g., "2T", "3T". The space length is sometimes identified by suffix "s", e.g., "4Ts". The mark length is sometimes identified by suffix "m", e.g., "2Tm".

FIG. 3(*f*) shows the waveform of a write pulse signal which corresponds to the NRZI signal 1202 of FIG. 3(*b*). This waveform is an example of an optical waveform which is actually recorded. The write pulse signal 1206 is generated with reference to the count signal 1204, the NRZI signal 1202, the classification signal 1205, and a recording compensation table data output from the write pulse condition calculating section 110.

Note that, in this embodiment, the classification signal of FIG. 3(*e*) is classified according to a combination of the five values, including the mark length of each mark, the space lengths of spaces with the preceding and succeeding mark, and the mark lengths of marks with the preceding space and succeeding space. However, as in an example which will be described later, the classification can be arranged by the combination of three or four out of the five values including the mark length of each mark, the lengths of spaces immediately preceding and succeeding the mark, and the mark lengths of marks with the preceding space and succeeding space.

Figure 4:
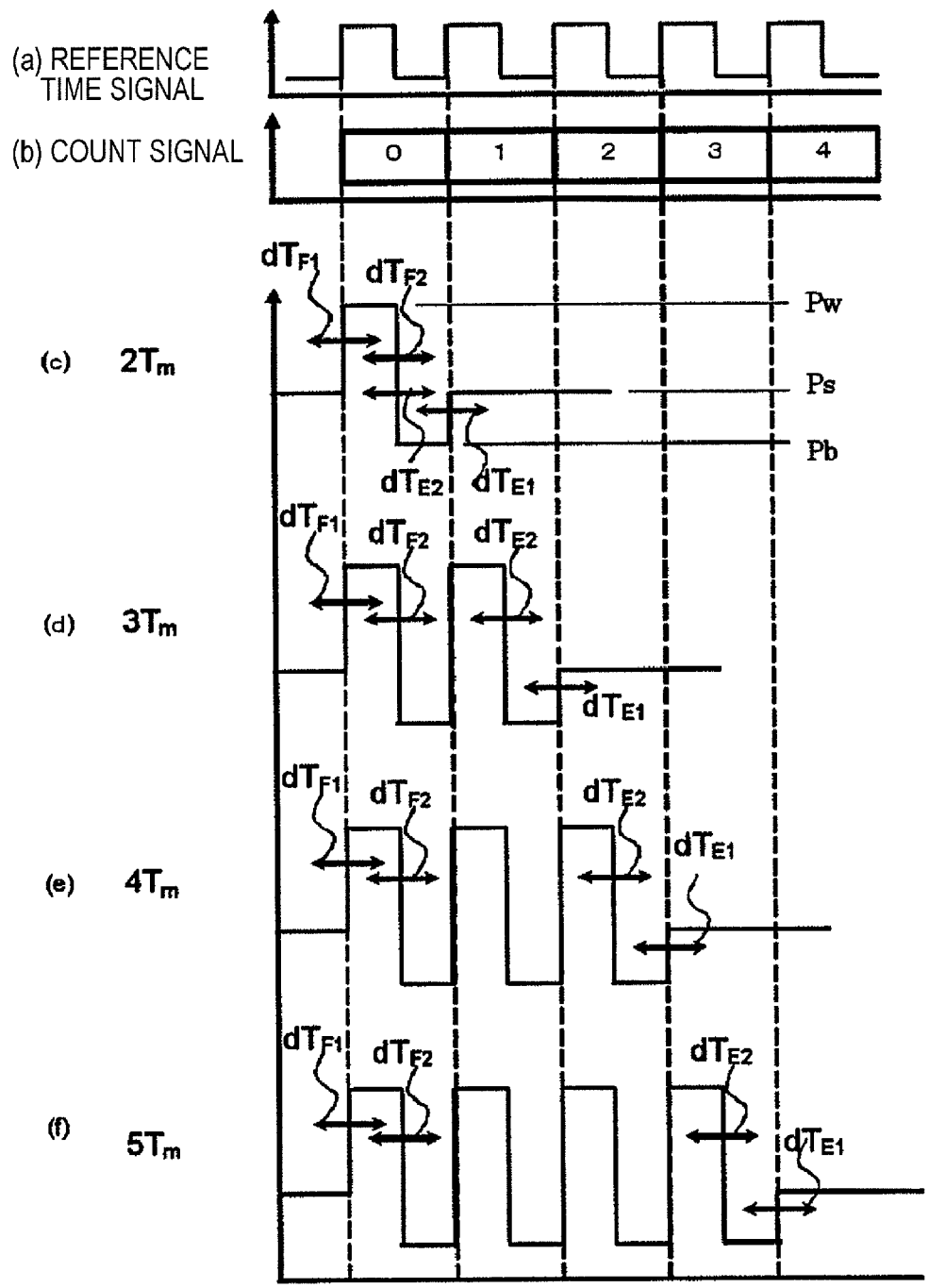
FIG. 4 is a timing chart which illustrates the relationship between the mark lengths and the waveforms of the write pulse train according to an embodiment of the present invention.

Next, a recording compensation method in the optical recording/reproduction device of the present embodiment is described. FIGS. 4(*a*)-(*f*) are diagrams generally illustrating the relationship between the mark length and the waveform of the write pulse signal 1206. FIG. 4(*a*) shows the waveform of the reference time signal 1201 which serves as the time reference in the recording operation. As previously described, the period of the reference time signal 1201 is Tw. FIG. 4(*b*) shows the count signal 1204 which is generated by a counter. The count signal 1204 counts the time from the leading end of the mark by the units of reference time Tw. The timings at which the count signal transitions to 0 correspond to the leading ends of marks or spaces.

FIGS. 4(*c*)-(*f*) show examples of the waveform of the write pulse signal 1206 during the formation of record marks. The level of the write pulse signal 1206 is modulated among three values, the peak power (Pw) which is the highest level, the space power (Ps) which is a level for irradiation of space intervals, and the bottom power level (Pb) which is the lowest level. After the trailing end pulse, a cooling pulse is formed at the bottom power level.

In FIGS. 4(*c*)-(*f*), the vertical axis represents the power level at the time of laser emission, and the horizontal axis represents time.

Note that, although in this example the power level is modulated among three values, the cooling power level (Pc) which is taken for the cooling pulse that succeeds the trailing end pulse and the bottom power level (Pb) for an intermediate pulse may have different levels, such that the power level can be modulated among four values in total. The bottom power level may be between the space power level and the peak power level although in FIG. 4 the bottom power level is lower than the space power level. Although in the case of a write-once optical disc medium the power level for irradiation of the space intervals is referred to as "space power", the power level is sometimes referred to as "erase power (Pe)" because erasure of previously-recorded marks in a rewritable optical disc medium by means of spaces is realized by erasing the recorded marks using the power for the space intervals.

In FIGS. 4(*c*)-(*f*), the write pulse signal for the 4Tw mark includes one intermediate pulse. However, as the mark length (code length) increases by the units of 1Tw, e.g., 5Tw, 6Tw, and so on, the number of intermediate pulses accordingly increases one by one.

A pulse which includes N−1 peak power level pulses as shown as an example in FIG. 4 is utilized for recording of a mark with mark length N. Such a pulse is referred to as a so-called N−1 type write pulse. However, an N−2 type pulse, an N/2 type pulse, a so-called castle-type write pulse which includes an intermediate power level between the two peak power levels, or a so-called L-type write pulse in which the second peak power level of the castle type is equal to the intermediate power level may be utilized. As a matter of course, the description presented below is applicable to these cases.

Figure 5:
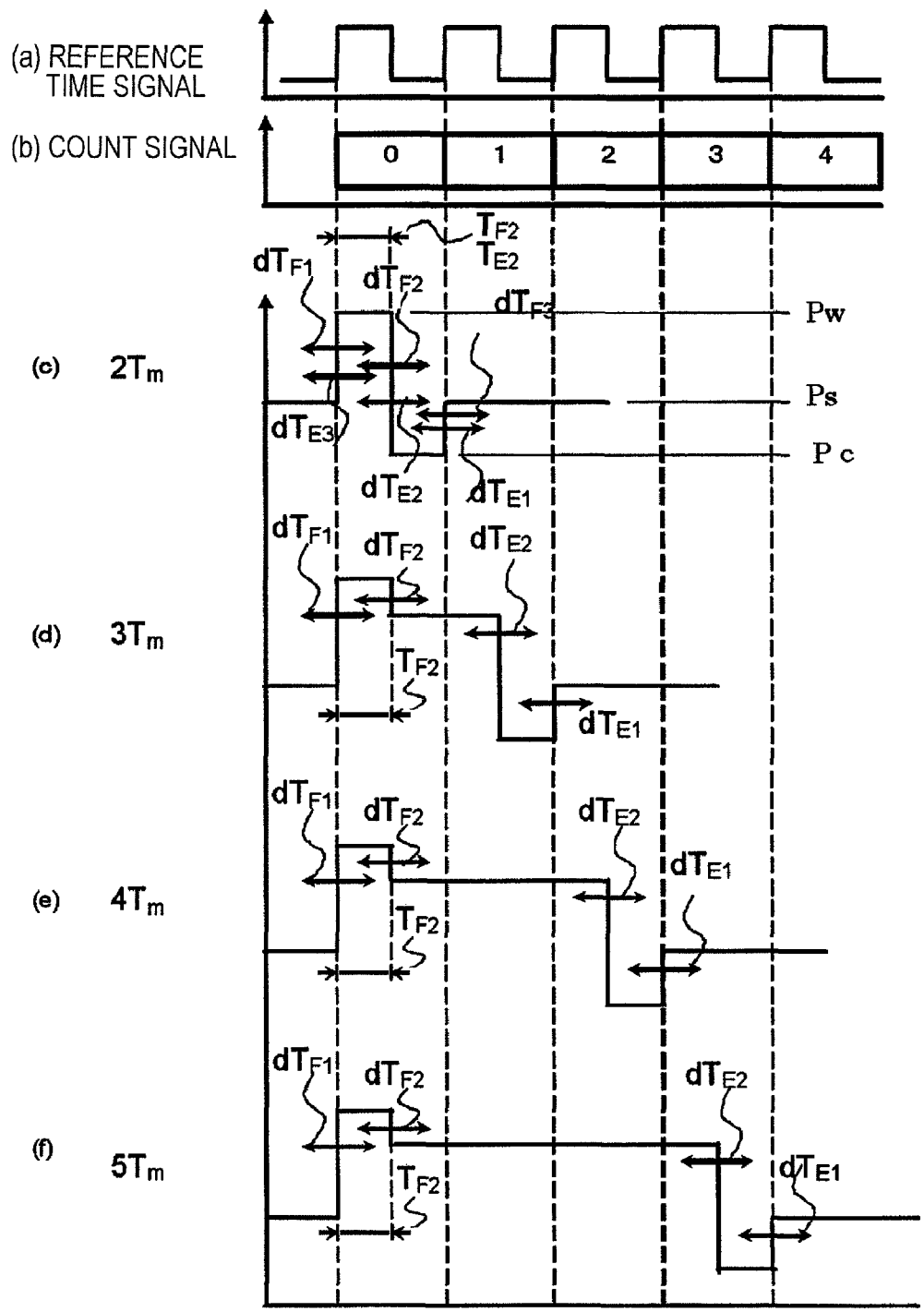
FIG. 5 is another timing chart which illustrates the relationship between the mark lengths and the waveforms of the write pulse train according to an embodiment of the present invention.

An example of the L-type write pulse is now described. FIGS. 5(*a*)-(*f*) are diagrams generally illustrating the relationship between the mark length and the waveform of the write pulse signal 1206. FIG. 5(*a*) shows the waveform of the reference time signal 1201 which serves as the time reference in the recording operation. The period of the reference time signal 1201 is Tw. FIG. 5(*b*) shows the count signal 1204 which is generated by a counter. The count signal 1204 counts the time from the leading end of the mark by the units of reference time Tw. The timings at which the count signal transitions to 0 correspond to the leading ends of marks or spaces.

FIGS. 5(*c*)-(*f*) show examples of the waveform of the write pulse signal 1206 during the formation of record marks. The level of the write pulse signal 1206 is modulated among four values, the peak power (Pw) at the highest level, the intermediate power (Pm) at an intermediate power level, the space power (Ps) at a level for irradiation of space intervals, and the cooling power level (Pc) at the lowest level.

The intermediate power level may be lower than the space power level although it is higher than the space power level in FIG. 5. Although in the case of a write-once optical disc medium the power level for irradiation of the space intervals is referred to as "space power", the power level is sometimes referred to as "erase power (Pe)" because erasure of previously-recorded marks in a rewritable optical disc medium by means of spaces is realized by erasing the recorded marks using the power for the space intervals.

The adaptive recording compensation of the present invention uses a recording compensation table in which each mark is classified according to the combination of: the mark length of an interested mark for which a write pulse train is generated; and the lengths of spaces with the preceding interested mark and succeeding interested mark; and/or the lengths of marks immediately succeeding and preceding the spaces. And, a write pulse signal is generated in which the position of the first or second pulse edge counted from an end of a write pulse train for recording of each mark is changed according to a result of the classification by edge change amount dTF1, dTF2 or/and dTE1, dTE2. In this way, the leading end position or trailing end position of a mark is precisely controlled in the formation of the mark on the optical disc medium for recording of information. Thus, the leading end position or trailing end position of the mark can be controlled more precisely with consideration for optical intersymbol interference and thermal interference as compared with a conventional classification method where each mark is only classified according to the length of the mark and the length of a space with the succeeding mark in terms of the leading end edge and according to the length of the mark and the length of a space with the preceding mark in terms of the trailing end edge.

Specifically, the classification in the recording compensation table is arranged such that, if an interested mark has the length of 2T (shortest mark) and the length of a space with the succeeding interested mark is 2T (shortest space), the interested mark is further classified according to the length of a mark that immediately precedes the immediately preceding space. And, a write pulse signal is generated in which the position of the first, second, or third pulse edge counted from an end of a write pulse train for recording of each mark is changed according to a result of the classification by edge change amount dTF1, dTF2, dTF3 or/and dTE1, dTE2, dTE3. This is more effective in precisely controlling the leading end position or trailing end position of the mark in the formation of the mark on the optical disc medium for recording of information.

Likewise, the classification in the recording compensation table is arranged such that, if an interested mark has the length of 2T (shortest mark) and the length of a space with the preceding mark is 2T (shortest space), the interested mark is further classified according to the length of a mark that immediately succeeds the space. And, a write pulse signal is generated in which the position of the first, second, or third pulse edge counted from an end of a write pulse train for recording of the mark is changed according to a result of the classification by edge change amount dTF1, dTF2, dTF3 or/and dTE1, dTE2, dTE3. This is more effective in precisely controlling the leading end position or trailing end position of the mark in the formation of the mark on the optical disc medium for recording of information.

As previously described, in the case where the shortest mark (2T) and the shortest space (2T) consecutively occur, the recording compensation is made with classification by the lengths of the preceding and succeeding marks into the classes of "shortest mark length (2T)" and "longer than 2T", so that the number of classes for the recording compensation can be decreased. Also, the optical intersymbol interference and thermal interference can effectively be removed without increasing the complexity of the LSI configuration. Note that, in the case where the shortest 2T mark and the shortest 2T space consecutively occur, the recording compensation may be made with consideration for at least one of the mark length of the mark that precedes the preceding space and the mark length of the mark that succeeds the succeeding space.

The recording/reproduction device of the present invention uses an optical pickup which includes a semiconductor laser with the laser wavelength of 405 nm and an objective lens of NA=0.85 and in which the laser power for reproduction is set to 1 mW. The disc configuration is a 3-layer optical disc medium including three data recording layers counted from the incident side of laser, on and from respective ones of which information is recordable and reproducible. Therefore, in the case where the effective spot diameter of the laser during reproduction is the diameter of an area equal to $1/e^2$ of the peak intensity of the Gaussian beam, the effective spot diameter is represented as $0.82\times(\lambda/NA)$, which is approximately 0.39 μm. Thus, in such an optical system, record marks including the shortest marks of 0.111 μm are beyond the optical resolution limit at which the optical spot is capable of identifying marks.

The reproduction signal amplitude of a signal reproduced from a recorded mark using a light beam decreases as the recorded mark becomes shorter, and reaches 0 at the optical resolution limit. The inverse of this recorded mark is the spatial frequency.

Figure 6:
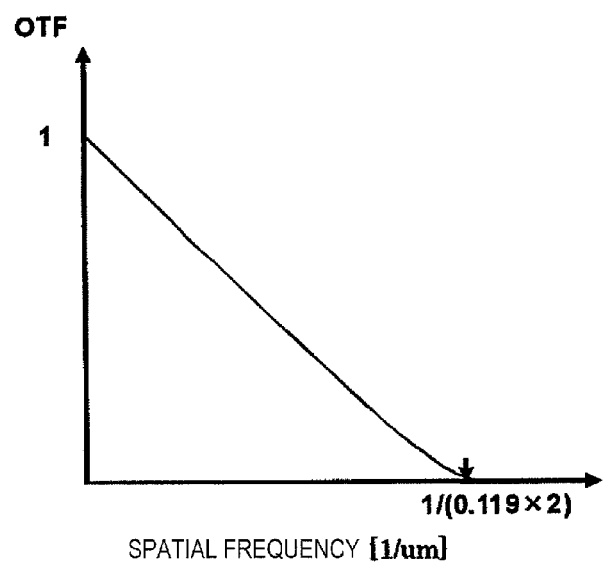
FIG. 6 is a graph which illustrates the relationship between OTF and the spatial frequency in an optical system according to an embodiment of the present invention.

The relationship between the spatial frequency and the signal amplitude is referred to as an OTF (Optical Transfer function). The signal amplitude linearly decreases as the spatial frequency increases. The limit at which the signal amplitude reaches 0 is referred to as OTF cutoff frequency. The OTF-spatial frequency relationship in the above-described optical system is illustrated in FIG. 6. In the case of the above-described optical system, the cutoff cycle of OTF is calculated from wavelength λ and NA of the objective lens, which is $\lambda/NA \times 0.5$. Specifically, when λ=405 nm and NA=0.85, the cutoff cycle is 0.237 μm. The shortest mark length is a half of the cutoff cycle, i.e., 0.1185 μm. When the shortest mark length is 0.111 μm or 0.116 μm, recorded marks having a spatial frequency higher than the cutoff frequency are included, where marks can be optically reproduced up to the cutoff frequency. Therefore, reproduction and recording are difficult. The limit of the cutoff frequency varies due to variations in the optical pickup, deformation of the record mark, the mark shape, etc. When considering the other conditions than the specific numerical values of the present embodiment (λ=405 nm, NA=0.85) under which the maximum spot size is achieved, for example, the laser wavelength of 410 nm, the objective lens NA=0.84, and the error of 5% due to the above-described variations, ½ of the cutoff cycle of OTF is $\lambda/NA \times 0.26 = 0.128$ μm. Therefore, in recording of or reproduction from a mark of which the shortest mark length is approximately 0.128 μm or less, the optical intersymbol interference is non-negligible.

FIGS. 7(a) and (b) are schematic diagrams which illustrate the relationship between the effective spot diameter of the light beam and the physical size of the recorded marks. In FIGS. 7(a) and (b), the light spot 501 is a spot of light converged on the disc surface of the optical disc medium. The spot has a Gaussian beam shape with the diameter of 0.39 μm. FIGS. 7(a) and (b) also show recorded marks 502, 503, 504, 505, 506, and 507 which have different lengths. FIG. 7(a) illustrates the relationship between recorded marks whose shortest mark length (2T) is 0.111 μm and spaces. FIG. 7(b) illustrates the relationship between recorded marks whose shortest mark length (2T) is 0.149 μm and spaces. When applied to a BD with the diameter of 12 cm, the example of FIG. 7(a) is equivalent to the storage capacity of 33.4 GB, and the example of FIG. 7(b) is equivalent to the storage capacity of 25 GB.

Figure 7:
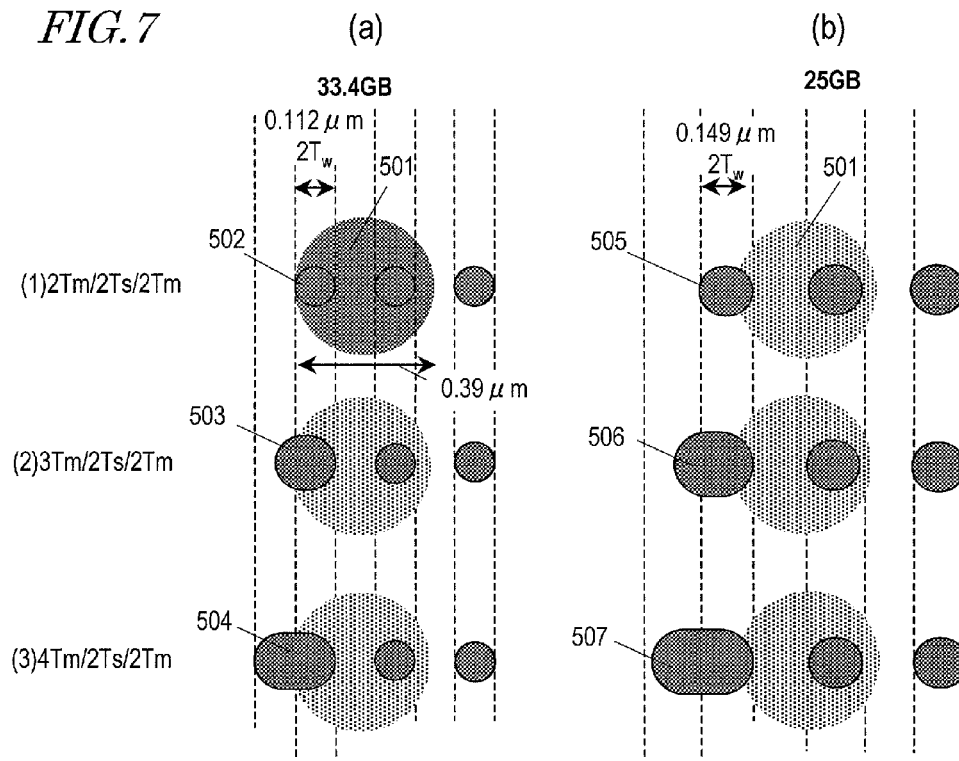
FIG. 7 is a schematic diagram which illustrates the relationship between the light spot diameter and the recorded marks according to an embodiment of the present invention.

When the light spot passes across a 2T mark, the effective light beam spot diameter at the recording density of FIG. 7(*a*) (equivalent to 33.4 GB) is equivalent to approximately 7T. In the case where data is reproduced from a 2T space with the succeeding 2T mark and in the case where the length of a mark that immediately precedes the immediately preceding space is 2T or 3T or longer, the left side part of the light beam spot overlaps the immediately preceding mark, so that a reproduction signal is affected by the immediately preceding mark, resulting in occurrence of optical intersymbol interference. On the other hand, in reproduction from the same 2T mark, in the case where the immediately preceding space has the length of 2T, the recording density of FIG. 7(*b*) (equivalent to 25 GB) only leads to occurrence of optical intersymbol interference which depends on the space lengths of the immediately preceding and succeeding spaces. This is because the immediately preceding mark is outside the effective light beam spot diameter of the light spot, and therefore, the reproduction signal is not affected by the preceding mark. Also, in reproduction from a 2T mark, the same phenomenon occurs when the immediately succeeding space is a 2T space.

For the above reasons, in the case of a high density recording where the line density of record marks is equal to or beyond a certain value which is determined according to the relationship between the light beam spot diameter and the shortest mark length, an extended adaptive recording compensation where recording compensation is made according not only to the lengths of spaces immediately preceding and succeeding an interested mark but also to the lengths of marks immediately preceding and succeeding the spaces (this is an extended version of a conventional adaptive recording compensation where the pulse edges of the write pulse undergo adaptive compensation according to the mark length and the space length separately) is made such that not only thermal interference which can cause adverse effects in high density recording but also optical intersymbol interference can be compensated for. However, in the case where the extended adaptive recording compensation is made according to a combination of the lengths of not only the immediately preceding and succeeding spaces but also the preceding and succeeding marks, the number of classes for the recording compensation is enormous, and accordingly, the process of calculating the recording compensation conditions takes a long period of time. Also, there are other demerits, such as a more complicated LSI configuration.

In the extended recording compensation method for optical disc media according to the present invention, extended recording compensation is made according to the mark length of the immediately preceding or/and immediately succeeding marks only when the mark interval which is determined according to the relationship between the light spot diameter and the shortest mark length is equal to or greater than a predetermined value. More specifically, in the case where the shortest mark length is 0.111 μm, recording compensation of an interested mark is provided only when the space length of a space that immediately precedes or succeeds the interested mark is 2T, and the recording compensation values are changed according to whether the length of the immediately preceding or/and immediately succeeding mark is "2T" or "3T or longer". This arrangement enables reduction in the number of classes for the recording compensation and efficient removal of optical intersymbol interference.

Some types of optical disc media entail large effects of thermal interference due to diffusion of heat from the immediately preceding mark. In the case where the extensive recording compensation is applied to an optical disc medium in which such thermal interference from the preceding mark is large, the classification in the recording compensation table may be arranged by the lengths of the immediately preceding and succeeding spaces and the length of the mark that precedes the immediately preceding space. That is, the classification is arranged without consideration for the mark length of the succeeding mark, whereby the number of classes for the recording compensation can be decreased. Therefore, the LSI can be simplified, and the thermal interference can be efficiently removed.

When the thermal interference from the immediately preceding or succeeding mark is small, the classification in the recording compensation table may be arranged by the lengths of spaces immediately preceding and succeeding an interested mark as well as by the mark length of the preceding or succeeding mark. For example, the leading end edge of the write pulse train may be classified according to the length of an interested mark and the lengths of spaces immediately preceding and succeeding the interested mark. The trailing end edge of the write pulse train may be classified according to the length of an interested mark and the lengths of spaces immediately preceding and succeeding the interested mark.

In that classification procedure, the classification for the space length of a space with the succeeding interested mark and the space length of a space with the preceding interested mark is arranged by the combination of at least two classes, "shortest space length (n)" and "space length longer than the shortest space length (n+1 or longer)", whereby thermal interference can be reduced more effectively. When the space length of the space with the preceding or succeeding interested mark is the shortest length (n), the interval between the interested mark and a preceding or succeeding mark which is adjacent to the interested mark with the space interposed therebetween decreases. Accordingly, the interested mark becomes more susceptible to heat produced in the formation of the adjacent mark that precedes or succeeds the interested mark. In view of such, the classification is arranged by the combination of at least two classes, "shortest space length (n)" and "space length longer than the shortest space length (n+1 or longer)", and different adjustment amounts are allocated to the shortest space length (n) and the space length longer than the shortest space length (n+1 or longer). In the case of the shortest space length (n), the adjustment is carried out such that more precise adjustment is possible, and therefore, the thermal interference can be reduced more effectively. In any classification method, the number of classes for the recording compensation can be reduced, so that the LSI can be simplified, and the thermal interference can be efficiently removed.

Figure 8:
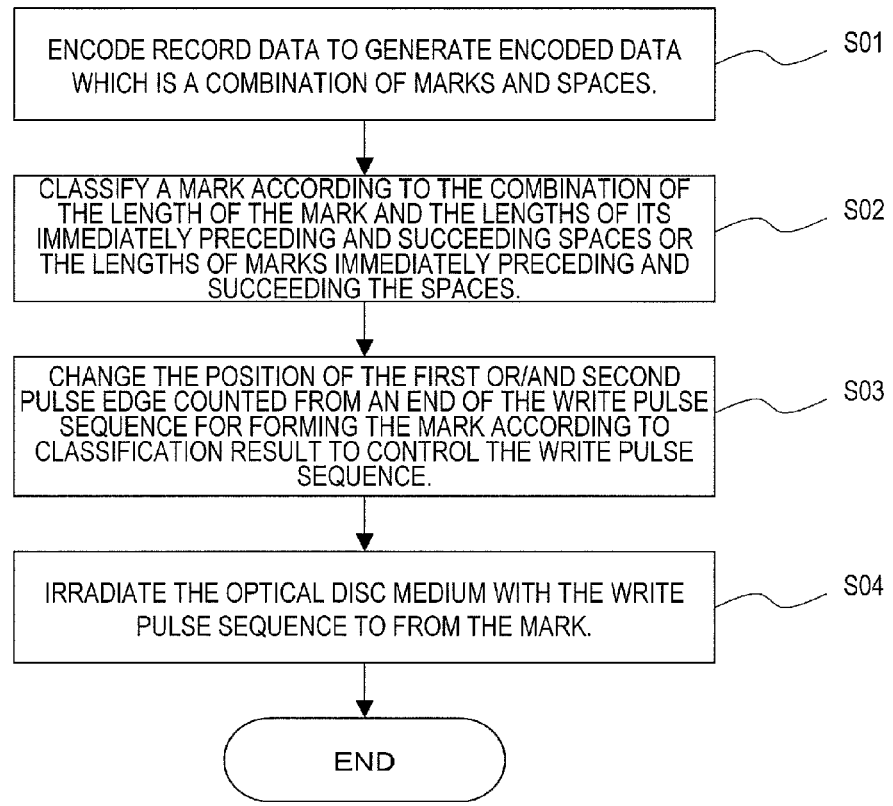
FIG. 8 is a flowchart of an optical recording method of an embodiment of the present invention.

Next, an extensive recording compensation method in the optical recording method of the present embodiment is described with reference to the flowchart of FIG. 8.

(a) First, record data is encoded to generate encoded data which is a combination of marks and spaces (S01). This encoded data corresponds to the NRZI signal 1202 of (b) of FIG. 3.

(b) As for a mark, the mark is classified according to the combination of the length of the mark, the lengths of spaces that immediately precede and succeed the mark, and the lengths of marks with the preceding space and succeeding space (S02). In (e) of FIG. 3, the 2T mark is "X-2-2-3-3", the 3T mark is "2-3-3-4-5", the 5T mark is "3-4-5-2-6", and the 6T mark is "5-2-6-2-X". Here, X represents a code lying outside the diagram and is actually a numeric character classified according to the code sequence. The values are aligned in the order of "the length of the preceding mark", "the length of the preceding space", "the mark length of the interested mark in recording compensation", "the length of the succeeding space", and "the length of the succeeding mark".

(c) The position of the first or/and second pulse edge counted from an end of the write pulse train for the formation of the mark is changed according to the result of the classification, whereby the write pulse train is controlled (S03). For example, in (c) to (f) of FIG. 4, the position of the first or/and second pulse edge counted from the leading end is shifted by edge change amount dTF1 or/and dTF2. Further, the position of the first or/and second pulse edge counted from the trailing end is changed by edge change amount dTE1 or/and dTE2.

(d) The optical disc medium is irradiated with the write pulse train such that the mark is formed (S04).

Figure 9:
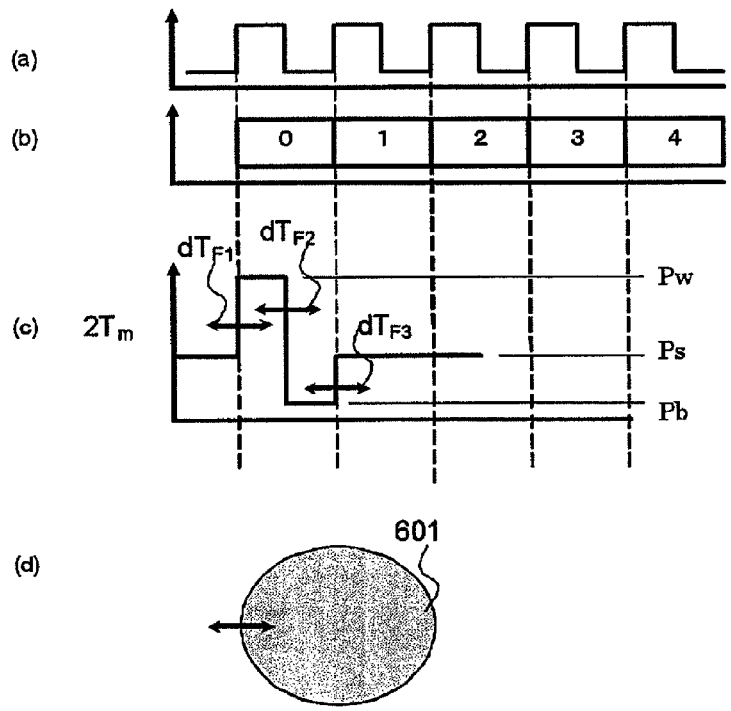
FIG. 9 is a diagram which illustrates an example of control of a write pulse train according to an embodiment of the present invention.

FIGS. 9(a) to (d) are diagrams generally illustrating recording of a mark 601 with the mark length of 2T under the circumstances where the positions of the first and second pulse edges counted from the leading end of the write pulse train are changed by edge change amounts dTF1 and dTF2. FIG. 9(a) shows the waveform of the reference time signal 1201 which serves as the time reference for the recording operation. FIG. 9(b) is the count signal 1204 generated by the counter. FIG. 9(c) shows the waveform of the write pulse signal 1206. In the write pulse signal 1206, the positions of the first and second pulse edges counted from the leading end are changed by edge change amounts dTF1 and dTF2. FIG. 9(d) shows an image of the mark 601 with the mark length of 2T which is recorded by means of the write pulse train of FIG. 9(c). The leading end position of the mark 601 can be precisely controlled using the write pulse train.

Edge change amounts dTF1 and dTF2 are defined based on a result of classification into any of a plurality of predetermined classes according to the mark length of a mark which is to be recorded, the lengths of the preceding and succeeding spaces, and the lengths of marks that precede and succeed the preceding and succeeding spaces, as in the classification tables shown in FIG. 10(a) and FIG. 10(c). FIG. 10(a) shows the move amounts of dTF1, dTF2, and dTF3 of the write pulse train. For example, "M3224" in the table defines the edge movement, which represents the edge move amount of the write pulse in recording of a 2T mark under the circumstances where the length of a space with the preceding 2T mark is 4T, the length of a space with the succeeding 2T mark is 2T, and the length of a mark with the succeeding space is 3T or longer. Here, as an example different from the values of the shown table, the values of dTF1, dTF2, and dTF3 may be different. FIG. 10(b) shows the move amounts of dTF1, dTF2, and dTF3 of the write pulse train. For example, "S4223" in the table defines the edge movement, which represents the edge move amount of the write pulse in recording of a 2T mark under the circumstances where the length of a space with the succeeding 2T mark is 4T, the length of a space with the preceding 2T mark is 2T, and the length of a mark that succeeds the succeeding space is 3T or longer. Here, as an example different from the values of the shown table, the values of dTF1, dTF2, and dTF3 may be different.

FIG. 10(c) shows the move amounts of dTF1, dTF2, and dTF3 of the write pulse train. For example, "M32222" in the table defines the edge movement. Specifically, it represents the edge move amount of the write pulse in recording of a 2T mark under the circumstances where the length of a space with the preceding 2T mark is 2T, the length of a mark that immediately succeeds the succeeding space is 2T, the length of a space with the succeeding 2T mark is 2T, and the length of a mark that immediately precedes the preceding space is 3T or longer. Here, as an example different from the values of the shown table, the values of dTF1, dTF2, and dTF3 may be different.

FIG. 10(d) shows the move amounts of dTF1, dTF2, and dTF3 of the write pulse train. For example, "S22223" in the table defines the edge movement. Specifically, it represents the edge move amount of the write pulse in recording of a 2T mark under the circumstances where the length of a space with the succeeding 2T mark is 2T, the length of a mark that immediately precedes the preceding space is 2T, the length of a space with the preceding 2T mark is 2T, and the length of a mark that immediately succeeds the succeeding space is 3T or longer. Here, as an example different from the values of the shown table, the values of dTF1, dTF2, and dTF3 may be different.

Especially in the case of FIG. 10(c) and FIG. 10(d), the classification in the recording compensation table is arranged such that, if an interested mark is 2T (shortest mark) and the length of a space immediately preceding or succeeding the interested mark is 2T (shortest space), the interested mark is classified according to whether the length of a mark that precedes or succeeds the immediately preceding or succeeding space is "2T" or "longer than 2T". A write pulse signal is generated in which the position of the first, second, or third pulse edge counted from an end of the write pulse train for recording of each mark is changed according to a result of the classification by edge change amount dTF1, dTF2, dTF3 or/and dTF1, dTF2, dTF3. Using such an arrangement to precisely control the leading end position or trailing end position of a mark which is to be formed on the optical disc medium in recording of the mark is more effective.

Also, the classification in the recording compensation table is arranged such that, if an interested mark is 3T or longer (a mark other than the shortest mark), the interested mark is classified according to whether a space with the succeeding interested mark is a 2T space (shortest space), a 3T space, a 4T space, or a 5T or longer space. A write pulse signal is generated in which the position of the first, second, or third pulse edge counted from the leading end portion of the write pulse train for recording of each mark is changed according to a result of the classification by edge change amount dTF1, dTF2, dTF3. Using such an arrangement to precisely control the leading end position of a mark which is to be formed on the optical disc medium in recording of the mark is more effective.

The classification in the recording compensation table is also arranged such that, if an interested mark is 3T or longer (a mark other than the shortest mark), the interested mark is classified according to whether a space with the preceding mark is a 2T space (shortest space), a 3T space, a 4T space, or a 5T or longer space. A write pulse signal is generated in which the position of the first, second, or third pulse edge counted from the trailing end portion of the write pulse train for recording of each mark is changed according to a result of the classification by edge change amount dTF1, dTF2, or dTF3. Using such an arrangement to precisely control the trailing end position of a mark which is to be formed on the optical disc medium in recording of the mark is more effective.

As described above, when the shortest mark (2T) is immediately preceded or succeeded by the shortest space (2T), i.e., the shortest intervals (2T) consecutively occur, the recording compensation is made with classification by the lengths of the preceding and succeeding marks into the classes of "shortest mark length (2T)" and "longer than 2T". Therefore, the number of classes in the recording compensation can be decreased. The optical intersymbol interference or thermal interference can efficiently be removed without increasing the complexity of the LSI configuration.

Edge change amounts dTF1 and dTF2 are defined by 35 classes in total. Specifically, the mark length of a mark which is to be recorded has 4 classes, "2T", "3T", "4T", and "5T or longer", and the length of the preceding space has 4 classes, "2T", "3T", "4T", and "5T or longer". Further, under the circumstance where the preceding space is a 2T space, the length of the mark that precedes the preceding space has 2 classes, "2T" and "3T or longer". In the case of a 2T mark, the length of the succeeding space has 4 classes, "2T", "3T", "4T", and "5T or longer". Note that, herein, as for edge shift amounts dTF1, dTF2 and dTF3, there are 4 classes for the mark length, 4 classes for the length of the preceding space, and 2 classes for the length of the preceding mark, although the present invention is not limited to this example. For example, there may be 3 classes, 5 classes, or more than 5 classes for the mark length. There may be 2 classes, 3 classes, 5 classes, or more than 5 classes for the length of the preceding space. There may be 3 classes for the length of the preceding mark.

In a combination of mark and space lengths in the same class, edge change amounts dTF1 and dTF2 may have equal values. In this case, the pulse length of a peak power interval of the leading end pulse is fixed. Especially when recording is carried out with a write pulse signal in which the number of pulses at the peak power level is one, the recording position of the record mark can be shifted without changing the size of the record mark. Thus, the edge position can be adjusted more precisely. When recording is carried out with a write pulse signal in which the number of pulses at the peak power level is one, edge change amounts dTF1, dTF2, and dTF3 in a combination of mark and space lengths in the same class may have equal values where dTF3 is the edge change amount for the third pulse edge position counted from the leading end of the write pulse train. In this case, the write pulse train is recorded with an anterior or posterior shift while the shape of the write pulse train itself is kept unchanged. Further, the pulse time width of the cooling pulse can be fixed, and therefore, change in size or shift in position of the record mark, which would occur according to the time width of the cooling pulse as especially in rewritable recording media, can be prevented. Thus, the edge position can be adjusted more precisely. These edge change amounts dTF1 and dTF2 may be defined by, for example, the absolute time, such as M2222=0.5 nsec in FIG. 10(a). Alternatively, they may be defined based on the reference time signal, for example, in the form of a value which is an integral multiple of Tw/16. Alternatively, they may be defined in the form of a value which is a multiple of Tw/32.

As for a 2T mark, a 3T mark, a 4T mark, and a 5T or longer mark, one value may be held as a reference value for dTF1, dTF2, dTF3, dTE1, dTE2, dTE3, and a recording compensation value which depends on the length of the preceding or succeeding space or the length of the preceding or succeeding mark may be prepared as difference information for the aforementioned reference value for the respective mark lengths. With such an arrangement, especially when the recording compensation which depends on the length of the preceding or succeeding space or recording compensation which depends on the length of the preceding or succeeding mark is not provided, only the reference value for the respective mark lengths is read out, without reading out the difference information, so that the recording compensation value can be read out of the disc at a high rate. Also, the memory of a recording device can be saved, so that the configuration of the LSI can be simplified. Further, by recording the difference information, the number of bits of a recording compensation value which is to be recorded in the disc can be decreased.

As described above, the position of the first or/and second or/and third pulse edge counted from the leading end of the write pulse signal is changed by edge change amount dTF1, dTF2, dTF3, whereby the leading end position of the mark can be controlled more precisely. Further, the pulse edge is controlled according not only to the mark length of a mark which is to be recorded but also to the lengths of the preceding and succeeding spaces. In recording of a 2T mark, when the length of the preceding space is 2T, the pulse edge is controlled according to the length of the preceding mark. Therefore, in the case of performing high density recording which is beyond the limit of OTF, the leading end position of the mark 601 can precisely be controlled with consideration for thermal interference or optical intersymbol interference.

Figure 11:
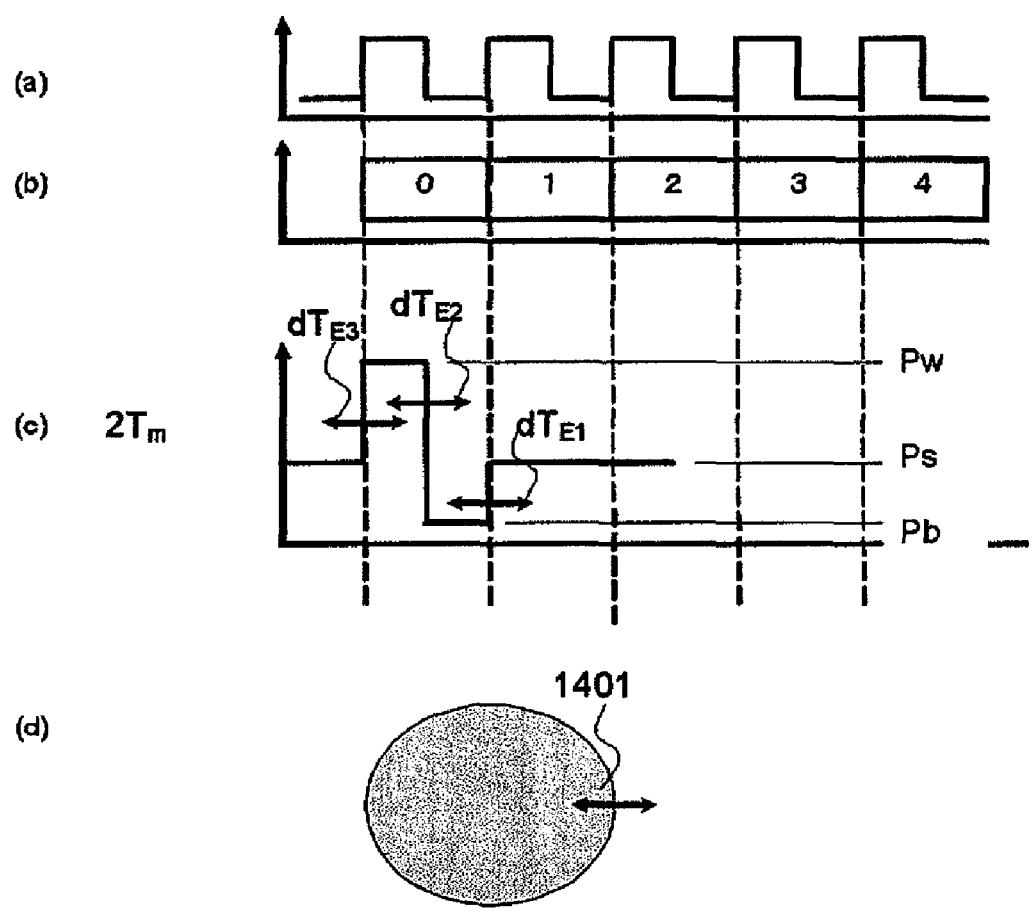
FIG. 11 is a diagram which illustrates another example of control of a write pulse train according to an embodiment of the present invention.

FIGS. 11(a) to (d) are diagrams generally illustrating recording of a mark 1401 with the mark length of 2T under the circumstances where the positions of the first, second, and third pulse edges counted from the trailing end of the write pulse train are changed by edge change amounts dTE1, dTE2, and dTE3, respectively. FIG. 11(a) shows the waveform of the reference time signal 1201 which serves as the time reference for the recording operation. FIG. 11(b) is the count signal 1204 generated by the counter. FIG. 11(c) shows the waveform of the write pulse signal 1406. In the count signal 1204, the positions of the first, second, and third pulse edges counted from the trailing end are changed by edge change amounts dTF1, dTF2, and dTE3. FIG. 11(d) shows an image of the mark 1401 with the mark length of 2T which is recorded by means of the write pulse train of FIG. 11(c). It is shown that the trailing end position of the mark 1401 can be precisely controlled using the write pulse train.

Edge change amounts dTE1, dTE2, and dTE3 are defined based on a result of classification made according to the mark length of a mark which is to be recorded, the lengths of the preceding and succeeding spaces, and the lengths of marks that precede and succeed the preceding and succeeding spaces as in the classification tables shown in FIG. 10(b) and FIG. 10(d).

As previously described in FIG. 3, the classification in the recording compensation table is arranged such that, if an interested mark is 2T (shortest mark) and the length of a space with the succeeding interested mark is 2T (shortest space), the interested mark is classified according to the mark length of a mark that precedes the immediately preceding space. The classification in the recording compensation table is also arranged such that, if an interested mark is 2T (shortest mark) and the length of a space with the preceding interested mark is 2T (shortest space), the interested mark is classified according to the mark length of a mark that succeeds the immediately succeeding space. And, a write pulse signal is generated in which the position of the edge of the write pulse train for recording of each mark is changed according to a result of the classification by edge change amount dTF1, dTF2, dTF3 or/and dTE1, dTE2, dTE3. And, the leading end position or trailing end position of the mark which is to be formed on the optical disc medium can be precisely controlled in recording of data.

More specifically, the classification is as shown in FIG. 12. As for dTF1 and dTF2, in recording of a 2T mark, the lengths of spaces preceding and succeeding the 2T mark have 4 classes, "2T", "3T", "4T", and "5T or longer". Under the circumstance where the length of the space that precedes or succeeds the 2T mark is 2T, the length of a mark that precedes or succeeds the preceding or succeeding space has two classes, "2T" and "3T or longer". That is, there are 25 classes in total (1 to 25). And, each is defined by information of 1 byte. In recording of a mark of 3T, 4T, or 5T or longer, the length of the preceding space has 4 classes, "2T", "3T", "4T", and "5T or longer". That is, there are 12 classes in total (26 to 37), and each is defined by information of 1 byte.

Likewise, dTE1 is defined such that, in recording of a 2T mark, the length of the succeeding space has 4 classes, "2T", "3T", "4T", and "5T or longer". Under the circumstance where the length of the succeeding space is 2T, the length of a mark that succeeds the succeeding space has 2 classes, "2T" and "3T or longer". That is, there are 10 classes in total (1 to 10). Each is defined by information of 1 byte. In recording of a mark of 3T, 4T, or 5T or longer, the length of the succeeding space has 4 classes, "2T", "3T", "4T", and "5T or longer". That is there are 12 classes in total (11 to 22). And each is defined by information of 1 byte.

Here, as for dTF1, dTF2, dTE1, and dTE2 of FIG. 12, in the case of an N−1 type write strategy shown in FIG. 4, dTF1 represents the information about the rising position of the leading end pulse, dTF2 represents the information about the falling position of the leading end pulse, dTE1 represents the information about the rising position of the cooling pulse, and dTE2 represents the information about the falling position of the trailing end pulse of a 3T or longer mark. Likewise, in the case of an L-type write strategy of FIG. 5, dTF1 represents the rising position of the leading end pulse, dTF2 represents the falling position of the leading end pulse, dTE1 represents the rising position of the cooling pulse, and dTE2 represents the falling position of the intermediate power of a 3T or longer mark. Although dTF2 is defined herein, for example, pulse width TF2 between dTF1 and dTF2 may be defined instead of dTF2. Likewise, although dTE2 is defined herein, for example, pulse width TE2 between dTE2 and dTE3 may be defined instead of dTE2.

In the case of small interference by the preceding and succeeding marks, the classification may be simplified as shown in FIG. 13. Specifically, as for dTF1 and dTF2, in recording of a 2T mark, the lengths of the preceding and succeeding spaces have 4 classes, "2T", "3T", "4T", and "5T or longer", i.e., there are 4×4=16 classes (1 to 16), and each is defined by information of 1 byte. In recording of a mark of 3T, 4T, or 5T or longer, the length of the preceding space has 4 classes, "2T", "3T", "4T", and "5T or longer", i.e., there are 12 classes in total (17 to 28), and each is defined by information of 1 byte.

Likewise, as for dTE1, in recording of a 2T mark, the length of the succeeding space has 4 classes, "2T", "3T", "4T", and "5T or longer", and the length of the preceding space has 2 classes, "2T" and "3T or longer". That is, there are 8 classes in total (1 to 8), and each is defined by information of 1 byte. In recording of a mark of 3T, 4T, or 5T or longer, the length of the preceding space has 4 classes, "2T", "3T", "4T", and "5T or longer". That is, there are 12 classes in total (9 to 20). And each is defined by information of 1 byte. As for dTE2, in recording of a mark of "3T", "4T", or "5T or longer", the length of the preceding space has 4 classes, "2T", "3T", "4T", and "5T or longer". That is, 12 classes in total (1 to 12), and each is defined by information of 1 byte.

These edge change amounts dTE1, dTE2 and dTE3 are defined with 4 classes for the mark length of a mark which is to be recorded, "2T", "3T", "4T", and "5T or longer", 4 classes for the length of the succeeding space, "2T", "3T", "4T", and "5T or longer", and under the circumstance where the succeeding space is a 2T space, 2 classes for the length of a mark that succeeds the succeeding space, "2T", "3T", "4T", and "5T or longer", and under the circumstance where it is a 2T mark, 4 classes for the length of the preceding space, "2T", "3T", "4T", and "5T or longer", i.e., 35 classes in total. Note that, herein, as for edge shift amounts dTE1, dTE2, and dTE3, there are 4 classes for the mark length, 4 classes for the length of the succeeding space, and 2 classes for the length of the succeeding mark, although the present invention is not limited to this example. For example, there may be 3 classes, 5 classes, or more than 5 classes for the mark length. There may be 2 classes, 3 classes, 5 classes, or more than 5 classes for the length of the succeeding space. There may be 3 classes for the length of the succeeding mark. It is also preferable that the length of the preceding space has 2 classes, "2T" and "3T or longer", while the length of the succeeding space also has 2 classes, "2T" and "3T or longer".

An example where the length of the succeeding space has two classes is now described. In this case, the length of the succeeding space only need to be generally categorized into the classes of "2T" or "3T or longer". This is clearly shown in FIG. 13 in which the "succeeding mark" ("S-mark") has two classes, "2T" and "3T or longer". As the value for "3T or longer" under the circumstances where "S-mark" is "2T" or "3T or longer", the values in the column of "3T space" of FIG. 13 can be utilized. Note that, in the descriptions of FIG. 13, the mark succeeding the 2T mark ("S-mark") has the mark of "X", which means "no definition" (Don't CARE), in both columns of "2T" and "3T or longer". However, this is just labeling of "X" as an example. It is to be grasped that the columns labeled with "X" are directed to determination as to whether the space that succeeds the 2T mark is "2T" or "3T or longer".

In a combination of mark and space lengths in the same class, edge change amounts dTE1, dTE2, and dTE3 may have equal values. In this case, the pulse length of a peak power interval of the leading end pulse is fixed. Especially when recording is carried out with a write pulse signal in which the number of pulses at the peak power level is one, the position of the record mark can be shifted without changing the size of the record mark. Thus, the edge position can be adjusted more precisely.

When recording is carried out with a write pulse signal in which the number of pulses at the peak power level is one, edge change amounts dTE2, dTE3, and dTE1 in the combination of mark and space lengths in the same class may have equal values where dTE1 is the first pulse edge position counted from the trailing end of the write pulse train. In this case, the write pulse train is recorded with an anterior or posterior shift while the shape of the write pulse train itself is kept unchanged. Further, the pulse time width of the cooling pulse can be fixed, and therefore, change in size or shift in position of the record mark, which would occur according to the time width of the cooling pulse as especially in rewritable recording media, can be prevented. Thus, the edge position can be adjusted more precisely.

These edge change amounts dTE2 and dTE3 may be defined by, for example, the absolute time, such as S2222=0.5 nsec in FIG. 10(b). Alternatively, they may be defined based on the reference time signal in the form of a value which is an integral multiple of Tw/16.

As described above, the position of the second or/and third or/and first pulse edge counted from the trailing end of the write pulse signal is changed by edge change amount dTE2, dTE3, dTE1, whereby the trailing end position of the mark can be controlled more precisely. Further, the pulse edge is controlled according not only to the mark length of a mark which is to be recorded but also to the lengths of the preceding and succeeding spaces. In recording of a 2T mark, when the length of the succeeding space is 2T, the pulse edge is controlled according to the length of a mark that succeeds the succeeding space. Therefore, in the case of performing high density recording which is beyond the limit of OTF, the trailing end position of the mark 1401 can precisely be controlled with consideration for thermal interference or optical intersymbol interference.

Although in the embodiment of the present invention the write pulse edge in recording of a 2T mark is controlled according to the lengths of marks that respectively precede and succeed the preceding and succeeding 2T spaces, a write pulse edge in recording of a 3T or longer mark may be adjusted according to the lengths of marks that respectively precede and succeed the preceding and succeeding 2T spaces. The write pulse edge adjustment may be carried out on a 3T or longer record mark simultaneously with adjustment of a 2T mark. With such an arrangement, in the case of performing high density recording which is beyond the limit of OTF, the leading or trailing end position of the record mark can precisely be controlled with consideration for thermal interference or optical intersymbol interference.

Next, a method for detecting a shift in a reproduction signal in order to provide the extended recording compensation in the shift detecting section 109 is described. First, an operation of Viterbi decoding based on a PR(1,2,2,2,1)ML method in the PRML processing section 108 is described.

Figure 14:
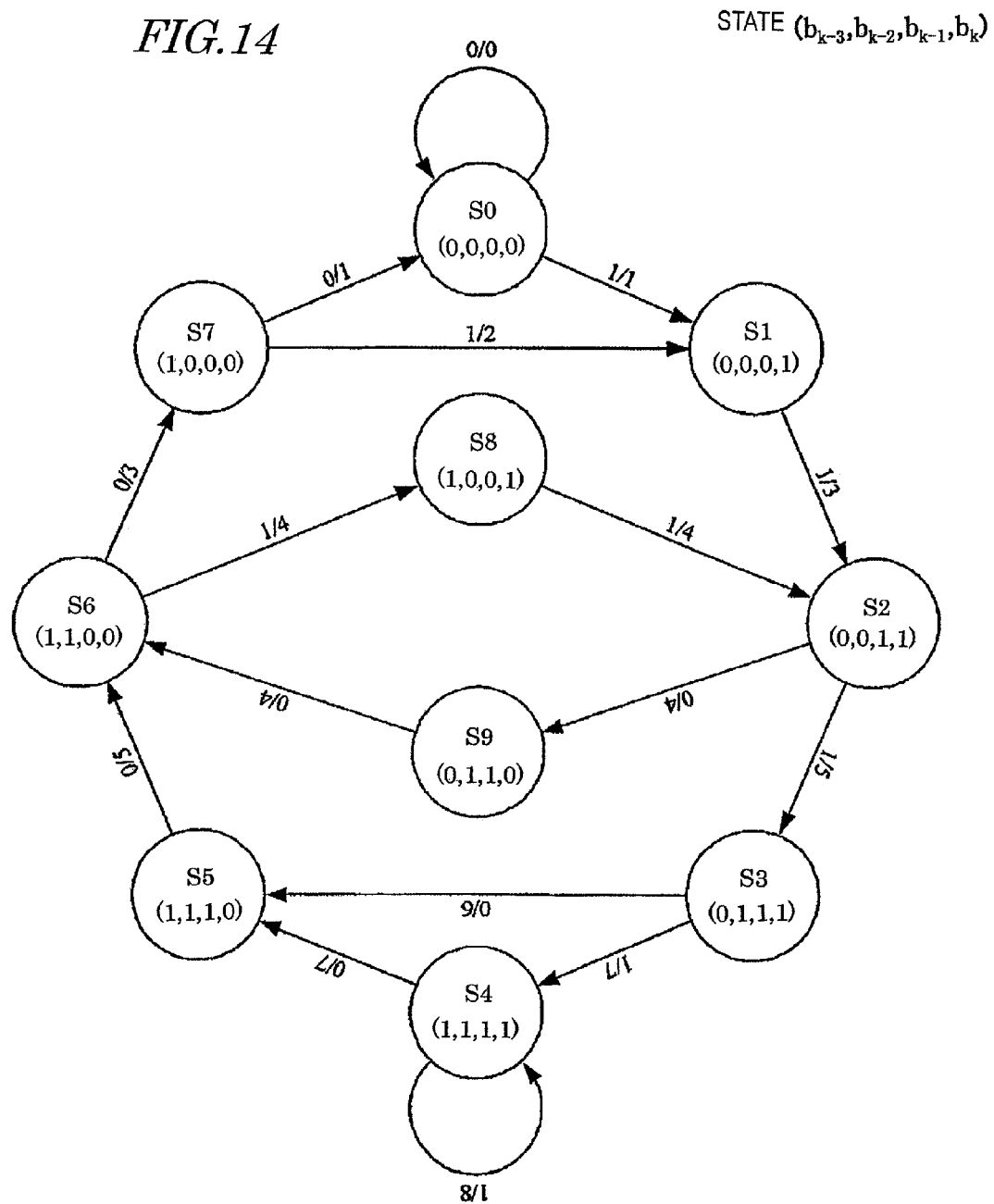
FIG. 14 is a diagram which illustrates state transition rules which are defined by RLL(1,7) record code and equalization method PR(1,2,2,2,1).

Signal processing in a reproduction system during reproduction from a high density optical disc medium according to the present invention employs a PR(1,2,2,2,1)ML method. The recording code used herein is a Run Length Limited code, such as RLL(1,7) code. The PR(1,2,2,2,1)ML is described with reference to FIG. 14 and FIG. 15. By combining PR(1,2,2,2,1)ML with RLL(1,7), the number of possible states of the decoding section is reduced to 10, the number of state transition paths becomes 16, and there are 9 reproduction levels. FIG. 14 is a state transition diagram commonly used in the description of PRML, showing state transition rules of PR(1,2,2,2,1)ML. Here, ten states are represented by identifying, at a certain point in time, a state S (0, 0, 0, 0) by S0, a state S (0, 0, 0, 1) by S1, a state S (0, 0, 1, 1) by S2, a state S (0, 1, 1, 1) by S3, a state S (1, 1, 1, 1) by S4, a state S (1, 1, 1, 0) by S5, a state S (1, 1, 0, 0) by S6, a state S (1, 0, 0, 0) by S7, a state S (1, 0, 0, 1) by S8, and a state S (0, 1, 1, 0) by S9, respectively, where "0" or "1" in the parentheses represents a signal sequence on the time axis and shows what state could be produced as a result of the next state transition from the current state. Also, this state transition diagram can be rearranged along the time axis into the trellis diagram as shown in FIG. 15.

Figure 15:
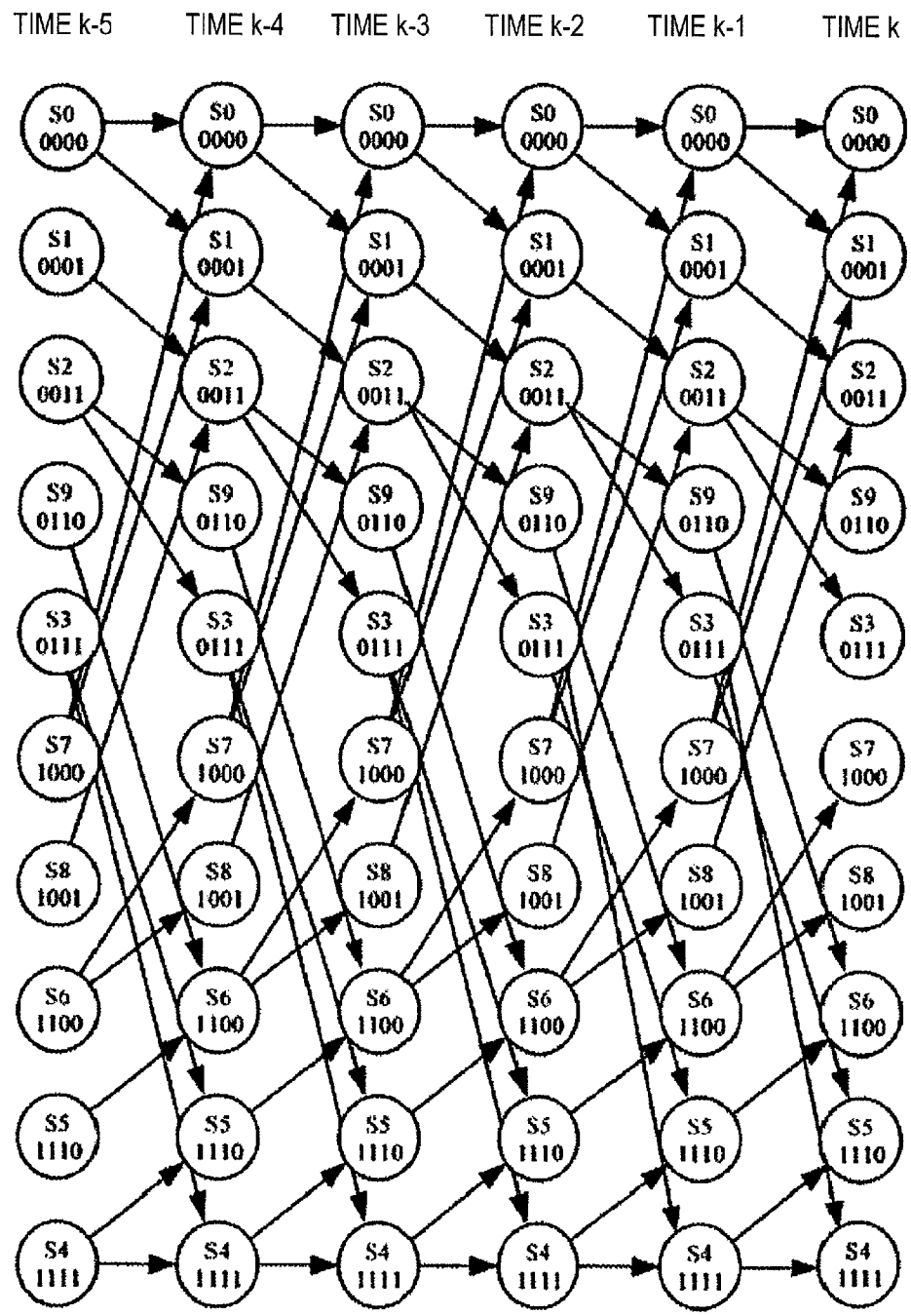
FIG. 15 shows a trellis diagram which corresponds to the state transition rules according to an embodiment of the present invention.

In the state transitions of PR(1,2,2,2,1)ML shown in FIG. 15, there are an infinite number of state transition patterns (i.e., combinations of states) that can take two state transition paths in making a transition from a particular state at a certain point in time into another particular state at the next point in time. If we pay attention to only patterns that are particularly likely to produce errors in a certain time range, the state transition patterns of PR(1,2,2,2,1)ML may be summarized as in the following Tables 1, 2 and 3:

TABLE 1

| STATE TRANSITION | RECORDING CODE $(b_{k-i}, \ldots, b_k)$ | k − 9 | k − 8 | k − 7 | k − 6 | k − 5 | k − 4 | k − 3 |
|---|---|---|---|---|---|---|---|---|
| $S0_{k-5} \rightarrow S6_k$ | (0, 0, 0, 0, 1, 1, 1, 0, 0) | | | | | S0 | S1 | S2 |
| | (0, 0, 0, 0, 0, 1, 1, 0, 0) | | | | | S0 | S0 | S1 |
| $S0_{k-5} \rightarrow S5_k$ | (0, 0, 0, 0, 1, 1, 1, 1, 0) | | | | | S0 | S1 | S2 |
| | (0, 0, 0, 0, 0, 1, 1, 1, 0) | | | | | S0 | S0 | S1 |
| $S0_{k-5} \rightarrow S4_k$ | (0, 0, 0, 0, 1, 1, 1, 1, 1) | | | | | S0 | S1 | S2 |
| | (0, 0, 0, 0, 0, 1, 1, 1, 1) | | | | | S0 | S0 | S1 |
| $S2_{k-5} \rightarrow S0_k$ | (0, 0, 1, 1, 1, 0, 0, 0, 0) | | | | | S2 | S3 | S5 |
| | (0, 0, 1, 1, 0, 0, 0, 0, 0) | | | | | S2 | S9 | S6 |
| $S2_{k-5} \rightarrow S1_k$ | (0, 0, 1, 1, 1, 0, 0, 0, 1) | | | | | S2 | S3 | S5 |
| | (0, 0, 1, 1, 0, 0, 0, 0, 1) | | | | | S2 | S9 | S6 |
| $S2_{k-5} \rightarrow S2_k$ | (0, 0, 1, 1, 1, 0, 0, 1, 1) | | | | | S2 | S3 | S5 |
| | (0, 0, 1, 1, 0, 0, 0, 1, 1) | | | | | S2 | S9 | S6 |
| $S3_{k-5} \rightarrow S0_k$ | (0, 1, 1, 1, 1, 0, 0, 0, 0) | | | | | S3 | S4 | S5 |
| | (0, 1, 1, 1, 0, 0, 0, 0, 0) | | | | | S3 | S5 | S6 |
| $S3_{k-5} \rightarrow S1_k$ | (0, 1, 1, 1, 1, 0, 0, 0, 1) | | | | | S3 | S4 | S5 |
| | (0, 1, 1, 1, 0, 0, 0, 0, 1) | | | | | S3 | S5 | S6 |
| $S3_{k-5} \rightarrow S2_k$ | (0, 1, 1, 1, 1, 0, 0, 1, 1) | | | | | S3 | S4 | S5 |
| | (0, 1, 1, 1, 0, 0, 0, 1, 1) | | | | | S3 | S5 | S6 |
| $S7_{k-5} \rightarrow S6_k$ | (1, 0, 0, 0, 1, 1, 1, 0, 0) | | | | | S7 | S1 | S2 |
| | (1, 0, 0, 0, 0, 1, 1, 0, 0) | | | | | S7 | S0 | S1 |
| $S7_{k-5} \rightarrow S5_k$ | (1, 0, 0, 0, 1, 1, 1, 1, 0) | | | | | S7 | S1 | S2 |
| | (1, 0, 0, 0, 0, 1, 1, 1, 0) | | | | | S7 | S0 | S1 |
| $S7_{k-5} \rightarrow S4_k$ | (1, 0, 0, 0, 1, 1, 1, 1, 1) | | | | | S7 | S1 | S2 |
| | (1, 0, 0, 0, 0, 1, 1, 1, 1) | | | | | S7 | S0 | S1 |
| $S6_{k-5} \rightarrow S6_k$ | (1, 1, 0, 0, 1, 1, 1, 0, 0) | | | | | S6 | S8 | S2 |
| | (1, 1, 0, 0, 0, 1, 1, 0, 0) | | | | | S6 | S7 | S1 |
| $S6_{k-5} \rightarrow S5_k$ | (1, 1, 0, 0, 1, 1, 1, 1, 0) | | | | | S6 | S8 | S2 |
| | (1, 1, 0, 0, 0, 1, 1, 1, 0) | | | | | S6 | S7 | S1 |
| $S6_{k-5} \rightarrow S4_k$ | (1, 1, 0, 0, 1, 1, 1, 1, 1) | | | | | S6 | S8 | S2 |
| | (1, 1, 0, 0, 0, 1, 1, 1, 1) | | | | | S6 | S7 | S1 |
| $S4_{k-5} \rightarrow S0_k$ | (1, 1, 1, 1, 1, 0, 0, 0, 0) | | | | | S4 | S4 | S5 |
| | (1, 1, 1, 1, 0, 0, 0, 0, 0) | | | | | S4 | S5 | S6 |
| $S4_{k-5} \rightarrow S1_k$ | (1, 1, 1, 1, 1, 0, 0, 0, 1) | | | | | S4 | S4 | S5 |
| | (1, 1, 1, 1, 0, 0, 0, 0, 1) | | | | | S4 | S5 | S6 |
| $S4_{k-5} \rightarrow S2_k$ | (1, 1, 1, 1, 1, 0, 0, 1, 1) | | | | | S4 | S4 | S5 |
| | (1, 1, 1, 1, 0, 0, 0, 1, 1) | | | | | S4 | S5 | S6 |

| STATE TRANSITION | k − 2 | k − 1 | k | PR EQUALIZATION IDEAL VALUE | | | EUCLIDEAN DISTANCE BETWEEN PATHS |
|---|---|---|---|---|---|---|---|
| $S0_{k-5} \rightarrow S6_k$ | S3 | S5 | S6 | 1 3 5 6 5 | | | |
| | S2 | S9 | S6 | 0 1 3 4 4 | | | 14 |

TABLE 1-continued

| | | | | | | | | | |
|---|---|---|---|---|---|---|---|---|---|
| $S0_{k-5} \to S5_k$ | S3 | S4 | S5 | 1 | 3 | 5 | 7 | 7 | |
| | S2 | S3 | S5 | 0 | 1 | 3 | 5 | 6 | 14 |
| $S0_{k-5} \to S4_k$ | S3 | S4 | S4 | 1 | 3 | 5 | 7 | 8 | |
| | S2 | S3 | S4 | 0 | 1 | 3 | 5 | 7 | 14 |
| $S2_{k-5} \to S0_k$ | S6 | S7 | S0 | 5 | 6 | 5 | 3 | 1 | |
| | S7 | S0 | S0 | 4 | 4 | 3 | 1 | 0 | 14 |
| $S2_{k-5} \to S1_k$ | S6 | S7 | S1 | 5 | 6 | 5 | 3 | 2 | |
| | S7 | S0 | S1 | 4 | 4 | 3 | 1 | 1 | 14 |
| $S2_{k-5} \to S2_k$ | S6 | S8 | S2 | 5 | 6 | 5 | 4 | 4 | |
| | S7 | S1 | S2 | 4 | 4 | 3 | 2 | 3 | 14 |
| $S3_{k-5} \to S0_k$ | S6 | S7 | S0 | 7 | 7 | 5 | 3 | 1 | |
| | S7 | S0 | S0 | 6 | 5 | 3 | 1 | 0 | 14 |
| $S3_{k-5} \to S1_k$ | S6 | S7 | S1 | 7 | 7 | 5 | 3 | 2 | |
| | S7 | S0 | S1 | 6 | 5 | 3 | 1 | 1 | 14 |
| $S3_{k-5} \to S2_k$ | S6 | S8 | S2 | 7 | 7 | 5 | 4 | 4 | |
| | S7 | S1 | S2 | 6 | 5 | 3 | 2 | 3 | 14 |
| $S7_{k-5} \to S6_k$ | S3 | S5 | S6 | 2 | 3 | 5 | 6 | 5 | |
| | S2 | S9 | S6 | 1 | 1 | 3 | 4 | 4 | 14 |
| $S7_{k-5} \to S5_k$ | S3 | S4 | S5 | 2 | 3 | 5 | 7 | 7 | |
| | S2 | S3 | S5 | 1 | 1 | 3 | 5 | 6 | 14 |
| $S7_{k-5} \to S4_k$ | S3 | S4 | S4 | 2 | 3 | 5 | 7 | 8 | |
| | S2 | S3 | S4 | 1 | 1 | 3 | 5 | 7 | 14 |
| $S6_{k-5} \to S6_k$ | S3 | S5 | S6 | 4 | 4 | 5 | 6 | 5 | |
| | S2 | S9 | S6 | 3 | 2 | 3 | 4 | 4 | 14 |
| $S6_{k-5} \to S5_k$ | S3 | S4 | S5 | 4 | 4 | 5 | 7 | 7 | |
| | S2 | S3 | S5 | 3 | 2 | 3 | 5 | 6 | 14 |
| $S6_{k-5} \to S4_k$ | S3 | S4 | S4 | 4 | 4 | 5 | 7 | 8 | |
| | S2 | S3 | S4 | 3 | 2 | 3 | 5 | 7 | 14 |
| $S4_{k-5} \to S0_k$ | S6 | S7 | S0 | 8 | 7 | 5 | 3 | 1 | |
| | S7 | S0 | S0 | 7 | 5 | 3 | 1 | 0 | 14 |
| $S4_{k-5} \to S1_k$ | S6 | S7 | S1 | 8 | 7 | 5 | 3 | 2 | |
| | S7 | S0 | S1 | 7 | 5 | 3 | 1 | 1 | 14 |
| $S4_{k-5} \to S2_k$ | S6 | S8 | S2 | 8 | 7 | 5 | 4 | 4 | |
| | S7 | S1 | S2 | 7 | 5 | 3 | 2 | 3 | 14 |

TABLE 2

| STATE TRANSITION | RECORDING CODE $(b_{k-i}, \ldots, b_k)$ | k − 9 | k − 8 | k − 7 | k − 6 | k − 5 | k − 4 | k − 3 |
|---|---|---|---|---|---|---|---|---|
| $S0_{k-7} \to S0_k$ | (0, 0, 0, 0, 1, 1, 0, 0, 0, 0) | | | | S0 | S1 | S2 | S9 | S6 |
| | (0, 0, 0, 0, 0, 1, 1, 0, 0, 0) | | | | S0 | S0 | S1 | S2 | S9 |
| $S0_{k-7} \to S1_k$ | (0, 0, 0, 0, 1, 1, 0, 0, 0, 1) | | | | S0 | S1 | S2 | S9 | S6 |
| | (0, 0, 0, 0, 0, 1, 1, 0, 0, 1) | | | | S0 | S0 | S1 | S2 | S9 |
| $S0_{k-7} \to S2_k$ | (0, 0, 0, 0, 1, 1, 0, 0, 1, 1) | | | | S0 | S1 | S2 | S9 | S6 |
| | (0, 0, 0, 0, 0, 1, 1, 0, 0, 1, 1) | | | | S0 | S0 | S1 | S2 | S9 |
| $S2_{k-7} \to S6_k$ | (0, 0, 1, 1, 1, 0, 0, 1, 1, 0, 0) | | | | S2 | S3 | S5 | S6 | S8 |
| | (0, 0, 1, 1, 0, 0, 1, 1, 1, 0, 0) | | | | S2 | S9 | S6 | S8 | S2 |
| $S2_{k-7} \to S5_k$ | (0, 0, 1, 1, 1, 0, 0, 1, 1, 1, 0) | | | | S2 | S3 | S5 | S6 | S8 |
| | (0, 0, 1, 1, 0, 0, 1, 1, 1, 1, 0) | | | | S2 | S9 | S6 | S8 | S2 |
| $S2_{k-7} \to S4_k$ | (0, 0, 1, 1, 1, 0, 0, 1, 1, 1, 1) | | | | S2 | S3 | S5 | S6 | S8 |
| | (0, 0, 1, 1, 0, 0, 1, 1, 1, 1, 1) | | | | S2 | S9 | S6 | S8 | S2 |
| $S3_{k-7} \to S6_k$ | (0, 1, 1, 1, 1, 0, 0, 1, 1, 0, 0) | | | | S3 | S4 | S5 | S6 | S8 |
| | (0, 1, 1, 1, 0, 0, 1, 1, 1, 0, 0) | | | | S3 | S5 | S6 | S8 | S2 |
| $S3_{k-7} \to S5_k$ | (0, 1, 1, 1, 1, 0, 0, 1, 1, 1, 0) | | | | S3 | S4 | S5 | S6 | S8 |
| | (0, 1, 1, 1, 0, 0, 1, 1, 1, 1, 0) | | | | S3 | S5 | S6 | S8 | S2 |
| $S3_{k-7} \to S4_k$ | (0, 1, 1, 1, 1, 0, 0, 1, 1, 1, 1) | | | | S3 | S4 | S5 | S6 | S8 |
| | (0, 1, 1, 1, 0, 0, 1, 1, 1, 1, 1) | | | | S3 | S5 | S6 | S8 | S2 |
| $S7_{k-7} \to S0_k$ | (1, 0, 0, 0, 1, 1, 0, 0, 0, 0) | | | | S7 | S1 | S2 | S9 | S6 |
| | (1, 0, 0, 0, 0, 1, 1, 0, 0, 0, 0) | | | | S7 | S0 | S1 | S2 | S9 |
| $S7_{k-7} \to S1_k$ | (1, 0, 0, 0, 1, 1, 0, 0, 0, 1) | | | | S7 | S1 | S2 | S9 | S6 |
| | (1, 0, 0, 0, 0, 1, 1, 0, 0, 0, 1) | | | | S7 | S0 | S1 | S2 | S9 |
| $S7_{k-7} \to S2_k$ | (1, 0, 0, 0, 1, 1, 0, 0, 0, 1, 1) | | | | S7 | S1 | S2 | S9 | S6 |
| | (1, 0, 0, 0, 0, 1, 1, 0, 0, 1, 1) | | | | S7 | S0 | S1 | S2 | S9 |
| $S6_{k-7} \to S0_k$ | (1, 1, 0, 0, 1, 1, 0, 0, 0, 0) | | | | S6 | S8 | S2 | S9 | S6 |
| | (1, 1, 0, 0, 0, 1, 1, 0, 0, 0, 0) | | | | S6 | S7 | S1 | S2 | S9 |
| $S6_{k-7} \to S1_k$ | (1, 1, 0, 0, 1, 1, 0, 0, 0, 1) | | | | S6 | S8 | S2 | S9 | S6 |
| | (1, 1, 0, 0, 0, 1, 1, 0, 0, 0, 1) | | | | S6 | S7 | S1 | S2 | S9 |
| $S6_{k-7} \to S2_k$ | (1, 1, 0, 0, 1, 1, 0, 0, 1, 1) | | | | S6 | S8 | S2 | S9 | S6 |
| | (1, 1, 0, 0, 0, 1, 1, 0, 0, 1, 1) | | | | S6 | S7 | S1 | S2 | S9 |
| $S4_{k-7} \to S6_k$ | (1, 1, 1, 1, 0, 0, 1, 1, 0, 0) | | | | S4 | S4 | S5 | S6 | S8 |
| | (1, 1, 1, 1, 0, 0, 1, 1, 1, 0, 0) | | | | S4 | S5 | S6 | S8 | S2 |
| $S4_{k-7} \to S5_k$ | (1, 1, 1, 1, 0, 0, 1, 1, 1, 0) | | | | S4 | S4 | S5 | S6 | S8 |
| | (1, 1, 1, 1, 0, 0, 1, 1, 1, 1, 0) | | | | S4 | S5 | S6 | S8 | S2 |
| $S4_{k-7} \to S4_k$ | (1, 1, 1, 1, 0, 0, 1, 1, 1, 1) | | | | S4 | S4 | S5 | S6 | S8 |
| | (1, 1, 1, 1, 0, 0, 1, 1, 1, 1, 1) | | | | S4 | S5 | S6 | S8 | S2 |

TABLE 2-continued

| STATE TRANSITION | k − 2 | k − 1 | k | | PR EQUALIZATION IDEAL VALUE | | | | | EUCLIDEAN DISTANCE BETWEEN PATHS |
|---|---|---|---|---|---|---|---|---|---|---|
| $S0_{k-7} \to S0_k$ | S7 | S0 | S0 | 1 | 3 | 4 | 4 | 3 | 1 | 0 | |
| | S6 | S7 | S0 | 0 | 1 | 3 | 4 | 4 | 3 | 1 | 12 |
| $S0_{k-7} \to S1_k$ | S7 | S0 | S1 | 1 | 3 | 4 | 4 | 3 | 1 | 1 | |
| | S6 | S7 | S1 | 0 | 1 | 3 | 4 | 4 | 3 | 2 | 12 |
| $S0_{k-7} \to S2_k$ | S7 | S1 | S2 | 1 | 3 | 4 | 4 | 3 | 2 | 3 | |
| | S6 | S8 | S2 | 0 | 1 | 3 | 4 | 4 | 4 | 4 | 12 |
| $S2_{k-7} \to S6_k$ | S2 | S9 | S6 | 5 | 6 | 5 | 4 | 4 | 4 | 4 | |
| | S3 | S5 | S6 | 4 | 4 | 4 | 4 | 5 | 6 | 5 | 12 |
| $S2_{k-7} \to S5_k$ | S2 | S3 | S5 | 5 | 6 | 5 | 4 | 4 | 5 | 6 | |
| | S3 | S4 | S5 | 4 | 4 | 4 | 4 | 5 | 7 | 7 | 12 |
| $S2_{k-7} \to S4_k$ | S2 | S3 | S4 | 5 | 6 | 5 | 4 | 4 | 5 | 7 | |
| | S3 | S4 | S4 | 4 | 4 | 4 | 4 | 5 | 7 | 8 | 12 |
| $S3_{k-7} \to S6_k$ | S2 | S9 | S6 | 7 | 7 | 5 | 4 | 4 | 4 | 4 | |
| | S3 | S5 | S6 | 6 | 5 | 4 | 4 | 5 | 6 | 5 | 12 |
| $S3_{k-7} \to S5_k$ | S2 | S3 | S5 | 7 | 7 | 5 | 4 | 4 | 5 | 6 | |
| | S3 | S4 | S5 | 6 | 5 | 4 | 4 | 5 | 7 | 7 | 12 |
| $S3_{k-7} \to S4_k$ | S2 | S3 | S4 | 7 | 7 | 5 | 4 | 4 | 5 | 7 | |
| | S3 | S4 | S4 | 6 | 5 | 4 | 4 | 5 | 7 | 8 | 12 |
| $S7_{k-7} \to S0_k$ | S7 | S0 | S0 | 2 | 3 | 4 | 4 | 3 | 1 | 0 | |
| | S6 | S7 | S0 | 1 | 1 | 3 | 4 | 4 | 3 | 1 | 12 |
| $S7_{k-7} \to S1_k$ | S7 | S0 | S1 | 2 | 3 | 4 | 4 | 3 | 1 | 1 | |
| | S6 | S7 | S1 | 1 | 1 | 3 | 4 | 4 | 3 | 2 | 12 |
| $S7_{k-7} \to S2_k$ | S7 | S1 | S2 | 2 | 3 | 4 | 4 | 3 | 2 | 3 | |
| | S6 | S8 | S2 | 1 | 1 | 3 | 4 | 4 | 4 | 4 | 12 |
| $S6_{k-7} \to S0_k$ | S7 | S0 | S0 | 4 | 4 | 4 | 4 | 3 | 1 | 0 | |
| | S6 | S7 | S0 | 3 | 2 | 3 | 4 | 4 | 3 | 1 | 12 |
| $S6_{k-7} \to S1_k$ | S7 | S0 | S1 | 4 | 4 | 4 | 4 | 3 | 1 | 1 | |
| | S6 | S7 | S1 | 3 | 2 | 3 | 4 | 4 | 3 | 2 | 12 |
| $S6_{k-7} \to S2_k$ | S7 | S1 | S2 | 4 | 4 | 4 | 4 | 3 | 2 | 3 | |
| | S6 | S8 | S2 | 3 | 2 | 3 | 4 | 4 | 4 | 4 | 12 |
| $S4_{k-7} \to S6_k$ | S2 | S9 | S6 | 8 | 7 | 5 | 4 | 4 | 4 | 4 | |
| | S3 | S5 | S6 | 7 | 5 | 4 | 4 | 5 | 6 | 5 | 12 |
| $S4_{k-7} \to S5_k$ | S2 | S3 | S5 | 8 | 7 | 5 | 4 | 4 | 5 | 6 | |
| | S3 | S4 | S5 | 7 | 5 | 4 | 4 | 5 | 7 | 7 | 12 |
| $S4_{k-7} \to S4_k$ | S2 | S3 | S4 | 8 | 7 | 5 | 4 | 4 | 5 | 7 | |
| | S3 | S4 | S4 | 7 | 5 | 4 | 4 | 5 | 7 | 8 | 12 |

TABLE 3

| STATE TRANSITION | RECORDING CODE $(b_{k-i}, \ldots, b_k)$ | k − 9 | k − 8 | k − 7 | k − 6 | k − 5 | k − 4 | k − 3 | k − 2 |
|---|---|---|---|---|---|---|---|---|---|
| $S0_{k-9} \to S6_k$ | (0, 0, 0, 0, 1, 1, 0, 0, 1, 1, 0, 0) | S0 | S1 | S2 | S9 | S6 | S8 | S2 | S3 |
| | (0, 0, 0, 0, 0, 1, 1, 0, 0, 1, 1, 0, 0) | S0 | S0 | S1 | S2 | S9 | S6 | S8 | S2 |
| $S0_{k-9} \to S5_k$ | (0, 0, 0, 0, 1, 1, 0, 0, 1, 1, 1, 0) | S0 | S1 | S2 | S9 | S6 | S8 | S2 | S3 |
| | (0, 0, 0, 0, 0, 1, 1, 0, 0, 1, 1, 1, 0) | S0 | S0 | S1 | S2 | S9 | S6 | S8 | S2 |
| $S0_{k-9} \to S4_k$ | (0, 0, 0, 0, 1, 1, 0, 0, 1, 1, 1, 1) | S0 | S1 | S2 | S9 | S6 | S8 | S2 | S3 |
| | (0, 0, 0, 0, 0, 1, 1, 0, 0, 1, 1, 1, 1) | S0 | S0 | S1 | S2 | S9 | S6 | S8 | S2 |
| $S2_{k-7} \to S0_k$ | (0, 0, 1, 1, 0, 0, 1, 1, 0, 0, 0, 0) | S2 | S3 | S5 | S6 | S8 | S2 | S9 | S6 |
| | (0, 0, 1, 1, 0, 0, 1, 1, 0, 0, 0, 0) | S2 | S9 | S6 | S8 | S2 | S9 | S6 | S7 |
| $S2_{k-7} \to S1_k$ | (0, 0, 1, 1, 0, 0, 1, 1, 0, 0, 0, 1) | S2 | S3 | S5 | S6 | S8 | S2 | S9 | S6 |
| | (0, 0, 1, 1, 0, 0, 1, 1, 0, 0, 0, 1) | S2 | S9 | S6 | S8 | S2 | S9 | S6 | S7 |
| $S2_{k-7} \to S2_k$ | (0, 0, 1, 1, 0, 0, 1, 1, 0, 0, 1, 1) | S2 | S3 | S5 | S6 | S8 | S2 | S9 | S6 |
| | (0, 0, 1, 1, 0, 0, 1, 1, 0, 0, 1, 1) | S2 | S9 | S6 | S8 | S2 | S9 | S6 | S7 |
| $S3_{k-5} \to S0_k$ | (0, 1, 1, 1, 0, 0, 1, 1, 0, 0, 0, 0) | S3 | S4 | S5 | S6 | S8 | S2 | S9 | S6 |
| | (0, 1, 1, 1, 0, 0, 1, 1, 0, 0, 0, 0) | S3 | S5 | S6 | S8 | S2 | S9 | S6 | S7 |
| $S3_{k-5} \to S1_k$ | (0, 1, 1, 1, 0, 0, 1, 1, 0, 0, 0, 1) | S3 | S4 | S5 | S6 | S8 | S2 | S9 | S6 |
| | (0, 1, 1, 1, 0, 0, 1, 1, 0, 0, 0, 1) | S3 | S5 | S6 | S8 | S2 | S9 | S6 | S7 |
| $S3_{k-5} \to S2_k$ | (0, 1, 1, 1, 0, 0, 1, 1, 0, 0, 1, 1) | S3 | S4 | S5 | S6 | S8 | S2 | S9 | S6 |
| | (0, 1, 1, 1, 0, 0, 1, 1, 0, 0, 1, 1) | S3 | S5 | S6 | S8 | S2 | S9 | S6 | S7 |
| $S7_{k-5} \to S6_k$ | (1, 0, 0, 0, 1, 1, 0, 0, 1, 1, 0, 0) | S7 | S1 | S2 | S9 | S6 | S8 | S2 | S3 |
| | (1, 0, 0, 0, 1, 1, 0, 0, 1, 1, 0, 0) | S7 | S0 | S1 | S2 | S9 | S6 | S8 | S2 |
| $S7_{k-5} \to S5_k$ | (1, 0, 0, 0, 1, 1, 0, 0, 1, 1, 1, 0) | S7 | S1 | S2 | S9 | S6 | S8 | S2 | S3 |
| | (1, 0, 0, 0, 1, 1, 0, 0, 1, 1, 1, 0) | S7 | S0 | S1 | S2 | S9 | S6 | S8 | S2 |
| $S7_{k-5} \to S4_k$ | (1, 0, 0, 0, 1, 1, 0, 0, 1, 1, 1, 1) | S7 | S1 | S2 | S9 | S6 | S8 | S2 | S3 |
| | (1, 0, 0, 0, 1, 1, 0, 0, 1, 1, 1, 1) | S7 | S0 | S1 | S2 | S9 | S6 | S8 | S2 |
| $S6_{k-5} \to S6_k$ | (1, 1, 0, 0, 1, 1, 0, 0, 1, 1, 0, 0) | S6 | S8 | S2 | S9 | S6 | S8 | S2 | S3 |
| | (1, 1, 0, 0, 1, 1, 0, 0, 1, 1, 0, 0) | S6 | S7 | S1 | S2 | S9 | S6 | S8 | S2 |
| $S6_{k-5} \to S5_k$ | (1, 1, 0, 0, 1, 1, 0, 0, 1, 1, 1, 0) | S6 | S8 | S2 | S9 | S6 | S8 | S2 | S3 |
| | (1, 1, 0, 0, 1, 1, 0, 0, 1, 1, 1, 0) | S6 | S7 | S1 | S2 | S9 | S6 | S8 | S2 |
| $S6_{k-5} \to S4_k$ | (1, 1, 0, 0, 1, 1, 0, 0, 1, 1, 1, 1) | S6 | S8 | S2 | S9 | S6 | S8 | S2 | S3 |
| | (1, 1, 0, 0, 1, 1, 0, 0, 1, 1, 1, 1) | S6 | S7 | S1 | S2 | S9 | S6 | S8 | S2 |
| $S4_{k-5} \to S0_k$ | (1, 1, 1, 1, 0, 0, 1, 1, 0, 0, 0, 0) | S4 | S4 | S5 | S6 | S8 | S2 | S9 | S6 |
| | (1, 1, 1, 1, 0, 0, 1, 1, 0, 0, 0, 0) | S4 | S5 | S6 | S8 | S2 | S9 | S6 | S7 |

TABLE 3-continued

| | | | | | | | | |
|---|---|---|---|---|---|---|---|---|
| $S4_{k-5} \to S1_k$ | (1, 1, 1, 1, 1, 0, 0, 1, 1, 0, 0, 0, 1) | S4 | S4 | S5 | S6 | S8 | S2 | S9 | S6 |
| | (1, 1, 1, 1, 0, 0, 1, 1, 0, 0, 0, 0, 1) | S4 | S5 | S6 | S8 | S2 | S9 | S6 | S7 |
| $S4_{k-5} \to S2_k$ | (1, 1, 1, 1, 1, 0, 0, 1, 1, 0, 0, 1, 1) | S4 | S4 | S5 | S6 | S8 | S2 | S9 | S6 |
| | (1, 1, 1, 1, 0, 0, 1, 1, 0, 0, 0, 1, 1) | S4 | S5 | S6 | S8 | S2 | S9 | S6 | S7 |

| STATE TRANSITION | k−1 | k | PR EQUALIZATION IDEAL VALUE | | | | | | | | EUCLIDEAN DISTANCE BETWEEN PATHS |
|---|---|---|---|---|---|---|---|---|---|---|---|
| $S0_{k-9} \to S6_k$ | S5 | S6 | 1 | 3 | 4 | 4 | 4 | 4 | 5 | 6 | 5 | |
| | S9 | S6 | 0 | 1 | 3 | 4 | 4 | 4 | 4 | 4 | 4 | 12 |
| $S0_{k-9} \to S5_k$ | S4 | S5 | 1 | 3 | 4 | 4 | 4 | 4 | 5 | 7 | 7 | |
| | S3 | S5 | 0 | 1 | 3 | 4 | 4 | 4 | 4 | 5 | 6 | 12 |
| $S0_{k-9} \to S4_k$ | S4 | S4 | 1 | 3 | 4 | 4 | 4 | 4 | 5 | 7 | 8 | |
| | S3 | S4 | 0 | 1 | 3 | 4 | 4 | 4 | 4 | 5 | 7 | 12 |
| $S2_{k-7} \to S0_k$ | S7 | S0 | 5 | 6 | 5 | 4 | 4 | 4 | 4 | 3 | 1 | |
| | S0 | S0 | 4 | 4 | 4 | 4 | 4 | 4 | 3 | 1 | 0 | 12 |
| $S2_{k-7} \to S1_k$ | S7 | S1 | 5 | 6 | 5 | 4 | 4 | 4 | 4 | 3 | 2 | |
| | S0 | S1 | 4 | 4 | 4 | 4 | 4 | 4 | 3 | 1 | 1 | 12 |
| $S2_{k-7} \to S2_k$ | S8 | S2 | 5 | 6 | 5 | 4 | 4 | 4 | 4 | 4 | 4 | |
| | S1 | S2 | 4 | 4 | 4 | 4 | 4 | 4 | 3 | 2 | 3 | 12 |
| $S3_{k-5} \to S0_k$ | S7 | S0 | 7 | 7 | 5 | 4 | 4 | 4 | 4 | 3 | 1 | |
| | S0 | S0 | 6 | 5 | 4 | 4 | 4 | 4 | 3 | 1 | 0 | 12 |
| $S3_{k-5} \to S1_k$ | S7 | S1 | 7 | 7 | 5 | 4 | 4 | 4 | 4 | 3 | 2 | |
| | S0 | S1 | 6 | 5 | 4 | 4 | 4 | 4 | 3 | 1 | 1 | 12 |
| $S3_{k-5} \to S2_k$ | S8 | S2 | 7 | 7 | 5 | 4 | 4 | 4 | 4 | 4 | 4 | |
| | S1 | S2 | 6 | 5 | 4 | 4 | 4 | 4 | 3 | 2 | 3 | 12 |
| $S7_{k-5} \to S6_k$ | S5 | S6 | 2 | 3 | 4 | 4 | 4 | 4 | 5 | 6 | 5 | |
| | S9 | S6 | 1 | 1 | 3 | 4 | 4 | 4 | 4 | 4 | 4 | 12 |
| $S7_{k-5} \to S5_k$ | S4 | S5 | 2 | 3 | 4 | 4 | 4 | 4 | 5 | 7 | 7 | |
| | S3 | S5 | 1 | 1 | 3 | 4 | 4 | 4 | 4 | 5 | 6 | 12 |
| $S7_{k-5} \to S4_k$ | S4 | S4 | 2 | 3 | 4 | 4 | 4 | 4 | 5 | 7 | 8 | |
| | S3 | S4 | 1 | 1 | 3 | 4 | 4 | 4 | 4 | 5 | 7 | 12 |
| $S6_{k-5} \to S6_k$ | S5 | S6 | 4 | 4 | 4 | 4 | 4 | 4 | 5 | 6 | 5 | |
| | S9 | S6 | 3 | 2 | 3 | 4 | 4 | 4 | 4 | 4 | 4 | 12 |
| $S6_{k-5} \to S5_k$ | S4 | S5 | 4 | 4 | 4 | 4 | 4 | 4 | 5 | 7 | 7 | |
| | S3 | S5 | 3 | 2 | 3 | 4 | 4 | 4 | 4 | 5 | 6 | 12 |
| $S6_{k-5} \to S4_k$ | S4 | S4 | 4 | 4 | 4 | 4 | 4 | 4 | 5 | 7 | 8 | |
| | S3 | S4 | 3 | 2 | 3 | 4 | 4 | 4 | 4 | 5 | 7 | 12 |
| $S4_{k-5} \to S0_k$ | S7 | S0 | 8 | 7 | 5 | 4 | 4 | 4 | 4 | 3 | 1 | |
| | S0 | S0 | 7 | 5 | 4 | 4 | 4 | 4 | 3 | 1 | 0 | 12 |
| $S4_{k-5} \to S1_k$ | S7 | S1 | 8 | 7 | 5 | 4 | 4 | 4 | 4 | 3 | 2 | |
| | S0 | S1 | 7 | 5 | 4 | 4 | 4 | 4 | 3 | 1 | 1 | 12 |
| $S4_{k-5} \to S2_k$ | S8 | S2 | 8 | 7 | 5 | 4 | 4 | 4 | 4 | 4 | 4 | |
| | S1 | S2 | 7 | 5 | 4 | 4 | 4 | 4 | 3 | 2 | 3 | 12 |

Table 1, Table 2, and Table 3 each show the paths of state transition from their start state through their merging state, two recording sequences that could have gone through those state transitions, two ideal waveforms that could have gone through those state transitions, and the Euclidean distance between the two ideal reproduction waveforms.

Figure 16:
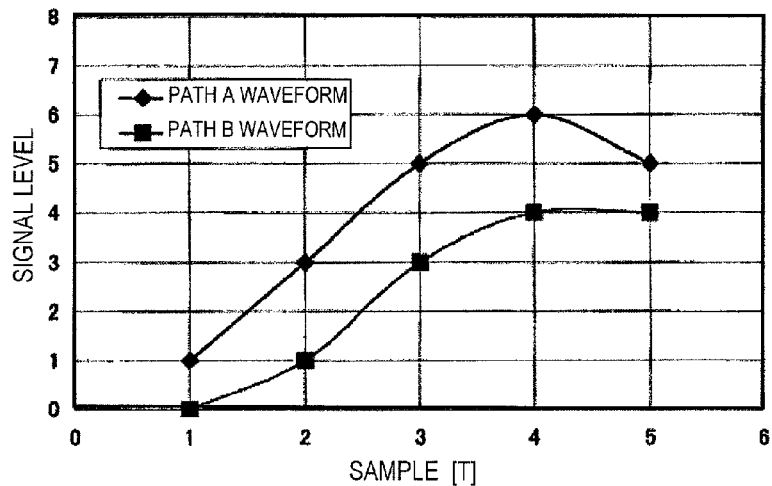
FIG. 16 is a graph which illustrates an example of a PR equalization ideal waveform shown in Table 1 according to an embodiment of the present invention.

Table 1 shows 18 different pairs of state transition patterns, each of which can take two different paths and has a Euclidean distance of 14 between themselves. These patterns correspond to edge portions of a record mark in the context of a reproduction waveform of an optical disc medium. In other words, these patterns represent one-bit error patterns between record marks and spaces. As an example, a transition path leading from S0(k−5) to S6(k) according to the state transition rules shown in FIG. 15 is described. In that case, one path is a case where the recording sequence transitions to "0, 0, 0, 0, 1, 1, 1, 0, 0" and is detected. In the context of the recorded state where zeros (0) and ones (1) of the reproduced data are respectively replaced with spaces and marks, this recording sequence is the sequence of a space with a length of 4T or longer, a 3T mark, and a space with a length of 2T or longer. This is shown as Path A waveform in FIG. 16. FIG. 16 shows two waveforms which are different in the relationship between the sampling time and the reproduction level. In FIG. 16, the abscissa represents the sampling time which indicates every one cycle in the recording sequence, and the ordinate represents the reproduction level. As previously mentioned, PR(1,2,2,2,1)ML has nine ideal reproduction levels in total, from Level 0 through Level 8.

On the other hand, the other path is a case where the recording sequence transitions to "0, 0, 0, 0, 0, 1, 1, 0, 0" and is detected. In the context of the recorded state where zeros (0) and ones (1) of the reproduced data are respectively replaced with spaces and marks, this recording sequence is the sequence of a space with a length of 5T or longer, a 2T mark, and a space with a length of 2T or longer. This path is shown as Path B waveform in FIG. 16. The patterns with a Euclidean distance of 14 shown in Table 1 are characterized by always including a single piece of edge information which is indicative of a mark-space boundary. An edge adjustment method optimum for the PRML method which takes advantage of this feature is as described in Patent Document No. 3, for example.

Figure 17:
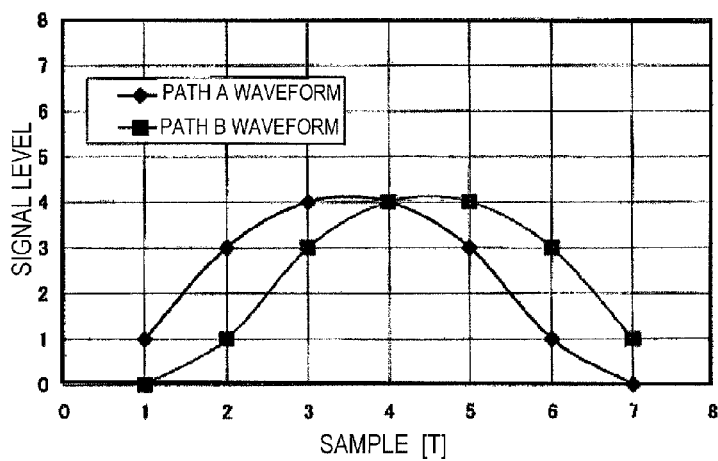
FIG. 17 is a graph which illustrates an example of a PR equalization ideal waveform shown in Table 2 according to an embodiment of the present invention.

Likewise, Table 2 shows 18 different pairs of state transition patterns, each of which can take two different paths and has a Euclidean distance of 12 between themselves. These patterns are patterns in which, among shift errors of a 2T mark or a 2T space, a 2-bit error is detected. As an example, a state transition path leading from S0(k−7) to S0(k) according to the state transition rules shown in FIG. 15 is described. In that case, one path is a case where the recording sequence transitions to "0, 0, 0, 0, 1, 1, 0, 0, 0, 0, 0" and is detected. In the context of the recorded state where zeros (0) and ones (1) of the reproduced data are respectively replaced with spaces and marks, this recording sequence is the sequence of a space with a length of 4T or longer, a 2T mark, and a space with a length of 5T or longer. This is shown as Path A waveform in FIG. 17.

On the other hand, the other path is a case where the recording sequence transitions to "0, 0, 0, 0, 0, 1, 1, 0, 0, 0, 0" and is detected. In the context of the recorded state where zeros (0) and ones (1) of the reproduced data are respectively replaced with spaces and marks, this recording sequence is the sequence of a space with a length of 5T or longer, a 2T mark, and a space with a length of 4T or longer. This is shown as Path B waveform in FIG. 17. The patterns with a Euclidean distance of 12 shown in Table 2 are characterized by always including two pieces of rising and falling edge information of a 2T mark or 2T space.

Figure 18:
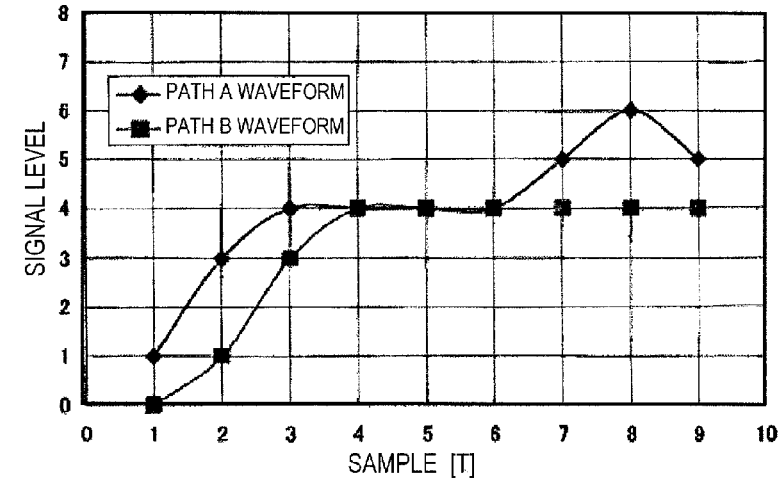
FIG. 18 is a graph which illustrates an example of a PR equalization ideal waveform shown in Table 3 according to an embodiment of the present invention.

Likewise, Table 3 shows 18 different pairs of state transition patterns, each of which can take two different paths and has a Euclidean distance of 12 between themselves. These patterns are patterns in which a 3-bit error is detected in a portion where at least two 2T intervals consecutively occur, such as "2T mark-2T space" or "2T space-2T mark". As an example, a state transition path leading from S0(k−9) to S6(k) according to the state transition rules shown in FIG. 15 is described. In that case, one path is a case where the recording sequence transitions to "0, 0, 0, 0, 1, 1, 0, 0, 1, 1, 1, 0, 0" and is detected. In the context of the recorded state where zeros (0) and ones (1) of the reproduced data are respectively replaced with spaces and marks, this recording sequence is the sequence of a space with a length of 4T or longer, a 2T mark, a 2T space, a 3T mark, and a space with a length of 2T or longer. This is shown as Path A waveform in FIG. 18.

On the other hand, the other path is a case where the record code sequence transitions to "0, 0, 0, 0, 0, 1, 1, 0, 0, 1, 1, 0, 0" and is detected. In the context of the recorded state where zeros (0) and ones (1) of the reproduced data are respectively replaced with spaces and marks, this recording sequence is the sequence of a space with a length of 5T or longer, a 2T mark, a 2T space, a 2T mark and a space with a length of 2T or longer. This is shown as Path B waveform in FIG. 18. The patterns with a Euclidean distance of 12 shown in Table 3 are characterized in that a 3-bit error is detected in a portion where at least two 2T intervals consecutively occur, such as "2T mark-2T space" or "2T space-2T mark".

In adjustment of the position of the leading end edge or trailing end edge of a record mark, the direction and magnitude of edge deviation need to be detected for each one of the combinations of respective marks and respective spaces. When the PR(1,2,2,2,1)ML method is used, the adjustment can be carried out using the patterns with a Euclidean distance of 14 shown in Table 1. This means that recording compensation can be realized by adjusting the pulse edges of the write pulse train according to the length of a subject mark and the lengths of its preceding and succeeding spaces. FIG. 19 is a classification table for a recording compensation which is made using the patterns with a Euclidean distance of 14.

In the case of the patterns having a Euclidean distance of 14, the recording compensation includes 4 classes of the subject mark, "2T", "3T", "4T", and "5T or longer". Further, the length of the preceding space has 4 classes, "2T", "3T", "4T", and "5T or longer". Thus, there are 4×4=16 classes in total for adjustment. In this case, the write pulse train subjected to the recording compensation includes dTF1 and dTF2 of FIG. 4.

For adjustment, the mark length of the subject mark has 4 classes, "2T", "3T", "4T", and "5T or longer", and the space length of a space succeeding the subject mark has 4 classes, "2T", "3T", "4T", and "5T or longer", i.e., there are 4×4=16 classes in total. In this case, the write pulse train subjected to the recording compensation includes dTE2, dTE3 of FIG. 4. The recording compensation is made on dTF1, dTF2, dTE2, and dTE3 according to the length of the subject mark and the lengths of its preceding and succeeding spaces, whereby the recording compensation of the Euclidean distance of 14 is provided.

A shift detection method in the recording compensation is described. For example, in FIG. 16, a cumulative value of squares of the difference between the value of the reproduction signal from y_k−4 to y_k in the period from time k−4 to time k and the expected value of Path A is referred to as Pa. Pa is expressed by Formula 1. A cumulative value of squares of the difference between the value of the reproduction signal from y_k−4 to y_k in the period from time k−4 to time k and the expected value of Path B is referred to as Pb. Pb is expressed by Formula 2.

$$Pa = (y\_k-4-1)^2 + (y\_k-3-3)^2 + (y\_k-2-5)^2 + (y\_k-1-6)^2 + (y\_k-5)^2 \quad \text{(Formula 1)}$$

$$Pb = (y\_k-4-0)^2 + (y\_k-3-1)^2 + (y\_k-2-3)^2 + (y\_k-1-4)^2 + (y\_k-4)^2 \quad \text{(Formula 2)}$$

Now, the meaning of difference Pa−Pb between Pa and Pb, which is indicative of the reliability of a maximum likelihood decoding result, is described. It can be said that if Pa<<Pb the maximum likelihood decoding section has selected Path A with confidence and that if Pa>>Pb the maximum likelihood decoding section has selected Path B with confidence. If Pa=Pb, the path selected by the maximum likelihood decoding section may be any of Path A and Path B, i.e., it is fifty-fifty whether the decoding result is correct. By calculating Pa−Pb from a predetermined time, a predetermined number of chances, and the decoding result in this way, the distribution of Pa−Pb is obtained.

Tracks written under the above-described write pulse conditions are consecutively subjected to reproduction, and the edge position information of the reproduced signal is measured. The light emitting section 102 operates to perform reproduction on a track of write pulse conditions established for writing. The reproduced write pulse conditions are transmitted through the waveform equalizing section 105 and the A/D conversion section 106. The PLL section 107 generates a reproduction clock. A pattern detecting section included in the PRML processing section 108 performs Viterbi decoding (maximum likelihood decoding) on a digital signal sampled with the reproduction clock and generates a binary signal which is indicative of a result of the maximum likelihood decoding for each set of recording conditions.

Next, a method for detecting an edge shift in the reproduction signal whose waveform is reshaped so as to comply with PR(1,2,2,2,1) equalization is described.

FIG. 20 shows sampled values of the patterns of state transition S0→S6 of Table 1 as an example of the PR equalization ideal waveform. The abscissa represents time (1 scale period represents 1 channel clock period), and the ordinate represents the signal level (0 to 8). The broken lines and the solid lines correspond to Path A and Path B, respectively. Each of the sampled values corresponds to any of 0 to 8 of expected value Levelv of the input in the maximum likelihood decoding. It is defined that the waveform reproduced from a record mark portion is an upwardly-oriented waveform in terms of the signal level, and that the waveform reproduced from a non-record portion is a downwardly-oriented waveform. The patterns shown in FIG. 20 correspond to the reproduced waveforms at the mark-space boundaries (the leading end edge and the trailing end edge of the mark). Thus, the patterns of FIG. 20 and the following patterns of Table 1, S0→S6, S0→S5, S0→S4, S7→S6, S7→S5, S7→S4, S6→S6, S6→S5, and S6→S4, correspond to the leading end edge portion of the mark, and the other patterns of Table 1, S2→S0, S2→S1, S2→S2, S3→S0, S3→S1, S3→S2, S4→S0, S4→S1, and S4→S2, correspond to the trailing end edge portion of the mark.

The reproduced waveforms of FIGS. 20(a) and 20(b) are the waveforms of the sequence of a 4T space and a 3T mark which are recorded in this embodiment. Now, a method for detecting a leading end edge shift of the mark is described with attention to the reproduced waveforms of FIGS. 20(a) and 20(b).

FIGS. 20(a) and 20(b) show the correlation between the reproduced waveforms for S0→S6 of Table 1 and the deviation of the record mark. In FIGS. 20(a) and 20(b), the solid line with open triangles (Δ) represents the input signal, and Path A represented by the broken line is a correct state transition path. The input signal is generated based on record mark A− in FIG. 20(a) and based on record mark A+ in FIG. 20(b). It is assumed that record mark A has an ideal leading end edge.

FIG. 20(a) shows the reproduced waveforms where the leading end edge position of the record mark is deviated to the shorter side relative to the ideal leading end edge position. Distance Pa between Path A and the input signal and distance Pb between Path B and the input signal are calculated to obtain 4S3M-A=ΔA−=|Pa−Pb|−Pstd. 4S3M-A means the edge shift between the 4T space and the 3T mark in Path A and represents the edge shift amount between the 4T space and the immediately succeeding 3T mark. Here, as for Pstd, the value of Pa−Pb when Pa=0 is represented by −Pstd, and the value of Pa−Pb when Pb=0 is represented by Pstd.

FIG. 20(b) shows the reproduced waveforms where the leading end edge position of the record mark is deviated to the longer side relative to the ideal leading end edge position. Distance Pa between Path A and the input signal and distance Pb between Path B and the input signal are calculated to obtain 4S3M-A=ΔA+=|Pa−Pb|−Pstd. 4S3M-A means the edge shift between the 4T space and the 3T mark in Path A and represents the edge shift amount between the 4T space and the immediately succeeding 3T mark.

The above-described edge shift detection is carried out on the 18 patterns in total classified in Table 1 to detect the edge shift amount that depends on the mark and space lengths.

Here, the classification of the edge shift in the patterns of Table 1 which is made separately by the mark length and the space length is realized by detecting b_k−4 bits out of 9 bits of the record code (b_k−8 to b_k) as the boundary of the edge deviation between the mark and the space or between the space and the mark. For example, in S0→S6 pattern, it corresponds to comparison subject patterns of the sequence of "4T or longer space and 3T mark" and the sequence of "5T or longer space and 2T mark". The edge shift amount which depends on these mark lengths and the lengths of the preceding spaces is detected. Likewise, in S2→S0 pattern, it corresponds to comparison subject patterns of the sequence of "3T mark and 4T or longer space" and the sequence of "2T mark and 5T or longer space". The edge shift amount which depends on these mark lengths and the lengths of succeeding spaces is detected.

Next, a method for detecting the phase shift amount for the patterns of Table 2 in which the Euclidean distance of the state transition patterns that can take two state transition paths is 12 and in which, among shift errors of a 2T mark or a 2T space, a 2-bit error is detected is described.

FIGS. 21(a) and 21(b) show sampled values of the patterns which are to be subjected to comparison. The abscissa represents time (1 scale period represents 1 channel clock period), and the ordinate represents the signal level (0 to 8). The broken lines and the solid lines correspond to Path A and Path B, respectively. Each of the sampled values corresponds to any of 0 to 8 of expected value Level v of the input in the maximum likelihood decoding. It is defined that the waveform reproduced from a record mark portion is an upwardly-oriented waveform in terms of the signal level, and that the waveform reproduced from a non-record portion is a downwardly-oriented waveform. The patterns shown in FIGS. 21(a) and 21(b) correspond to the reproduced waveforms of the patterns including at least one 2T mark or 2T space. Thus, in the patterns of FIGS. 21(a) and 21(b) and the following patterns of Table 2, S0→S0, S0→S1, S0→S2, S7→S0, S7→S1, S7→S2, S6→S0, S6→S1, and S6→S2, the position of the 2T mark makes an anterior or posterior shift while keeping its length of 2T unchanged. The other patterns of Table 2, S2→S6, S2→S5, S2→S4, S3→S6, S3→S5, S3→S4, S4→S6, S4→S5, and S4→S4, correspond to a portion where the position of the 2T space makes an anterior or posterior shift while keeping its length of 2T unchanged.

The waveforms of the sequence of a 4T or longer space, a 2T mark, and a 5T or longer space recorded in the present embodiment are the reproduced waveforms of FIGS. 21(a) and 21(b). A method for detecting a shift in the recording position of the 2T mark is now described with attention to the reproduced waveforms of FIGS. 21(a) and 21(b). FIGS. 21(a) and 21(b) show the correlation between the reproduced waveforms for S0→S0 of Table 2 and the deviation of the record mark. In FIGS. 21(a) and 21(b), the solid line with open triangles (Δ) represents the input signal, and Path A represented by the broken line is a correct state transition path. The input signal is generated based on record mark B− in FIG. 21(a) and based on record mark B+ in FIG. 21(b). It is assumed that record mark B has an ideal recording position.

FIG. 21(a) shows the reproduced waveforms where the recording position of the record mark (2T) is deviated to the posterior side relative to the ideal position. Distance Pa between Path A and the input signal and distance Pb between Path B and the input signal are calculated to obtain 4S2M5S-A=ΔB−=|Pa−Pb|−Pstd. 4S2M5S-A means the recording position shift of 2T in the sequence of a 4T or longer space, a 2T mark, and a 5T or longer mark in Path A and represents the recording position deviation amount of the 2T mark interposed between the 4T or longer space and the 5T or longer space. Here, as for Pstd, the value of Pa−Pb when Pa=0 is represented by −Pstd, and the value of Pa−Pb when Pb=0 is represented by Pstd.

FIG. 21(b) shows the reproduced waveforms where the recording position of the record mark (2T) is deviated to the anterior side relative to the ideal position. Distance Pa between Path A and the input signal and distance Pb between Path B and the input signal are calculated to obtain 4S2M5S-A=ΔB+=|Pa−Pb|−Pstd. 4S2M5S-A means the recording position shift of 2T in the sequence of a 4T or longer space, a 2T mark, and a 5T or longer mark in Path A and represents the recording position deviation amount of the 2T mark interposed between the 4T or longer space and the 5T or longer space. The above-described phase shift detection is carried out on the 18 patterns in total classified in Table 2 to detect the phase shift amount that depends on the lengths of X space, 2T mark, and Y space or the lengths of X' mark, 2T space, and Y' mark.

Here, the classification of the recording position shift of "X space, 2T mark, Y space" or "X' mark, 2T space, Y' mark" in the patterns of Table 2 is realized by detecting b_k−5 bits out of 11 bits of the record code (b_k−10 to b_k) as the boundary of the recording position deviation of the 2T mark or the 2T space. For example, in S0→S0 pattern, it corresponds to comparison subject patterns of the sequence of "4T or longer space, 2T mark, 5T or longer space" and the sequence of "5T or longer space, 2T mark, 4T or longer space". The phase shift amount which depends on the 2T mark length and the lengths of the preceding and succeeding spaces is detected. Likewise, in S3→S4 pattern, it corresponds to comparison subject patterns of the sequence of "4T mark, 2T space, 4T or longer mark" and the sequence of "3T mark, 2T space, 5T or longer mark". The recording position shift amount which depends on the 2T space length and the lengths of the preceding and succeeding spaces is detected.

Next, patterns in which the Euclidean distance of the state transition patterns that can take two state transition paths is 12 and in which a 3-bit error is detected in a portion where at least two 2T intervals consecutively occur, such as "2T mark-2T space" or "2T space-2T mark", are described. More specifically, a method for detecting the phase shift amount in the patterns of Table 3 in which, among shift errors of the consecutive sequence of "2T mark-2T space" or the consecutive sequence of "2T space-2T mark", a 3-bit error is detected is described.

FIG. 22 shows sampled values of the patterns which are to be subjected to comparison. The abscissa represents time (1 scale period represents 1 channel clock period), and the ordinate represents the signal level (0 to 8). The broken lines and the solid lines correspond to the respective waveforms of Path A and Path B. Each of the sampled values corresponds to any of 0 to 8 of expected value Levelv of the input in the maximum likelihood decoding. It is defined that the waveform reproduced from a record mark portion is an upwardly-oriented waveform in terms of the signal level, and that the waveform reproduced from a non-record portion is a downwardly-oriented waveform.

The patterns shown in FIG. 22 correspond to the reproduced waveforms which have patterns including the consecutive sequence of "2T mark-2T space". Thus, the patterns of FIG. 22 and the following patterns of Table 3, S0→S6, S0→S5, S0→S4, S7→S6, S7→S5, S7→S4, S6→S6, S6→S5, and S6→S4, correspond to a portion where the position of the consecutive sequence of "2T mark-2T space" makes an anterior or posterior shift, and the other patterns of Table 3, S2→S0, S2→S1, S2→S2, S3→S0, S3→S1, S3→S2, S4→S0, S4→S1, and S4→S2, correspond to a portion where the position of the consecutive sequence of "2T space-2T mark" makes an anterior or posterior shift.

The waveforms of the sequence of a 4T or longer space, a 2T mark, a 2T space, and a 3T mark recorded in the present embodiment are the reproduced waveforms of FIG. 22. Therefore, a method for detecting a shift in the recording position of the consecutive sequence of "2T mark-2T space" is now described with attention to the reproduced waveforms of FIG. 22. FIG. 22 shows the correlation between the reproduced waveforms for S0→S6 of Table 3 and the deviation of the record mark. In FIG. 22, the solid line with open triangles (Δ) represents the input signal, and Path A represented by the broken line is a correct state transition path. The input signal is generated based on record mark C− in FIG. 22(a) and based on record mark C+ in FIG. 22(b). It is assumed that record mark C has an ideal recording position.

FIG. 22(a) shows a case where the recording position of the consecutive sequence of "2T mark-2T space" is deviated to the posterior side relative to the ideal position. Distance Pa between Path A and the input signal and distance Pb between Path B and the input signal are calculated to obtain 4S2M2S3M-A=ΔC−|Pa−Pb|−Pstd. 4S2M2S3M-A means the recording position shift of "2T mark-2T space" in the sequence of a 4T or longer space, a 2T mark, a 2T space, and a 3T mark in Path A and represents the recording position deviation amount of "2T mark-2T space" interposed between the 4T or longer space and the 3T mark. Here, as for Pstd, the value of Pa−Pb when Pa=0 is represented by −Pstd, and the value of Pa−Pb when Pb=0 is represented by Pstd.

FIG. 22(b) shows a case where the recording position of the consecutive sequence of "2T space-2T mark" is deviated to the anterior side relative to the ideal position. Distance Pa between Path A and the input signal and distance Pb between Path B and the input signal are calculated to obtain 4S2M2S3M-A=ΔC+=|Pa−Pb|−Pstd. 4S2M2S3M-A means the recording position shift of "2T space-2T mark" in the sequence of a 4T or longer space, a 2T mark, a 2T space, and a 3T mark in Path A and represents the recording position deviation amount of "2T space-2T mark" interposed between the 4T or longer space and the 3T mark.

The above-described shift detection is carried out on the 18 patterns in total classified in Table 3 to detect the phase shift amount that depends on the lengths of X space, 2T mark, 2T space, and Y mark or the lengths of X' mark, 2T space, 2T mark, and Y' space.

Here, the classification of the recording position shift of "X space, 2T mark, 2T space, Y mark" or "X' mark, 2T space, 2T mark, Y' space" in the patterns of Table 3 is realized by detecting b_k−6 bits out of 13 bits of the record code (b_k−12 to b_k) as the boundary of the recording position deviation of "2T mark-2T space" or "2T space-2T mark". For example, in S0→S6 pattern, it corresponds to comparison subject patterns of the sequence of "4T or longer space, 2T mark, 2T space, a mark" and the sequence of "5T or longer space, 2T mark, 2T space, 2T mark". The shift amount which depends on the lengths of these 2T mark and 2T space and the length of the preceding space and the length of the succeeding mark is detected. Likewise, in S2→S0 pattern, it corresponds to comparison subject patterns of "3T mark, 2T space, 2T mark, 4T or longer space" and "2T mark, 2T space, 2T mark, 5T or longer space". The recording position shift amount which depends on these 2T space and 2T mark and the length of the preceding mark and the length of the succeeding space is detected.

Figure 23:
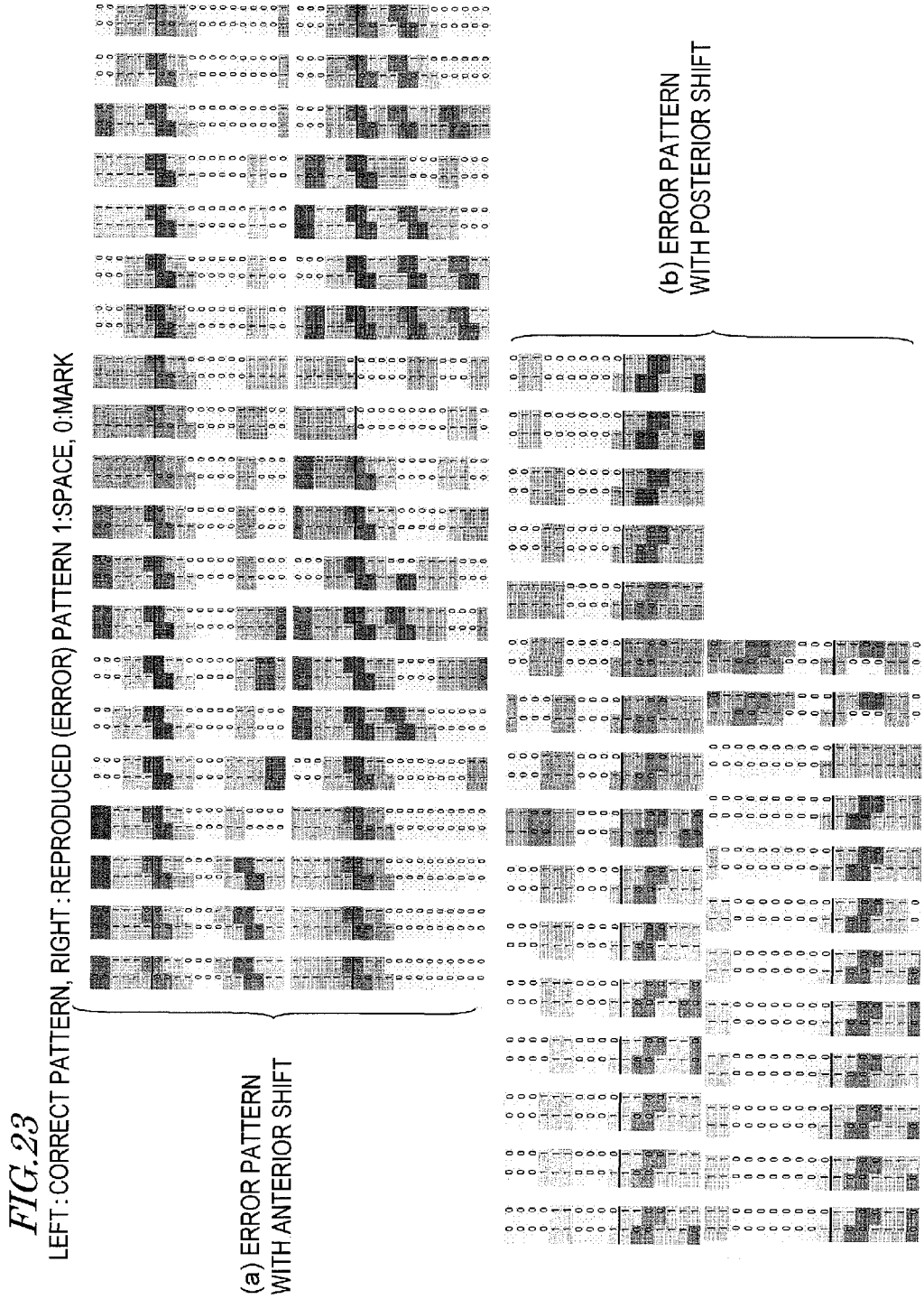
FIG. 23 is a diagram which illustrates an example of a result of comparison of an error portion with a correct pattern according to an embodiment of the present invention.

The shift detection method includes measuring |Pa−Pb|−Pstd obtained by comparison of the Viterbi decoding and the reproduction signal for each pattern to detect the shift amount. Based on the result of the detection, they are converted to the respective table values for the extended recording compensation, and the recording compensation is made with these values. However, there is another example of the shift detection method. For example, a portion including a bit error is extracted, and the error pattern and a code sequence of an original record are compared. Based on the shift tendency of the bit error, the extended recording compensation is made. FIG. 23 shows a result of comparison of a correct code sequence and decoded error data based on comparison of a correct pattern of an actually-recorded code sequence and a Viterbi decoded bit derived from the reproduction signal. The result of FIG. 23 is an example result obtained by comparing, with a correct pattern, an error portion of Viterbi-decoded data reproduced from a record mark which has been recorded with recording compensation being made according to the length of the mark and the lengths of its preceding and succeeding spaces, i.e., only recording compensation of marks and spaces with the Euclidean distance of 14 in Table 1 being made, before the extended recording compensation.

In FIG. 23, each pair of bars includes a data sequence of a correct pattern, i.e., a data sequence of an original record, on the left. Shown on the right is a result of an error in reproduced data obtained by Viterbi decoding a signal reproduced from part of an optical disc medium in which a correct pattern is recorded. In each bar, represents a mark of 1T, and "1" represents a space of 1T. For example, "00" represents a 2T mark, and "000" represents a 3T mark. Among the pairs of code sequences shown in FIGS. 23(a) and 23(b), FIG. 23(a) shows a collection of code sequences erroneously detected as having made an anterior shift relative to the correct code sequences, and FIG. 23(b) shows a collection of code sequences erroneously detected as having made a posterior shift relative to the correct code sequences. Recording and reproduction of the code sequences advance from top to bottom of the drawing.

The leftmost pair of code sequences in FIG. 23(a) is part of a code sequence in which an error actually occurred in recording of the code sequence of "4T space, 2T mark, 2T space, 3T space" and which was erroneously detected as being "3T space, 2T mark, 2T space, 3T mark". The error recognized herein is such that each of "2T mark, 2T space, 3T mark" has made an anterior shift by 1 bit. The leftmost pair of code sequences in FIG. 23(b) is part of a code sequence in which an error actually occurred in recording of the code sequence of "3T mark, 2T space, 2T mark, 3T space" and which was erroneously detected as being "4T space, 2T mark, 2T space, 3T mark". The error recognized herein is such that each of "3T mark, 2T space, 2T mark" has made a posterior shift by 1 bit.

Checking all the pairs of error code sequences of FIGS. 23(a) and 23(b), code sequences which actually include errors are found as follows. Specifically, in FIG. 23(a), in 34 out of 40 patterns, the recorded pattern is detected with an anterior shift in part of "3T or longer space, 2T mark, 2T space" by 1 bit. In FIG. 23(b), in 23 out of 28 patterns, the recorded pattern is detected with a posterior shift in part of "2T space, 2T mark, 3T or longer space" by 1 bit.

Thus, the large part of the errors are attributed to an anterior or posterior shift by 1 bit of a pattern represented by Table 3 which includes a consecutive sequence of "2T space-2T mark" or "2T mark-2T space".

It is understood that the patterns represented by Table 3 above is a code sequence which readily causes a bit error due to optical intersymbol interference or thermal interference in the case of high density recording such as 33.4 GB. Also, as for these patterns, in the case of a consecutive pattern including the combination of "2T mark-2T space" as shown in FIG. 23(a), the reproduction signal includes an anterior error. In the case of a consecutive pattern including the combination of "2T space-2T mark" as shown in FIG. 23(b), the reproduction signal includes a posterior error.

Therefore, the extended recording compensation is made using different recording compensation values for a case where a 2T mark is succeeded by a 2T space and preceded by a 3T or longer space and a case where a 2T mark is succeeded by a 2T space and preceded by a 2T space, whereby the bit error can be ameliorated.

Likewise, the extended recording compensation is made using different recording compensation values for a case where a 2T mark is preceded by a 2T space and succeeded by a 3T or longer space and a case where a 2T mark is preceded by a 2T space and succeeded by a 2T space, whereby the bit error can be ameliorated.

These examples are more specifically described below.

First, it is assumed that the mark length of an interested mark and the space length of its immediately preceding space are the shortest lengths (2T) in encoded data. It is also assumed that the mark length of a mark with succeeding that space (second mark) is the shortest length (2T). The move amount of two or more consecutive pulse edges (e.g., dTF1 and dTF2) in the write pulse train in this case is described as "x1". The move amount of two or more consecutive pulse edges (e.g., dTF1 and dTF2) in the write pulse train under the circumstance where the length of the second mark is different from the shortest length ($\geq$3T) is described as "y1".

Further, it is assumed that the mark length of an interested mark and the space length of its immediately succeeding space are the shortest lengths (2T) in encoded data. It is also assumed that the mark length of a mark with preceding that space (third mark) is the shortest length (2T). The move amount of two or more consecutive pulse edges (e.g., dTE2 and dTE3) in the write pulse train in this case is described as "x2". The move amount of two or more consecutive pulse edges (e.g., dTE2 and dTE3) in the write pulse train under the circumstance where the mark length of the third mark is different from the shortest length ($\geq$3T) is described as "y2".

Under the above assumptions, changing x1, x2, y1, and y2 so as to meet the following formula is effective:

$$(y1-x1) \times (y2-x2) \leq 0.$$

Specifically, moving the write pulse edge in opposite directions depending on whether the preceding mark is "2T" or "3T or longer" and whether the succeeding mark is "2T" or "3T or longer", according to the error distribution, and performing the recording with a shift in the position of the 2T mark while the width of the recording pulse at the peak power level (top pulse width) is fixed, are especially effective. Such an arrangement enables reduction of intersymbol interference and thermal interference without changing the size of the record mark (2T).

Furthermore, a code sequence in which an error occurs is compared with original data to detect the type and direction of the code sequence in which the error occurs, and a combination of code sequences which has a highest frequency of occurrence or highest probability of occurrence of bit errors is recording-compensated. Thereby, the bit error rate is further decreased, so that the reproduction signal quality can be improved.

Also, x1, x2, y1, and y2 may be controlled so as to meet the following formula:

$$|y1-x1|=|y2-x2|.$$

As a result, the half recording position of the 2T mark is shifted equally to the anterior side and the posterior side. The average of the recording positions of the entire 2T mark remains the same even after this write pulse edge is shifted. Therefore, even when the change amounts of the write pulse conditions (y1−x1, y2−x2) for the sequence of a 2T mark, a 2T space with the preceding or succeeding 2T mark, and a 3T or longer mark with the preceding or succeeding 2T space are varied, the absolute values of the change amounts are maintained equal, and the change is made in opposite directions. Thus, the phase change in the PLL as a whole is small, so that the detection error due to the phase shift in the PLL can be reduced.

Here, in the case where the Euclidean distance of the state transition patterns that can take two state transition paths is 12, the target value of the shift adjustment is not modified so that each pattern becomes 0. Instead, in the case where 4 code sequences of mark, space, mark, and space include two or more correct code sequences, the shift adjustment may be carried out such that the average of the shift amount becomes 0 in two or more code sequences. The transitions "S2k−7→S1k" and "S3k−5→S2k" in Table 3 each include a correct code sequence of "3T mark, 2T space, 2T mark, 3T space".

One of the code sequences which are to be compared is "2T space, 2T mark, 2T space, 4T mark", and the other is "4T space, 2T mark, 2T space, 2T mark". Comparison with a code sequence of a different shift direction is carried out, and the adjustment is carried out such that the average value of the shifts detected in the respective patterns becomes 0, whereby the shift deviation is effectively corrected, and intersymbol interference or thermal interference can be reduced.

Next, the record patterns are described. In general, as the code length increases, the frequency (probability) of occurrence of the record patterns relative to the code length decreases. Specifically, the frequency of occurrence is 2T>3T>4T> . . . >8T. For example, approximately, 2T is 38%, 3T is 25%, and 4T is 16%. Note that the code length distribution of a 17PP-modulated record pattern which is used in recording of common user data also depends on a non-modulated data sequence. In the case where recording is carried out under write pulse conditions varied using record patterns which have different frequencies of occurrence of code lengths, and the recorded mark is read out and the difference between two write pulse conditions is detected as an edge deviation amount, the recording is affected by the above-described frequencies of occurrence of respective code lengths of the modulated codes, so that the phase which is supposed to be locked by the PLL is significantly affected by a specific code length to vary. Especially in the recording of a 2T mark which has the probability of occurrence of ⅓ or higher, a change in the edge position of the 2T mark leads to a change in the average phase distribution of the total record marks. Accordingly, the phase which is supposed to be locked by the PLL is shifted. In the case where the edge position information of the record mark is detected using a PLL clock, significant detection errors occur in the edge position information or in the phase components of marks in the case of mark lengths which have relatively low frequencies of occurrence, especially in this embodiment, in the case of mark lengths equal to 4T or longer.

The record patterns used for adjustment of 2T and 3T marks of the present embodiment are specific patterns in which the frequencies of occurrence of the code lengths from 2T to 8T are generally equal and which are DSV-controlled. By using the above-described specific patterns with equal frequencies of occurrence, the frequency of occurrence of each code length is equal to ⅐, so that the frequency of occurrence of each of 2T and 3T is ⅐, and the frequency of occurrence of 4T or longer is ⅝. Thus, the frequency of occurrence of 4T or longer marks becomes dominant. In this case, even when the write pulse conditions of the 2T and 3T marks are changed, the edge positions of the record marks of 4T or longer whose write pulse conditions are not changed do not vary. Thus, the phase change of the PLL as a whole is small, so that the detection error due to the phase shift of the PLL can be reduced.

Signals which are to be pre-recorded may be produced by performing the first test writing using a code sequence from which the shortest mark length (2T) is excluded to obtain recording compensation values for the code lengths of 3T or longer mark lengths, and then, performing the second test writing using a code sequence including a 2T signal to obtain recording compensation values for the code lengths including the 2T signal. In an optical disc medium where the storage capacity per data recording layer is 33.4 GB, the amplitudes of short marks and spaces in the reproduction signal are extremely small. Under a circumstance where in such an optical disc medium the record mark position of a 2T signal has not been correctly recorded, correct positioning of long marks and spaces which are equal to or longer than 3T is sometimes difficult. In the case where a signal which includes an extremely large intersymbol interference as described above is reproduced, recording of the signal may be realized by first recording marks with the code length of 3Tw or longer and correctly making recording compensation on the edge positions of marks and spaces of 3Tw or longer, and then recording a signal which includes a 2Tw signal and correctly making compensation on the recording positions of the 2Tw marks and spaces. With such an arrangement, recording can be carried out more correctly and more efficiently, so that the reproduction signal quality can be improved.

In the test recording, the record mark size and shift amounts of short marks, such as 2T and 3T marks, are different among the respective recording conditions. As the tap coefficients of an adaptive equalization filter vary on every occasion of the test recording, the shift state of a read signal which depends on variations in the reproduction state in addition to variations in the recording state need to be additionally considered. Therefore, to correctly perform an adjustment of the shift caused by differences in recording conditions, in the case of making a recording adjustment, fixing the boost values of the reproduction equalizer or the tap coefficients of the adaptive equalization filter in advance for adjustment of test recording or recording compensation is rather preferable. This enables a precise adjustment of the shift position of each pattern.

Figure 24:
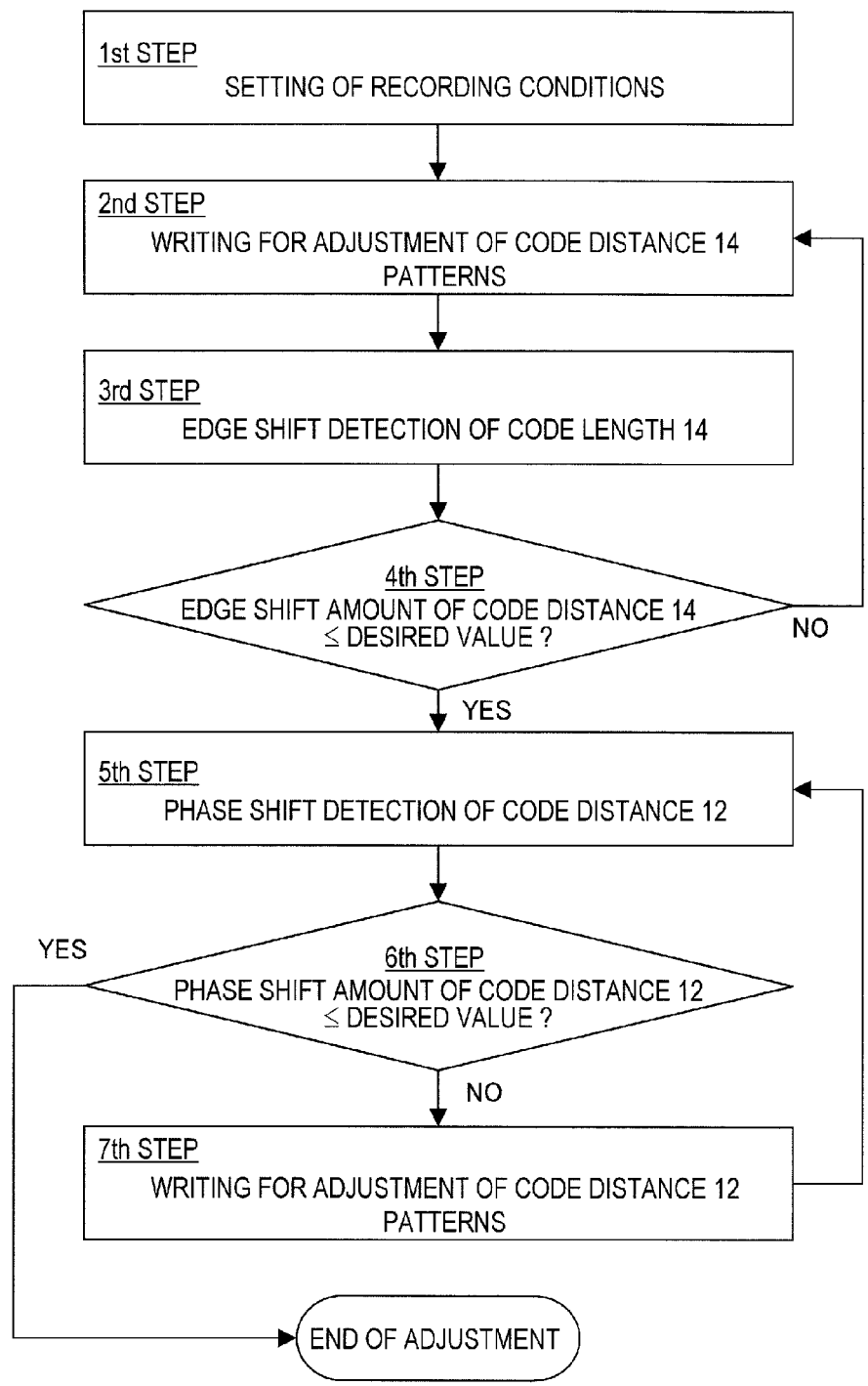
FIG. 24 is a flowchart which illustrates the procedure of optimizing the write pulse conditions for an optical information recording medium according to an embodiment of the present invention.

Next, the procedure of the extended recording compensation is described with reference to FIG. 24. FIG. 24 is a flowchart illustrating the procedure of the extended recording compensation on an optical disc medium according to the present embodiment such that the write pulse conditions are optimized. A computer program which defines the process procedure described in this flowchart is executed by a computer. The computer and hardware required for that process operate as the optical recording/reproduction device shown in FIG. 1.

The first step is setting of the recording conditions. The write pulse condition calculating section 110 sets recording conditions pre-recorded in the optical disc medium 101 or recording conditions stored in a memory of the optical recording device.

The second step is a writing step for adjustment of patterns which have the code distance of 14. The recording compensation section 112 controls the laser driving section 113 and the light emitting section 102 to carry out test recording in a predetermined track on the optical disc medium 101 under the recording conditions set in the first step. The third step is reproduction of a written signal and detection of an edge shift with the code distance of 14. The shift detecting section 109 detects 18 edge shift patterns shown in Table 1 according to the above-described edge shift detection method.

The fourth step is the step of determining whether or not the edge shift amount of the code distance of 14 shown in Table 1 is equal to or smaller than a desired value. If the edge shift amount is suppressed to be equal to or smaller than the desired value, the procedure advances to the next step. On the other hand, if the edge shift amount is not suppressed to be equal to or smaller than the desired value, the procedure returns to the above-described second step. The write pulse condition calculating section 110 sets the recording compensation conditions according to the edge shift amount for another test recording session.

The fifth step is detection of a phase shift of the code distance of 12 shown in Table 2 and Table 3. The shift detecting section 109 detects 18 patterns of phase shift shown in Table 2 and Table 3 according to the above-described shift detection method.

Note that, as for the code distance of 14, an "edge shift" is detected, but as for the code distance of 12, a "phase shift" is detected. The reasons for this are described below. Adjustment of the patterns with the code distance of 14 is realized by modifying the write pulse to change the "edge position" of a mark at the leading or trailing end. As such, it is necessary to detect an edge shift of a test-recorded mark. On the other hand, adjustment of the patterns with the code distance of 12 is not realized by adjusting the leading end position or trailing end position of a mark but by changing the recording positions of a plurality of consecutive marks and spaces. Therefore, it is necessary to detect test-recorded marks and spaces as a whole. In this specification, the difference between the detection targets is identified by using different terms, "edge shift" and "phase shift". Note that using these different terms is for the sake of convenience and therefore should not be strictly interrupted. This is because the "phase shift" has a broader meaning that refers to detection of an edge shift in the respective test-recorded marks.

The sixth step is the step of determining whether or not the edge shift amount of the code distance of 12 shown in Table 2 and Table 3 is suppressed to be equal to or smaller than a desired value. If the phase shift amount is suppressed to be equal to or smaller than the desired value, the adjustment procedure ends. If the phase shift amount is not suppressed to be equal to or smaller than the desired value, the adjustment procedure advances to the next step.

The seventh step is the writing step for adjustment of the patterns with the code distance of 12. The write pulse condition calculating section 110 sets the recording compensation conditions according to a phase shift result detected in the fifth step, and test recording is carried out in a predetermined track on the optical disc medium. Then, the procedure returns to step 5.

The procedure of the present embodiment shown in FIG. 24 includes performing test recording in a test recording area to determine recording compensation values. However, recording in the test recording area is impossible in some devices, such as a master-manufacturing exposure apparatus. In such a case, test recording may be carried out on another material disc of the optical disc medium to determine the recording conditions before a master disc cutting process.

The optical disc medium of the present embodiment includes optical disc media of such a type that the effects of thermal interference greatly vary according to the lengths of spaces that precede and succeed the mark. When writing is performed on an optical disc medium of such a type, it is necessary to change the write pulse conditions according not only to the mark length but also to the lengths of the preceding and succeeding spaces. Note that, however, when the lengths of spaces preceding and succeeding the mark are considered, the number of combinations of the write pulse conditions increases two-dimensionally, and accordingly, the number of parameters adjusted via the test-recording increases. As such, the period of time required for learning increases, and a larger number of tracks in the recording condition learning area are consumed. In optical disc media which allow recording only once in the same area, such as write-once disc media, the number of learning sessions is limited because the recording condition learning area only has a limited number of tracks, and consuming a large number of tracks in one learning session is not favorable. As such, a write pulse condition optimizing method of the present embodiment includes adjustment of the write pulse conditions according to classification for respective mark lengths. In the case of an optical disc medium having properties which need no compensation according to the lengths of spaces preceding and succeeding the mark, the write pulse conditions are corrected according only to the mark length, without performing an unnecessary adjustment step. In this way, by limiting the correction of the write pulse conditions to the adjustment for respective mark lengths, the time for the adjustment can be shortened, and the signal quality of recorded marks can efficiently be improved.

On the other hand, in the case of an optical disc medium which needs adjustment of the write pulse conditions according to the lengths of spaces immediately preceding and succeeding a mark and the lengths of marks with the preceding space and succeeding space, or in the case where correction of the write pulse conditions for respective mark lengths and respective space lengths of the preceding and succeeding spaces cannot solely provide sufficient compensation for deviations of the recorded marks, the write pulse conditions are adjusted according not only to the lengths of spaces preceding and succeeding the mark but to the lengths of marks preceding and succeeding the spaces, so that the signal quality of recorded marks can be improved.

Also, classification-related information, such as whether or not the extended recording compensation is made, the number of classes of mark lengths and space lengths for the recording compensation, whether or not the preceding-mark compensation is necessary, whether or not the succeeding-mark compensation is necessary, the number of classes, etc., may be preliminarily stored in a predetermined area of an optical disc medium. The predetermined area may be the initial value storage area 1003 (FIG. 2) which is provided in a read-in area at the inner perimeter of the optical disc medium. This enables correction of the write pulse conditions according to the properties of the optical disc medium, without performing unnecessary adjustment steps. In the case where the number of classes for the recording compensation, or whether or not the preceding- or succeeding-mark compensation is necessary, is thus known in advance, the time for adjustment can be shortened, and the signal quality of recorded marks can efficiently be improved.

After the learning in the optical disc drive, classification-related information, such as whether or not the extended recording compensation is made, the number of classes of mark lengths and space lengths for the recording compensation, whether or not the preceding-mark compensation is necessary, whether or not the succeeding-mark compensation is necessary, the number of classes, etc., may be recorded in a predetermined area. The predetermined area may be the initial value storage area 1003 which is provided in a read-in area at the inner perimeter of the optical disc medium. This enables correction of the write pulse conditions according to the properties of the optical disc medium, without performing unnecessary adjustment steps at the next startup. In the case where the number of classes for the recording compensation or whether the preceding- or succeeding-mark compensation is necessary is thus known in advance, the time for adjustment can be shortened, and the signal quality of recorded marks can efficiently be improved.

A reproduction device or a reproduction method of the present invention includes a reproduction section or a reproduction step for irradiating an optical disc medium with laser light for reproduction of information. Furthermore, as previously described, the reproduction device or method may include a section or step of retrieving the classification-related information recorded in a predetermined area of an optical disc medium (for example, the initial value storage area 1003), such as whether or not the extended recording compensation is made, the number of classes of mark lengths and space lengths for the recording compensation, whether or not the preceding- and succeeding-space compensation is necessary, whether or not the preceding-mark compensation is necessary, whether or not the succeeding-mark compensation is necessary, the number of classes, etc. This enables correction of the write pulse conditions according to the properties of the optical disc medium, without performing unnecessary adjustment steps at the next startup. In the case where the number of classes for the recording compensation or whether or not the preceding- or succeeding-mark compensation is necessary is thus known in advance, the time for adjustment can be shortened, and the signal quality of recorded marks can efficiently be improved.

Although the description of the present embodiment has been provided with an example of the PR(1,2,2,2,1)ML method, the present invention is not limited to this example. A combination of PRML methods which is capable of embodying the concept of the present invention may be selected.

Although the embodiment of present invention which is described herein is the optical recording method, it may be an optical recording/reproduction method which includes recording and reproduction operations.

Although the embodiment of the present invention has been described with an example of an optical recording/reproduction device and a write-once optical disc medium, the present invention is not limited to this example. The present invention is useful for a master-manufacturing exposure apparatus for rewritable optical disc media or read-only optical disc media. For example, in a mastering step included in the process of manufacturing a read-only optical disc medium, even when cutting of a material disc is carried out using a laser beam at the wavelength of about 400 nm on an inorganic resist coating, the effects of the optical recording method of the present embodiment are particularly achieved.

Figure 25:
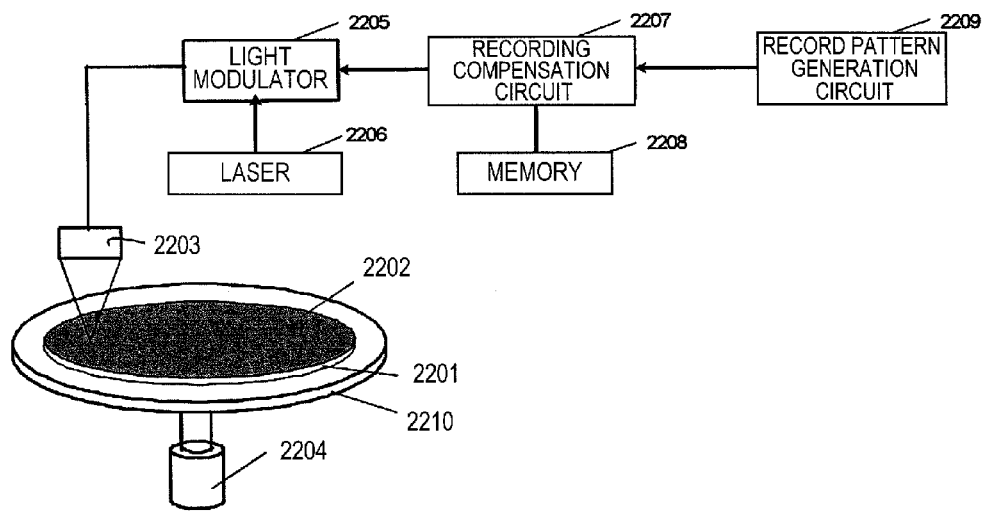
FIG. 25 is a diagram which illustrates an entire structure of a master-manufacturing exposure apparatus according to an embodiment of the present invention.

FIG. 25 shows such a material disc cutting apparatus. The material disc cutting apparatus includes an objective lens 2203, a motor 2204, a light modulator 2205, a laser 2706, a recording compensation circuit 2207, a memory 2208, a record pattern generation circuit 2209, and a turntable 2210.

As shown in FIG. 25, the memory 2208 contains the extended recording compensation values shown in FIG. 10 which have been obtained by the device of FIG. 1. First, information about the adjustment method for dTF1, dTF2, dTF3, dTE1, dTE2, and dTE3 are retrieved from the memory 2208. In the record pattern generation circuit 2209, modulation, addition of ECC, scrambling, etc., are performed, whereby it is converted into binary data for recording (NRZI signal). The laser beam emitted from the laser 2206 is modulated in terms of the emission power by the light modulator 2205 according to the output signal from the recording compensation circuit 2207 and is directed via the objective lens 2203 onto an inorganic resist coating 2202 applied over a glass material disc 2201. In this step, the binary recording is realized by the presence and absence of irradiation. Thereafter, portions irradiated with the laser are molten away, and sputtering of a metal, such as nickel, is performed, whereby a metal stamper having concavity/convexity pits is fabricated. The metal stamper is used as a mold to form a disc substrate, and a recording film and other elements are formed on the disc substrate. The two substrates which have a recording film formed at least on one side are combined into one disc.

When cutting of a material disc is performed using an electron beam, pits can be formed with a high density because of its short wavelength. However, the time required for the cutting is considerably long as compared with the case of a laser beam, and accordingly, the production cost of a master disc of an optical disc medium increases. By using an optical information device of the present embodiment, cutting of a material disc is performed using a laser beam, so that inexpensive optical disc media can be provided.

An optical disc medium manufacturing method of the present embodiment which uses the above-described master-manufacturing exposure apparatus may include the step of forming a predetermined area in an optical disc medium for storing information relating to classification which is necessary for the above-described extended recording compensation. The information relating to classification may include whether or not the extended recording compensation is made, the number of classes of mark lengths and space lengths for the recording compensation, whether or not the preceding-mark compensation is necessary, whether or not the succeeding-mark compensation is necessary, the number of classes, etc. The predetermined area may be the initial value storage area 1003 which is provided in a read-in area at the inner perimeter of the optical disc medium. Such a manufacturing method enables recording of classification-related information in an optical disc medium. This enables correction of the write pulse conditions according to the properties of the optical disc medium, without performing unnecessary adjustment steps. In the case where the number of classes for the recording compensation or whether or not the preceding- or succeeding-mark compensation is necessary is thus known in advance, the time for adjustment can be shortened, and the signal quality of recorded marks can efficiently be improved.

Figure 26:
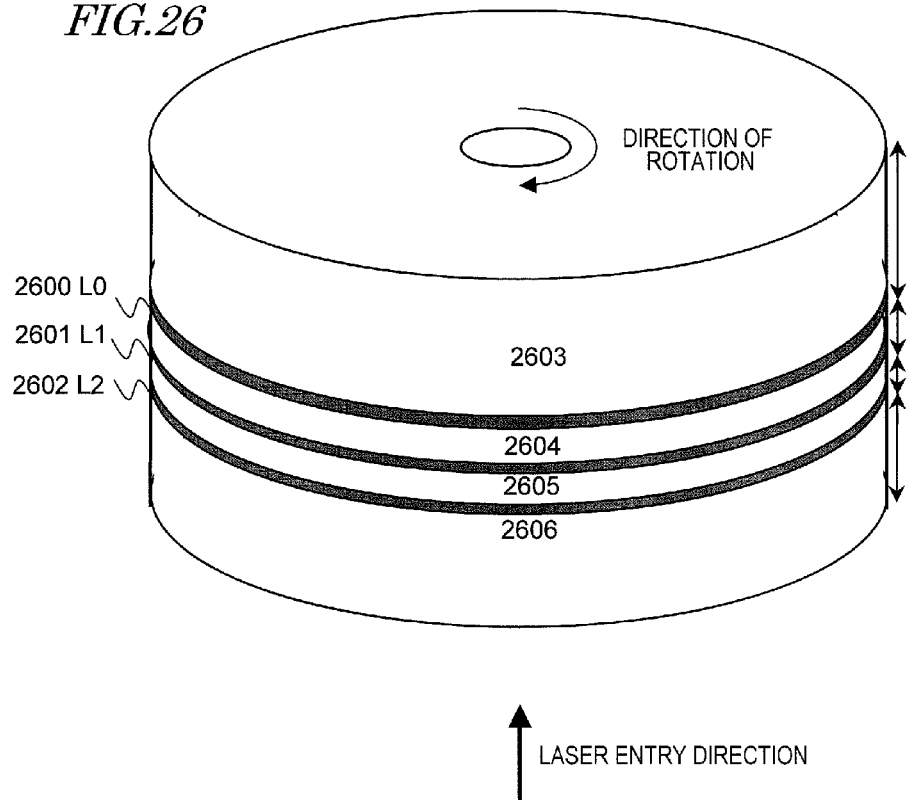
FIG. 26 is a diagram which illustrates a stack configuration of a three-layer optical disc medium.

Next, FIG. 26 is a schematic view of a stack configuration of a three-layer optical disc medium of the present embodiment. In the three-layer optical disc medium, a substrate 2603, a data recording layer L0 2600 ("L0" is an abbreviation for "Layer0"), a data recording layer L1 2601, a data recording layer L2 2602, and a cover layer 2606 are disposed in this order. The laser light comes in from the cover layer 2606 side toward the substrate 2603.

The thickness of the substrate 2603 is approximately 1.1 mm, the thickness of the cover layer 2606 is at least 53 μm or more, data recording layers L0, L1, and L2 are separated by transparent space layers 2604 and 2605.

In the present embodiment, in a specific example described herein, the thickness of the cover layer 2606 is 57 μm, the thickness of a space layer 2605 between L2 and L1 is 18 μm, and the thickness of a space layer 2604 between L1 and L0 is 25 μm. The intervals between the respective data recording layers separated by the space layers are preferably designed such that interference of diffracted light from the respective data recording layers (interlayer interference) decreases. The present invention is not limited to the interlayer distances defined by the above-described thicknesses of the space layers. Especially in the case of a layered disc, the L2 and L1 layers need to transmit light to inner layers and therefore need to be designed to have a transmittance as high as 55% to 65%.

In the case where writing is performed on a recording medium which has a recording layer of such a high transmittance with a high recording density of mark lengths that are beyond the optical resolution, the thicknesses of recording films of the respective data recording layers, reflection films, dielectric films, etc., need to be decreased in order to ensure the high transmittance. Therefore, diffusion of heat to the dielectric films and reflection films provided on the upper and lower sides of the recording film is smaller whereas diffusion of heat within the plane of the recording film is larger. Specifically, in recording of marks, the recording edge positions of marks deviate due to thermal interference. The extended recording compensation of the present invention is a recording compensation method especially effective in the case where very small marks that are beyond the optical resolution are recorded on a recording medium having such a high transmittance layer.

Note that, although an optical pickup head which is the same as those commonly used in conventional BDs is used in the examples described herein, the optical pickup head may have any configuration so long as it is configured to emit a beam on an optical storage medium and output a signal according to a beam reflected by the optical storage medium.

INDUSTRIAL APPLICABILITY

The optical recording/reproduction method and optical recording/reproduction device according to the present invention, which are employed for optical disc media, are advantageously capable of high density recording on optical recording media, and are applicable to the electric and electronic device industries including digital home appliances, information processing devices, etc.

| | REFERENCE SIGNS LIST |
|---|---|
| 101 | optical disc medium |
| 102 | light emitting section |
| 103 | preamplifying section |
| 105 | waveform equalizing section |
| 108 | PRML processing section |
| 109 | shift detecting section |
| 110 | write pulse condition calculating section |
| 111 | recording pattern generating section |
| 112 | recording compensation section |
| 113 | laser driving section |

The invention claimed is:

1. An optical recording method for recording information by irradiating an optical disc medium with a modulated write pulse train of laser light variable over a plurality of power levels such that a plurality of marks are formed on the optical disc medium, edge positions of each of the marks and a space between adjacent two of the marks being utilized for recording of the information, the method comprising the steps of:
   encoding record data to generate encoded data which is a combination of marks and spaces;
   classifying the encoded data according to a combination of a mark length of a mark, a space length of a first space that immediately precedes the mark, and a space length of a second space that immediately succeeds the mark;
   generating a write pulse train for forming the mark, in which at least one of a leading end edge position, a trailing end edge position, and a pulse width of the write pulse train is changed according to a result of the classification; and
   irradiating the optical disc medium with the generated write pulse train to form the plurality of marks on the optical disc medium,
   wherein the space length of the first space is classified in M space length classes (M is an integer equal to or greater than 1) and the space length of the second space is classified in N space length classes (N is an integer equal to or greater than 1), and
   wherein:
   in the case of one of the leading end edge position and the pulse width is changed, the step of generating the write pulse train changes one of the leading end edge position and the pulse width according to the result of the classification so that M is greater than N; and in the case of the trailing end edge position is changed, the step of generating the write pulse train changes the trailing end edge position according to the result of the classification so that N is greater than M.

2. The optical recording method of claim 1, wherein
   the step of classifying includes classifying the encoded data according to a combination of a mark length of a shortest mark, the space length of the first space, and the space length of the second space.

3. The optical recording method of claim 1, wherein
   the step of classifying includes classifying the encoded data according to a combination of the following conditions:
   the mark length of the mark;
   whether the space length of the first space is "n" or "n+1 or longer"; and
   whether the space length of the second space is "n" or "n+1 or longer", where n is a shortest space length.

4. The optical recording method of claim 1, wherein
   the step of classifying includes classifying the encoded data by space length into four space length classes for the first space, "n", "n+1", "n+2", and "n+3 or longer", and two space length classes for the second space, "n" and "n+1 or longer", where n is a shortest space length, and
   the step of generating includes changing the leading end edge position of the write pulse train according to the result of the classification.

5. The optical recording method of claim 1, wherein
   the step of classifying includes classifying the encoded data by space length into two space length classes for the first space, "n" and "n+1 or longer", and four space length classes for the second space, "n", "n+1", "n+2", and "n+3 or longer", where n is a shortest space length, and
   the step of generating includes changing the trailing end edge position of the write pulse train according to the result of the classification.

6. The optical recording method of claim 1, wherein
   the step of classifying includes classifying the encoded data by space length into four space length classes for the first space, "n", "n+1", "n+2", and "n+3 or longer", and two space length classes for the second space, "n" and "n+1 or longer", where n is a shortest space length, and
   the step of generating includes changing the pulse width of the write pulse train according to the result of the classification.

7. The optical recording method of claim 1, wherein
   the step of classifying includes, if the mark length of the mark is longer than a shortest mark length, classifying the encoded data according to at least any one of a combination of the mark length and the first space length and a combination of the mark length and the second space length.

8. The optical recording method of claim 1, further comprising the steps of:
   generating an analog signal from the optical disc medium and generating a digital signal from the analog signal;
   reshaping a waveform of the digital signal;
   maximum likelihood decoding the reshaped digital signal based on a PRML (Partial Response Maximum Likelihood) method;
   generating a binary signal which represents a result of the maximum likelihood decoding; and
   detecting a shift amount in the waveform of the reshaped digital signal based on the reshaped digital signal and the binary signal, wherein the step of generating the write pulse train includes changing, based on a result of the detection of the shift amount, at least one of the leading end edge position, the trailing end edge position, and the pulse width of the write pulse train for the formation of the plurality of marks.

9. The optical recording method of claim 8, wherein
the step of detecting includes detecting the shift amount in the waveform of the digital signal by a comparison of the encoded data and the binary signal, and
the step of generating the write pulse train includes changing at least one of the leading end edge position, the trailing end edge position, and the pulse width of the write pulse train.

10. The optical recording method of claim 1, wherein
the step of generating the write pulse train includes changing a position of at least one of first to third pulse edges counted from the leading end and first to third pulse edges counted from the trailing end according to the result of the classification.

11. The optical recording method of claim 1, wherein
the following formula holds:

$$ML < \lambda/NA \times 0.26$$

where $\lambda$ is a wavelength of the laser light, NA is a numerical aperture of an objective lens, and ML is a shortest mark length.

12. The optical recording method of claim 11, wherein
the shortest mark length ML is 0.128 μm or less.

13. The optical recording method of claim 11, wherein
the laser light wavelength $\lambda$ is in the range of 400 nm to 410 nm, and
the NA is in the range of 0.84 to 0.86.

14. An optical recording apparatus for recording information by irradiating an optical disc medium with a modulated write pulse train of laser light variable over a plurality of power levels such that a plurality of marks are formed on the optical disc medium, edge positions of each of the marks and a space between adjacent two of the marks being utilized for recording of the information, the apparatus comprising:
an encoding section configured to encode record data to generate encoded data which is a combination of marks and spaces;
a classification section configured to classify the encoded data according to a combination of a mark length of a mark, a space length of a first space that immediately precedes the mark, and a space length of a second space that immediately succeeds the mark;
a recording waveform generating section configured to generate the write pulse train for forming the mark in which at least one of a leading end edge position, a trailing end edge position, and a pulse width of the write pulse train is changed according to the result of the classification; and
a laser driving section configured to irradiate the optical disc medium with the generated write pulse train to form the plurality of marks on the optical disc medium,
wherein the space length of the first space is classified in M space length classes (M is an integer equal to or greater than 1) and the space length of the second space is classified in N space length classes (N is an integer equal to or greater than 1), and
wherein:
in the case of one of the leading end edge position and the pulse width is changed, the recording waveform generating section changes one of the leading end edge position and the pulse width according to the result of the classification so that M is greater than N; and
in the case of the trailing end edge position is changed, the recording waveform generating section changes the trailing end edge position according to the result of the classification so that N is greater than M.

15. The optical recording apparatus of claim 14, further comprising:
a PRML processing section configured to receive a digital signal generated from an analog signal reproduce from an optical disc medium, to reshape a waveform of the digital signal, and to maximum likelihood decode the reshaped digital signal based on a PRML (Partial Response Maximum Likelihood) method;
a shift detecting section configured to detect a shift amount in the waveform of the digital signal based on a binary signal which represents a result of the maximum likelihood decoding and the reshaped digital signal; and
a recording compensation section configured to change, based on a result of the detection of the shift amount, at least one of the leading end edge position, the trailing end edge position, and the pulse width of the write pulse train for the formation of the plurality of marks.

16. A master-manufacturing exposure apparatus for recording information by irradiating an optical disc medium which is a resist-coated material disc with a modulated write pulse train of laser light variable over a plurality of power levels such that a plurality of marks are formed on the optical disc medium, edge positions of each of the marks and a space between adjacent two of the marks being utilized for recording of the information, the apparatus comprising:
an encoding section configured to encode record data to generate encoded data which is a combination of marks and spaces;
a classification section configured to classify the encoded data according to a combination of a mark length of a mark, a space length of a first space that immediately precedes the mark, and a space length of a second space that immediately succeeds the mark;
a recording waveform generating section configured to generate the write pulse train for forming the mark in which at least one of a leading end edge position, a trailing end edge position, and a pulse width of the write pulse train is changed according to a result of the classification; and
a laser driving section configured to irradiate the optical disc medium with the generated write pulse train to form the plurality of marks on the optical disc medium,
wherein the space length of the first space is classified in M space length classes (M is an integer equal to or greater than 1) and the space length of the second space is classified in N space length classes (N is an integer equal to or greater than 1), and
wherein:
in the case of one of the leading end edge position and the pulse width is changed, the recording waveform generating section changes one of the leading end edge position and the pulse width according to the result of the classification so that M is greater than N; and
in the case of the trailing end edge position is changed, the recording waveform generating section changes the trailing end edge position according to the result of the classification so that N is greater than M.

17. An optical disc medium in which information is to be recorded based on an optical recording method for recording information by irradiating the optical disc medium with a modulated write pulse train of laser light variable over a plurality of power levels such that a plurality of marks are formed on the optical disc medium, edge positions of each of the marks and a space between adjacent two of the marks being utilized for recording of the information, wherein the optical recording method includes the steps of:
encoding record data to generate encoded data which is a combination of marks and spaces;
classifying the encoded data according to a combination of a mark length of a mark, a space length of a first space that immediately precedes the mark, and a space length of a second space that immediately succeeds the mark;
generating a write pulse train for forming the mark, in which at least one of a leading end edge position, a trailing end edge position, and a pulse width of the write pulse train is changed according to a result of the classification; and
irradiating the optical disc medium with the generated write pulse train to form the plurality of marks on the optical disc medium,
wherein the space length of the first space is classified in M space length classes (M is an integer equal to or greater than 1) and the space length of the second space is classified in N space length classes (N is an integer equal to or greater than 1), and
wherein:
in the case of one of the leading end edge position and the pulse width is changed, the step of generating the write pulse train changes one of the leading end edge position and the pulse width according to the result of the classification so that M is greater than N; and
in the case of the trailing end edge position is changed, the step of generating the write pulse train changes the trailing end edge position according to the result of the classification so that N is greater than M,
the optical disc medium comprising a predetermined area,
wherein information about the classification to be used for the classification in the step of classifying is contained in the predetermined area.

18. A method for reproducing information from an optical disc medium in which the marks are to be recorded based on an optical recording method, for recording information by irradiating the optical disc medium with a modulated write pulse train of laser light variable over a plurality of power levels such that a plurality of marks are formed on the optical disc medium, edge positions of each of the marks and a space between adjacent two of the marks being utilized for recording of the information, wherein the optical recording method includes the steps of:
encoding record data to generate encoded data which is a combination of marks and spaces;
classifying the encoded data according to a combination of a mark length of a mark, a space length of a first space that immediately precedes the mark, and a space length of a second space that immediately succeeds the mark;
generating a write pulse train for forming the mark, in which at least one of a leading end edge position, a trailing end edge position, and a pulse width of the write pulse train is changed according to a result of the classification; and
irradiating the optical disc medium with the generated write pulse train to form the plurality of marks on the optical disc medium,
wherein the space length of the first space is classified in M space length classes (M is an integer equal to or greater than 1) and the space length of the second space is classified in N space length classes (N is an integer equal to or greater than 1), and
wherein:
in the case of one of the leading end edge position and the pulse width is changed, the step of generating the write pulse train changes one of the leading end edge position and the pulse width according to the result of the classification so that M is greater than N; and
in the case of the trailing end edge position is changed, the step of generating the write pulse train changes the trailing end edge position according to the result of the classification so that N is greater than M,
wherein the optical disc medium including a predetermined area, in which information about the classification to be used for the classification in the step of classifying is contained,
the method for reproducing information comprising the step of:
reproducing the information contained in the optical disc medium by irradiating the optical disc medium with laser light; and
reading the information about the classification to be used for the classification from the predetermined area.

* * * * *